(12) United States Patent
Duluk, Jr. et al.

(10) Patent No.: US 6,577,305 B1
(45) Date of Patent: Jun. 10, 2003

(54) APPARATUS AND METHOD FOR PERFORMING SETUP OPERATIONS IN A 3-D GRAPHICS PIPELINE USING UNIFIED PRIMITIVE DESCRIPTORS

(75) Inventors: Jerome F. Duluk, Jr., Palo Alto, CA (US); Richard E. Hessel, Pleasanton, CA (US); Vaughn T. Arnold, Scotts Valley, CA (US); Jack Benkual, Cupertino, CA (US); George Cuan, Sunnyvale, CA (US); Stephen L. Dodgen, Boulder Creek, CA (US); Emerson S. Fang, Fremont, CA (US); Hengwei Hsu, Fremont, CA (US); Sushma S. Trivedi, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,598

(22) Filed: Aug. 20, 1999

Related U.S. Application Data

(60) Provisional application No. 60/097,336, filed on Aug. 20, 1998.

(51) Int. Cl.⁷ ............................................. G06T 17/00
(52) U.S. Cl. ...................................... 345/419; 345/420
(58) Field of Search ................................ 345/418, 419, 345/420, 421, 423, 424

(56) References Cited

U.S. PATENT DOCUMENTS

| | | |
|---|---|---|
| 4,783,829 A | 11/1988 | Miyakawa et al. |
| 4,945,500 A | 7/1990 | Deering ....................... 364/522 |
| 4,970,636 A | 11/1990 | Snodgrass et al. .......... 364/518 |
| 5,083,287 A | 1/1992 | Obata et al. ................. 395/126 |
| 5,123,085 A | 6/1992 | Wells et al. |
| 5,402,532 A | 3/1995 | Epstein et al. ............... 395/122 |
| 5,448,690 A | 9/1995 | Shiraishi et al. |
| 5,455,900 A | 10/1995 | Shiraishi et al. |
| 5,481,669 A | 1/1996 | Poulton et al. |

(List continued on next page.)

OTHER PUBLICATIONS

Watt, "3D Computer Graphics" (2nd ed.), Chapter 4, Reflection and Illumination Models, p. 89–126.

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

Schilling et al., "Texram: a smart memory for texturing," IEEE computer graphics and applications, May 1996, 32–41.

Angel (interactive computer graphics: a top–down approach with OpenG1: ISBN: 0–201–85571–2—sections 6.8 & 7.7.2).

*Primary Examiner*—Cliff N. Vo
(74) *Attorney, Agent, or Firm*—Dorsey & Whitney LLP; R. Michael Ananian

(57) ABSTRACT

The present invention provides post tile sorting setup in a tiled graphics pipeline architecture. In particular, the present invention determines a set of clipping points that identify intersections of a primitive with a tile. The mid-pipeline setup unit is adapted to compute a minimum depth value for that part of the primitive intersecting the tile. The mid-pipeline setup unit can be adapted to process primitives with x-coordinates that are screen based and y-coordinates that are tile based. Additionally, to the mid-pipeline setup unit is adapted to represent both line segments and triangles as quadrilaterals, wherein not all of a quadrilateral's vertices are required to describe a triangle.

42 Claims, 23 Drawing Sheets

U.S. PATENT DOCUMENTS

| | | |
|---|---|---|
| 5,574,836 A | 11/1996 | Broemmelsiek ............ 395/127 |
| 5,579,455 A | 11/1996 | Greene et al. |
| 5,596,686 A | 1/1997 | Duluk, Jr. |
| 5,664,071 A | 9/1997 | Nagashima |
| 5,684,939 A | 11/1997 | Foran et al. ................ 395/131 |
| 5,699,497 A | 12/1997 | Erdahl et al. |
| 5,710,876 A | 1/1998 | Peercy et al. ............... 395/126 |
| 5,767,589 A | 6/1998 | Lake et al. |
| 5,767,859 A | 6/1998 | Rossin et al. ............... 345/434 |
| 5,798,770 A | 8/1998 | Baldwin |
| 5,828,378 A | 10/1998 | Shiraishi .................... 345/422 |
| 5,841,447 A | 11/1998 | Drews |
| 5,850,225 A | 12/1998 | Cosman |
| 5,854,631 A | 12/1998 | Akeley et al. .............. 345/419 |
| 5,860,158 A | 1/1999 | Pai et al. |
| 5,864,342 A | 1/1999 | Kajiya et al. ............... 345/418 |
| RE36,145 E | 3/1999 | DeAguiar et al. .......... 345/511 |
| 5,880,736 A | 3/1999 | Peercy et al. ............... 345/426 |
| 5,889,997 A | 3/1999 | Strunk |
| 5,920,326 A | 7/1999 | Rentschler et al. |
| 5,949,424 A | 9/1999 | Cabral et al. ............... 345/426 |
| 5,949,428 A * | 9/1999 | Toelle et al. ................ 345/431 |
| 5,977,977 A | 11/1999 | Kajiya et al. ............... 345/418 |
| 5,990,904 A | 11/1999 | Griffin |
| 6,002,410 A | 12/1999 | Battle |
| 6,002,412 A | 12/1999 | Schinnerer |
| 6,118,452 A | 9/2000 | Gannett |
| 6,128,000 A | 10/2000 | Jouppi et al. |
| 6,167,486 A | 12/2000 | Lee et al. |
| 6,204,859 B1 | 3/2001 | Jouppi et al. |
| 6,229,553 B1 | 5/2001 | Duluk, Jr. et al. |
| 6,246,415 B1 | 6/2001 | Grossman et al. |
| 6,259,452 B1 | 7/2001 | Coorg et al. |

* cited by examiner

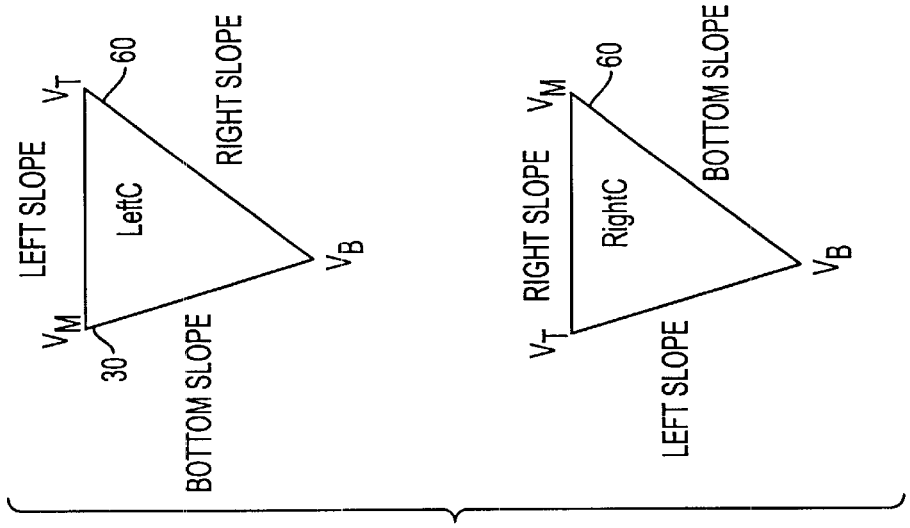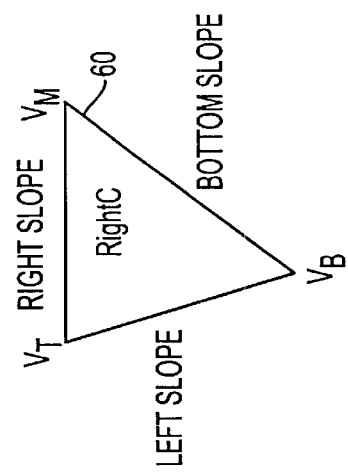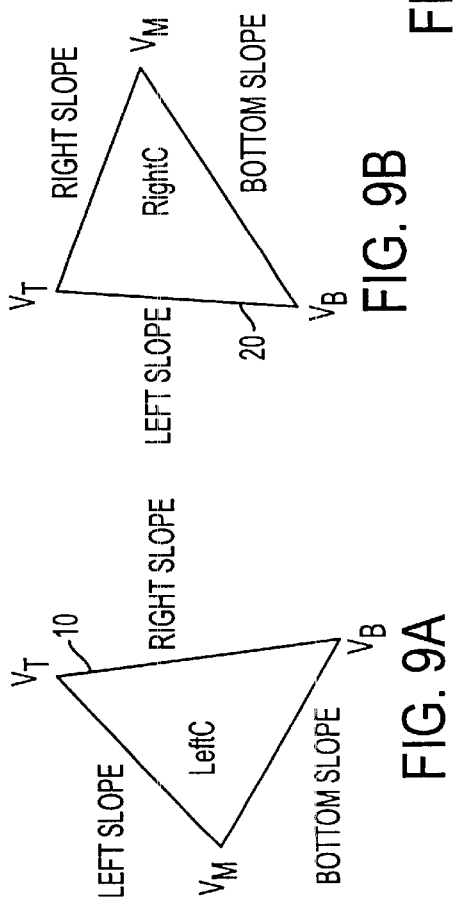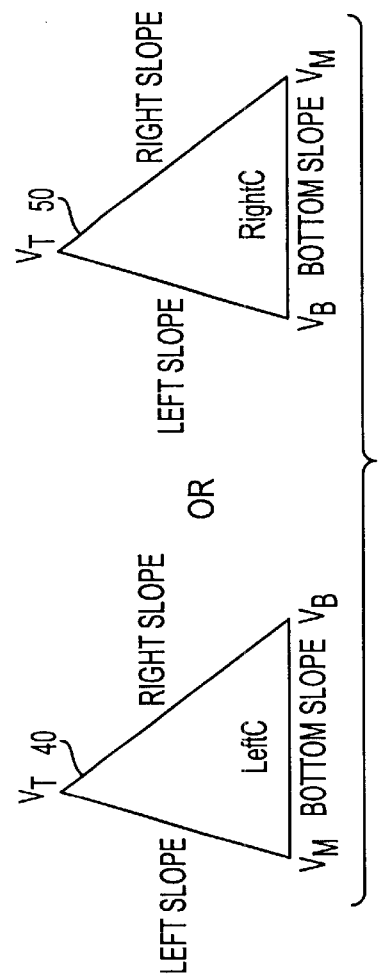
FIG. 9A
FIG. 9B
FIG. 9C
FIG. 9D

θ = [315,360]
XCnt = Up
YCnt = Dn
MAJOR = X

θ = [180,225]
XCnt = Dn
YCnt = Dn
MAJOR = X

θ = [135,180]
XCnt = Dn
YCnt = Up
MAJOR = X

θ = [0,45]
XCnt = Up
YCnt = Up
MAJOR = X

θ = [270,315]
XCnt = Up
YCnt = Dn
MAJOR = Y

θ = [225,270]
XCnt = Dn
YCnt = Dn
MAJOR = Y

θ = [90,135]
XCnt = Dn
YCnt = Up
MAJOR = Y

θ = [45,90]
XCnt = Up
YCnt = Up
MAJOR = Y

ANTIALIASED

ANTIALIASED

NON-ANTIALIASED

NON-ANTIALIASED

* REPRESENTED MAGNITUDES OF INFINITE SLOPES ARE DON'T CARES AND CAN BE SET TO ANY CONVENIENT CORRECTLY SIGNED VALUE

XCnt = Up
YCnt = Up
COS > 0
SIN > 0

XCnt = Dn
YCnt = Up
COS < 0
SIN > 0

XCnt = Dn
YCnt = Dn
COS < 0
SIN < 0

XCnt = Up
YCnt = Dn
COS > 0
SIN < 0

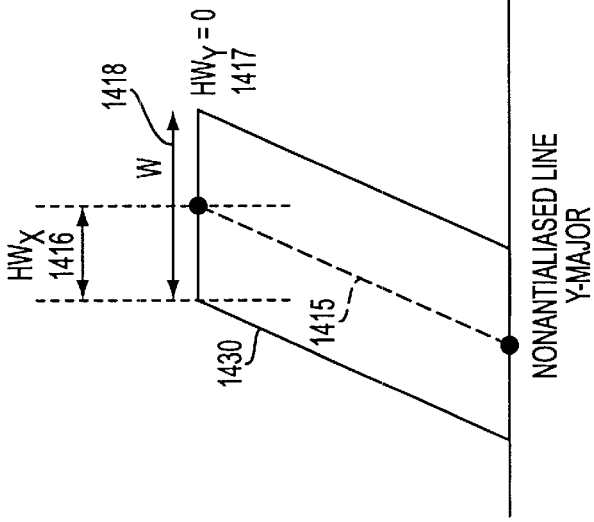
$HW_X = \frac{W}{2}\sin\theta$
$HW_Y = \frac{W}{2}\cos\theta$
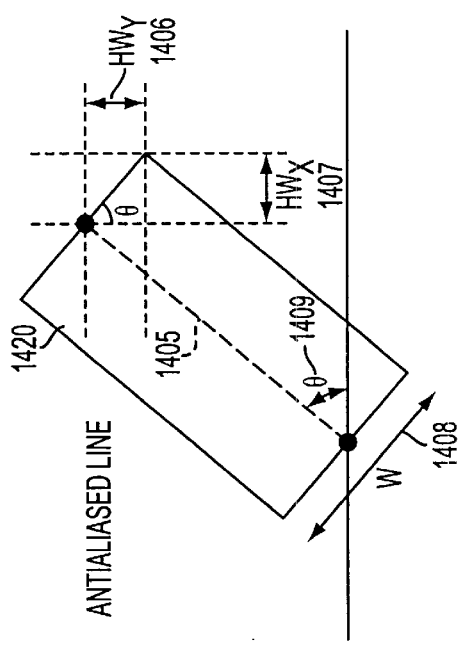
FIG. 15A
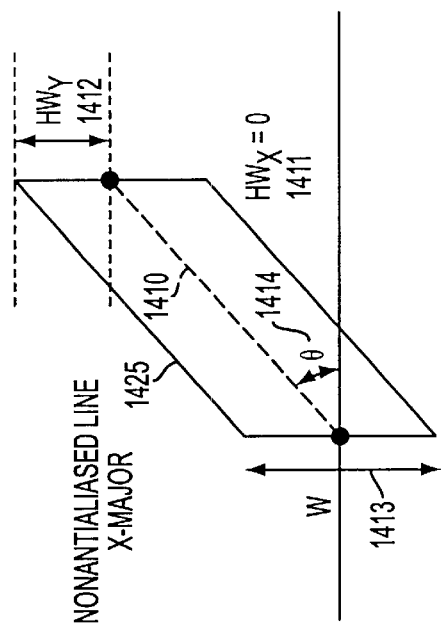
FIG. 15B
FIG. 15C

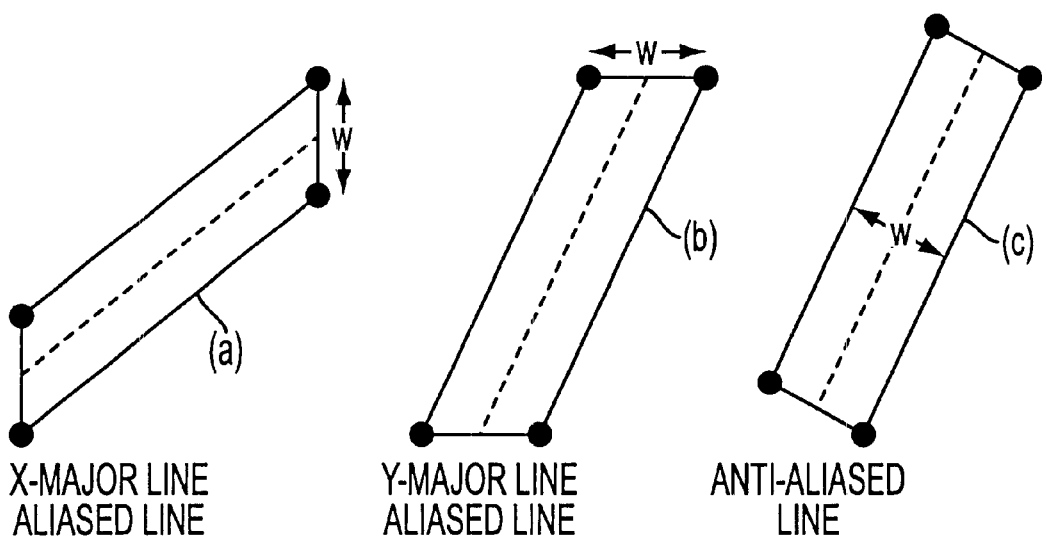
FIG. 16A X-MAJOR LINE ALIASED LINE
FIG. 16B Y-MAJOR LINE ALIASED LINE
FIG. 16C ANTI-ALIASED LINE

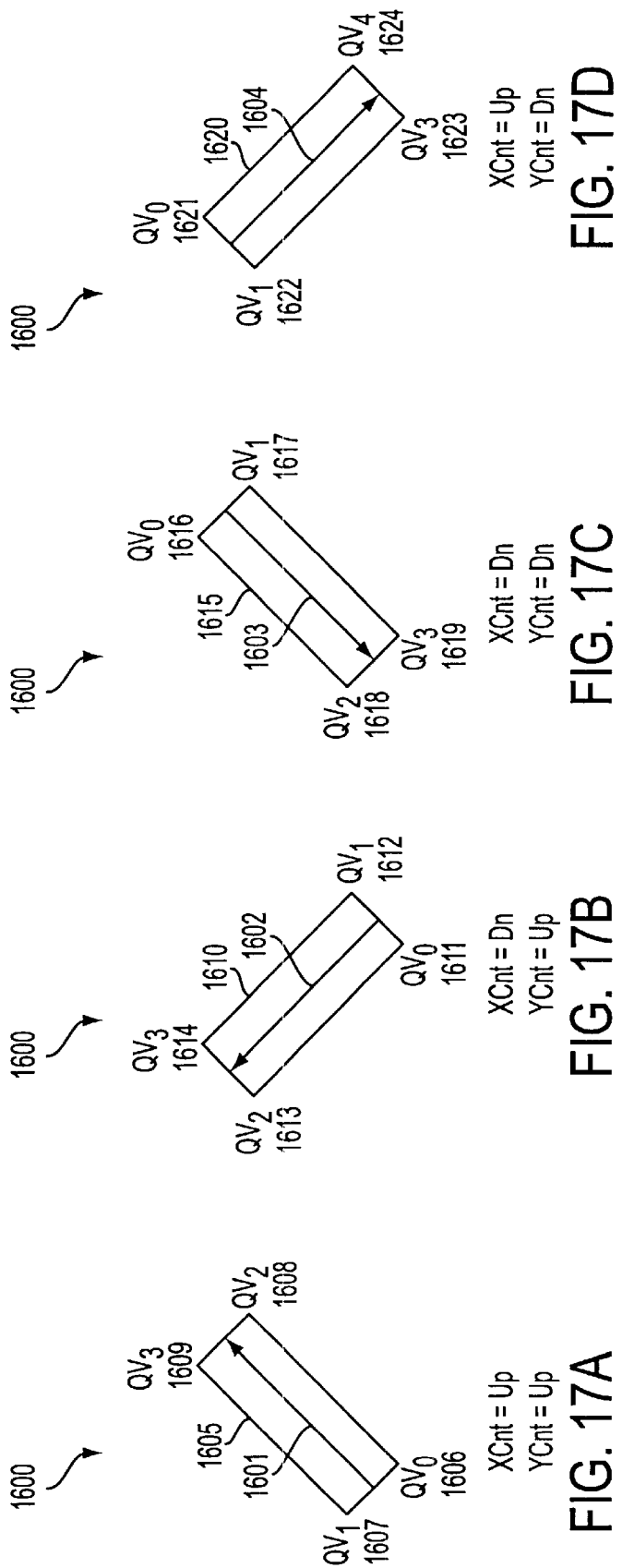

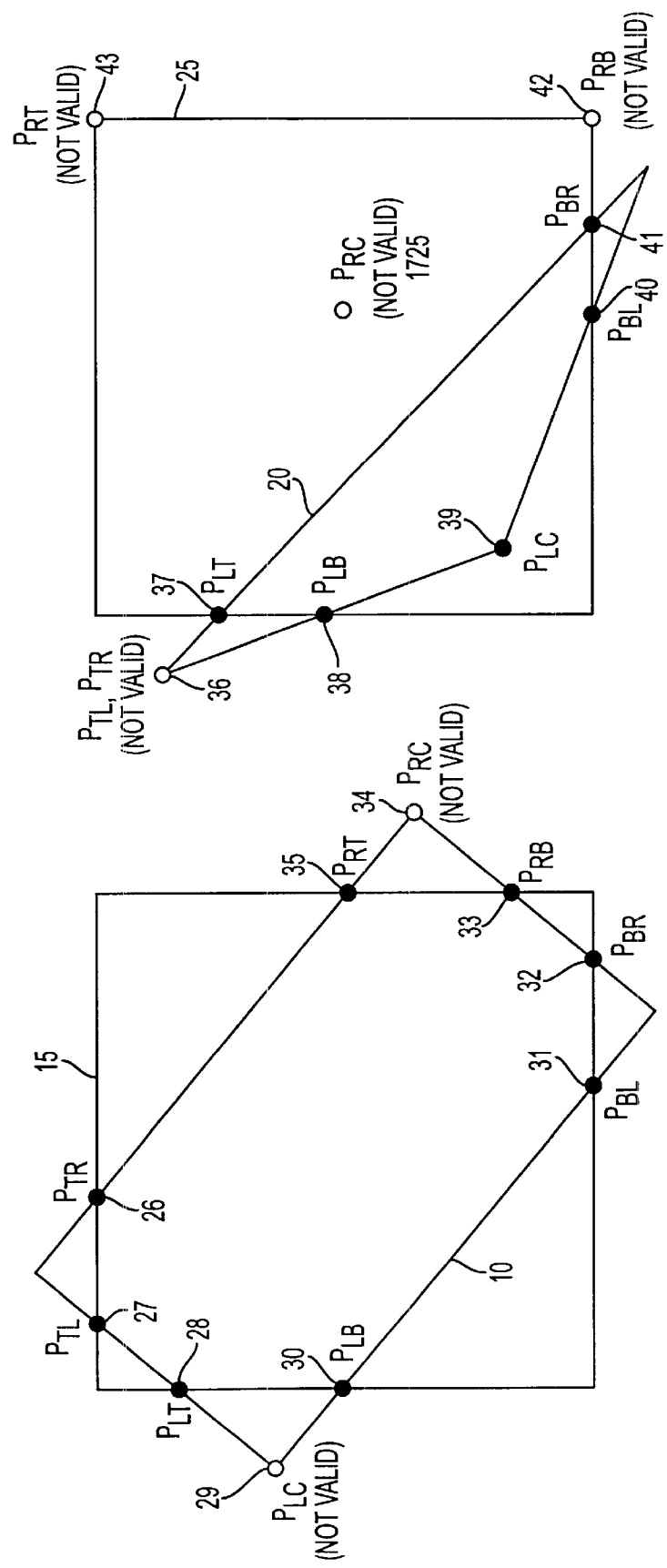

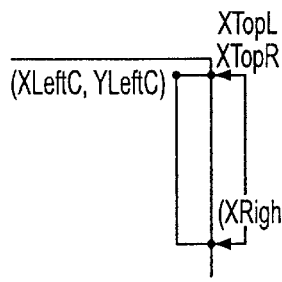
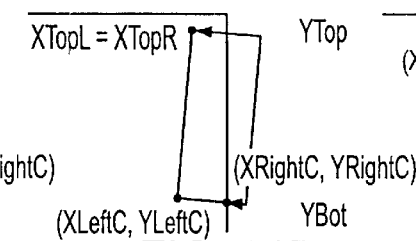
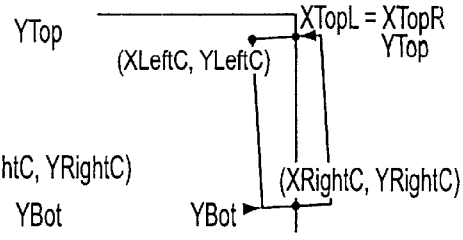
FIG. 21A  FIG. 21B  FIG. 21C
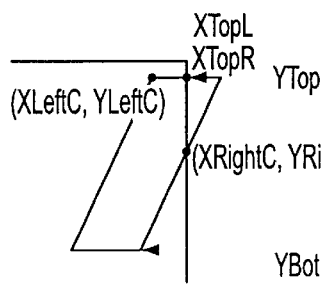
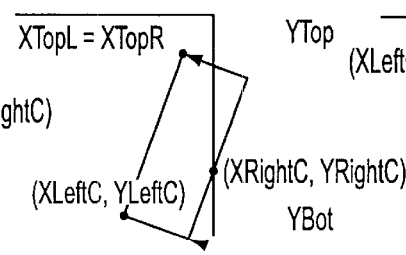
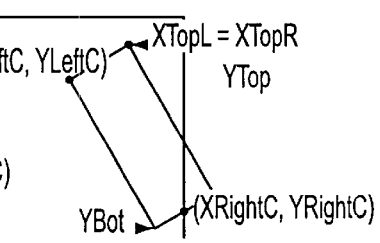
FIG. 21D  FIG. 21E  FIG. 21F
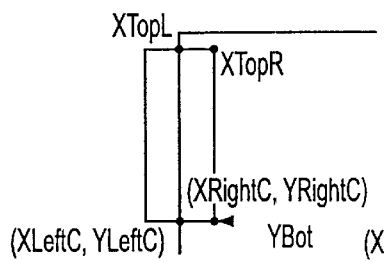
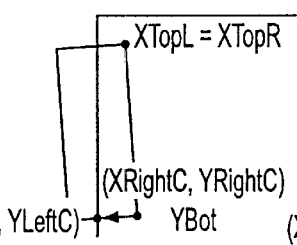
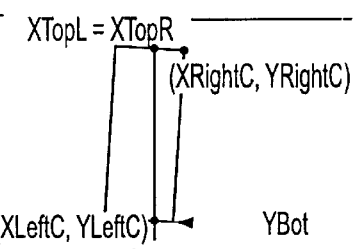
FIG. 21G  FIG. 21H  FIG. 21I
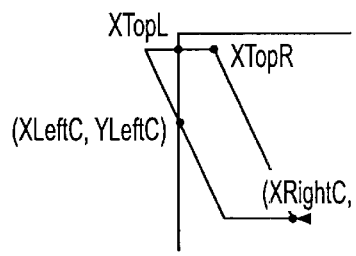
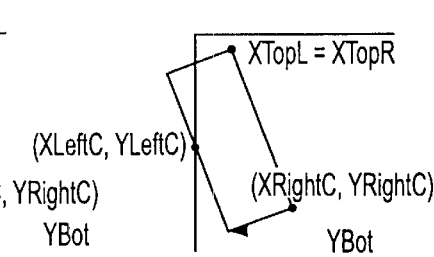
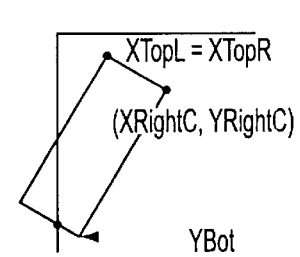
FIG. 21J  FIG. 21K  FIG. 21L

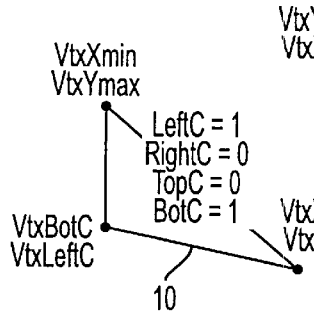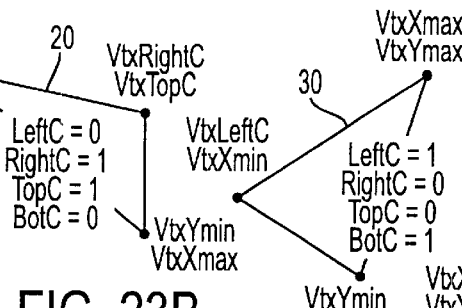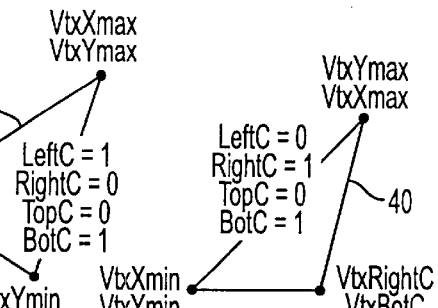
FIG. 23A  FIG. 23B  FIG. 23C  FIG. 23D
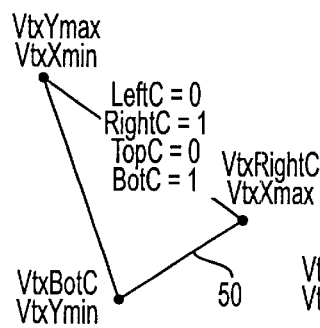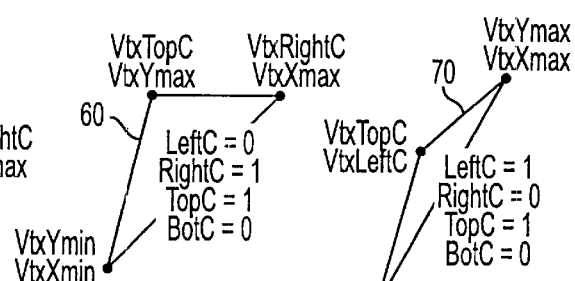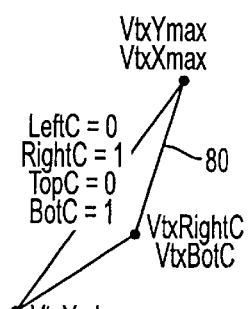
FIG. 23E  FIG. 23F  FIG. 23G  FIG. 23H
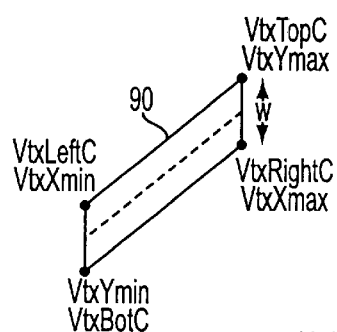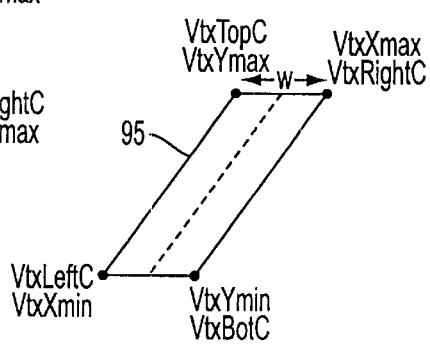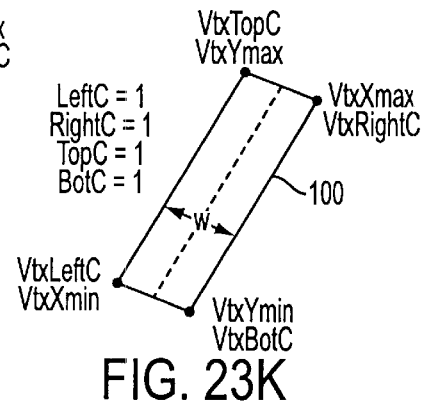
FIG. 23I  FIG. 23J  FIG. 23K

APPARATUS AND METHOD FOR PERFORMING SETUP OPERATIONS IN A 3-D GRAPHICS PIPELINE USING UNIFIED PRIMITIVE DESCRIPTORS

RELATED APPLICATIONS

This application claims the benefit under 35 USC Section 119(e) of U.S. Provisional Patent Application Ser. No. 60/097,336 filed Aug. 20, 1998 and entitled GRAPHICS PROCESSOR WITH DEFERRED SHADING; which is hereby incorporated by reference.

This application also claims the benefit under 35 USC Section 120 of:

U.S. Ser. No. 09/213,990, filed Dec. 17, 1998, entitled HOW TO DO TANGENT SPACE LIGHTING IN A DEFERRED SHADING ARCHITECTURE;

Ser. No. 09/378,633, filed Aug. 20, 1999 entitled SYSTEM, APPARATUS AND METHOD FOR SPATIALLY SORTING IMAGE DATA IN A THREE-DIMENSIONAL GRAPHICS PIPELINE;

Ser. No. 09/378,439 filed Aug. 20, 1999, entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No. 09/379,144, filed Aug. 20, 1999 entitled APPARATUS AND METHOD FOR GEOMETRY OPERATIONS IN A 3D GRAPHICS PIPELINE;

Ser. No. 09/372,137, filed Aug. 20, 1999 entitled APPARATUS AND METHOD FOR FRAGMENT OPERATIONS IN A 3D GRAPHICS PIPELINE;

Ser. No. 09/378,637, filed Aug. 20, 1999, entitled DEFERRED SHADING GRAPHICS PIPELINE PROCESSOR;

Ser. No. 09/377,503, filed Aug. 20, 1999, entitled DEFERRED SHADING GRAPHICS PIPELINE PROCESSOR HAVING ADVANCED FEATURES;

Ser. No. 09/378,391, filed Aug. 20, 1999, entitled METHOD AND APPARATUS FOR PERFORMING CONSERVATIVE HIDDEN SURFACE REMOVAL IN A GRAPHICS PROCESSOR WITH DEFERRED SHADING; and Ser. No. 09/378,299, filed Aug. 20, 1999, entitled DEFERRED SHADING GRAPHICS PIPELINE PROCESSOR, now U.S. Pat. No. 6,229,553.

FIELD OF THE INVENTION

The present invention relates generally to computer structure and method for processing three-dimensional ("3-D") computer graphics in a 3-D graphics processor. More particularly, the present invention is directed to a computer structure and method for performing setup operations in a tiled graphics pipeline architecture using unified primitive descriptors, post tile sorting setup, and tile relative x-values and screen relative y-values.

BACKGROUND OF THE INVENTION

The art and science of three-dimensional ("3-D") computer graphics concerns the generation, or rendering, of two-dimensional ("2-D") images of 3-D objects for display or presentation onto a display device or monitor, such as a Cathode Ray Tube or a Liquid Crystal Display. The object may be a simple geometry primitive such as a point, a line segment, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive must be processed through a series of operations, or processing stages in a graphics rendering pipeline. A generic pipeline is merely a series of cascading processing units, or stages wherein the output from a prior stage, serves as the input for a subsequent stage. In the context of a graphics processor, these stages include, for example, per-vertex operations, primitive assembly operations, pixel operations, texture assembly operations, rasterization operations, and fragment operations.

The details of the various processing stages, except where otherwise noted, are not necessary to practice the present invention, and for that reason, will not be discussed in greater detail herein. A summary of the common processing stages in a conventional rendering pipeline can be found in the following standard reference: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0, which is hereby incorporated by reference for background purposes only.

Very few conventional graphics pipelines have tiled architectures. A tiled architecture is a graphic pipeline architecture that associates image data, and in particular geometry primitives, with regions in a 2-D window, where the 2-D window is divided into multiple equally size regions. Tiled architectures are beneficial because they allow a graphics pipeline to efficiently operate on smaller amounts of image data. In other words, a tiled graphics pipeline architecture presents an opportunity to utilize specialized, higher performance graphics hardware into the graphic pipeline.

Those graphics pipelines that do have tiled architectures do not perform mid-pipeline sorting of the image data with respect to the regions of the 2-D window. Conventional graphics pipelines typically sort image data either, in software at the beginning of a graphics pipelines, before any image data transformations have taken place, or in hardware the very end of the graphics pipeline, after rendering the image into a 2-D grid of pixels.

Significant problems are presented by sorting image data at the very beginning of the graphics pipelines. For example, sorting image data at the very beginning of the graphics pipelines, typically involves dividing intersecting primitives into smaller primitives where the primitives intersect, and thereby, creating more vertices. It is necessary for each of these vertices to be transformed into an appropriate coordinate space. Typically this is done by subsequent stage of the graphics pipeline.

Vertex transformation is computationally intensive. Because none of these vertices have yet been transformed into an appropriate coordinate space, each of these vertices will need to be transformed by a subsequent vertex transformation stage of the graphics pipeline into the appropriate coordinates space. Coordinate spaces are known. As noted above, vertex transformation is computationally intensive.

Increasing the number of vertices by subdividing primitives before transformation, slows down the already slow vertex transformation process.

Significant problems are also presented by spatially sorting image data at the end of a graphics pipeline (in hardware). For example, sorting image data at the end of a graphic pipeline typically slows image processing down, because such an implementation typically "texture maps" and rasterizes image data that will never be displayed. To illustrate this, consider the following example, where a first piece of geometry is spatially located behind a second piece of opaque geometry. In this illustration, the first piece of geometry is occluded by the second piece of opaque geometry. Therefore, the first piece of geometry will never be displayed.

To facilitate the removal of occluded primitives, an additional value (beyond color) is typically maintained for each bitmap pixel of an image. This additional value is typically known as a z-value (also known as a "depth value"). The z-value is a measure of the distance from the eyepoint to the point on the object represented by the pixel with which the z-value corresponds. Removing primitives or parts of primitives that are occluded by other geometry is beneficial because it optimizes a graphic pipeline by processing only those image data that will be visible. The process of removing hidden image data is called culling.

Those tiled graphics pipelines that do have tiled architectures do not perform culling operations. Because, as discussed in greater detail above, it is desirable to sort image data mid-pipeline, after image data coordinate transformations have taken place, and before the image data has been texture mapped and/or rasterized, it is also desirable to remove hidden pixels from the image data before the image data has been texture mapped and/or rasterized. Therefore, what is also needed is a tiled graphics pipeline architecture that performs not only, mid-pipeline sorting, but mid-pipeline culling.

In a tile based graphics pipeline architecture, it is desirable to provide a culling unit with accurate image data information on a tile relative basis. Such image data information includes, for example, providing the culling unit those vertices defining the intersection of a primitive with a tile's edges. To accomplish this, the image data must be clipped to a tile. This information should be sent to the mid-pipeline culling unit. Therefore, because a mid-pipeline cull unit is novel and its input requirements are unique, what is also needed, is a structure and method for a mid-pipeline host file sorting setup unit for setting up image data information for the mid-pipeline culling unit.

It is desirable that the logic in a mid-pipeline culling unit in a tiled graphics pipeline architecture be as high performance and streamlined as possible. The logic in a culling unit can be optimized for high performance by reducing the number of branches in its logical operations. For example, conventional culling operations typically include logic, or algorithms to determine which of a primitive's vertices lie within a tile, hereinafter referred to as a vertex/tile intersection algorithm. Conventional culling operations typically implement a number of different vertices/tile intersection algorithms to accomplish this, one algorithm for each primitive type.

A beneficial aspect of needing only one such algorithm to determine whether a line segment's or a triangle's vertices lie within a tile, as compared requiring two such algorithms (one for each primitive type), is that total number of branches in logic implementing such vertex/tile intersection algorithms are reduced. In other words, one set of algorithms/set of equations/set of hardware could be used to perform the vertex/tile intersection algorithm for a number of different primitive types. In light of this, it would be advantageous to have a procedure for representing different primitives, such as, for example, a line segment and a triangle, as a single primitive type, while still retaining each respective primitive type's unique geometric information. In this manner, the logic in a mid-pipeline culling unit in a tiled graphics pipeline architecture could be streamlined.

Other stages of a graphics pipeline, besides a culling unit, could also benefit in a similar manner from a procedure for representing different primitives as a single primitive type, while still retaining each respective primitive type unique geometric information. For example, a processing stage that sets up information for a culling unit could also share a set of algorithms/set of equations/set of hardware for calculating different primitive information.

In conventional tile based graphics pipeline architectures, geometry primitive vertices, or x-coordinates and y-coordinates, are typically passed between pipeline stages in screen based coordinates. Typically x-coordinates and y-coordinates are represented as integers having a limited number of fractional bits (sub pixel bits).

Because it is desirable to architect a tile based graphics pipeline architecture to be as streamlined as possible, it would be beneficial to represent x-coordinates and y-coordinates in with a smaller number of bits to reduce the amount of data being sent to a subsequent stage of the graphics pipeline. Therefore, what is needed is a structure and method for representing x-coordinates and y-coordinates in a tile based graphics pipeline architecture, such the number of bits required to pass vertice information to subsequent stages of the graphics pipeline is reduced.

SUMMARY OF THE INVENTION

Heretofore, tile based graphics pipeline architectures have been limited by sorting image data either prior to the graphics pipeline or in hardware at the end of the graphics pipeline, no tile based graphics pipeline architecture culling units, no mid-pipeline post tile sorting setup units to support tile based culling operations, and larger vertices memory storage requirements.

The present invention overcomes the limitations of the state-of-the-art by providing structure and method in a tile based graphics pipeline architecture for: (a) a mid-pipeline post tile sorting setup unit that supplies a mid-pipeline cull unit with tile relative image data information; (b) a unified primitive descriptor language for representing triangles and line segments as quadrilaterals and thereby reducing logic branching requirements of a mid-pipeline culling unit; and, (c) representing each of a primitive's vertices in tile relative y-values and screen relative x-values, and thereby reducing the number of bits that need to be passed to subsequent stages of the graphics pipeline accurately, and efficiently represent a primitive's vertices.

In summary, a mid-pipeline setup unit is one processing stage of a tile based 3-D graphics pipeline. The mid-pipeline setup unit processes image data in preparation for a subsequent mid-pipeline culling unit. A mid-pipeline sorting unit, previous to the mid-pipeline setup unit has already sorted the image data with respect to multiple tiles comprising a 2-D window. The image data including vertices describing a primitive.

In particular, the mid-pipeline setup unit is adapted to determine a set of clipping points that identify an intersection of the primitive with the tile, and also adapted to compute a minimum depth value for that part of the primitive intersecting the tile.

In yet another embodiment of the present invention the primitives x-coordinates are screen based and the y-coordinates are tile based.

In yet another embodiment of the present invention, the mid-pipeline setup unit is adapted to represent line segments and triangles as rectangles. Both line segments and triangles in this embodiment are described with respective sets of four vertices. In the case of triangles, not all of the vertices are needed to describe the triangle, one vertice will be will be degenerate, or not described.

BRIEF DESCRIPTION OF THE DRAWINGS

Additional objects and features of the invention will be more readily apparent from the following detailed description and appended claims when taken in conjunction with the drawings, in which:

FIG. 9 illustrates use of triangle slope assignments according to an embodiment of the present invention;

FIG. 15 illustrates aspects of line segment quadrilateral generation according to embodiment of the present invention;

FIG. 16 illustrates examples of x-major and y-major line orientation with respect to aliased and anti-aliased lines according to an embodiment of the present invention;

FIG. 17 illustrates presorted vertex assignments for quadrilaterals;

FIG. 18 illustrates a primitives clipping points with respect to the primitives intersection with a tile;

FIG. 21 illustrates examples of quadrilaterals having vertices that lie outside of a 2-D window range;

DETAILED DESCRIPTION OF PREFERRED EMBODIMENTS OF THE INVENTION

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims. We first provide a top-level system architectural description. Section headings are provided for convenience and are not to be construed as limiting the disclosure, as all various aspects of the invention are described in the several sections that were specifically labeled as such in a heading.

Pseudocode examples are presented in this detailed description to illustrate procedures of the present invention. The pseudocode used is, essentially, a computer language using universal computer language conventions. While the pseudocode employed in this description has been invented soleyly for the purposes of this description, it is designed to be easily understandable by any computer programmer skilled in the art.

For the purpose of explanation, the numerical precision of the calculations of the present invention are based on the precision requirements of previouse and subsequent stages of the graphics pipeline. The numerical precision to be used depends on a number of factors. Such factors include, for example, order of operations, number of operations, screen size, tile size, buffer depth, sub pixel precision, and precision of data. Numerical precision issues are known, and for this reason will not be described in greater detail herein.

5.1 System Overview

Significant aspects of the structure and method of the present invention include:

(1) a mid-pipeline post tile sorting setup that supports a mid-pipeline sorting unit and supports a mid-pipeline culling unit; (2) a procedure for uniformly describing primitives that allows different types of primitives to share common sets of algorithms/equations/hardware elements in the graphics pipeline; and, (3) tile-relative y-values and screen-relative x-values that allow representation of spatial data on a region by region bases that is efficient and feasable for a tiled based graphic pipeline architecture, Each of these significant aspects are described in greater detail below.

Figure 1:
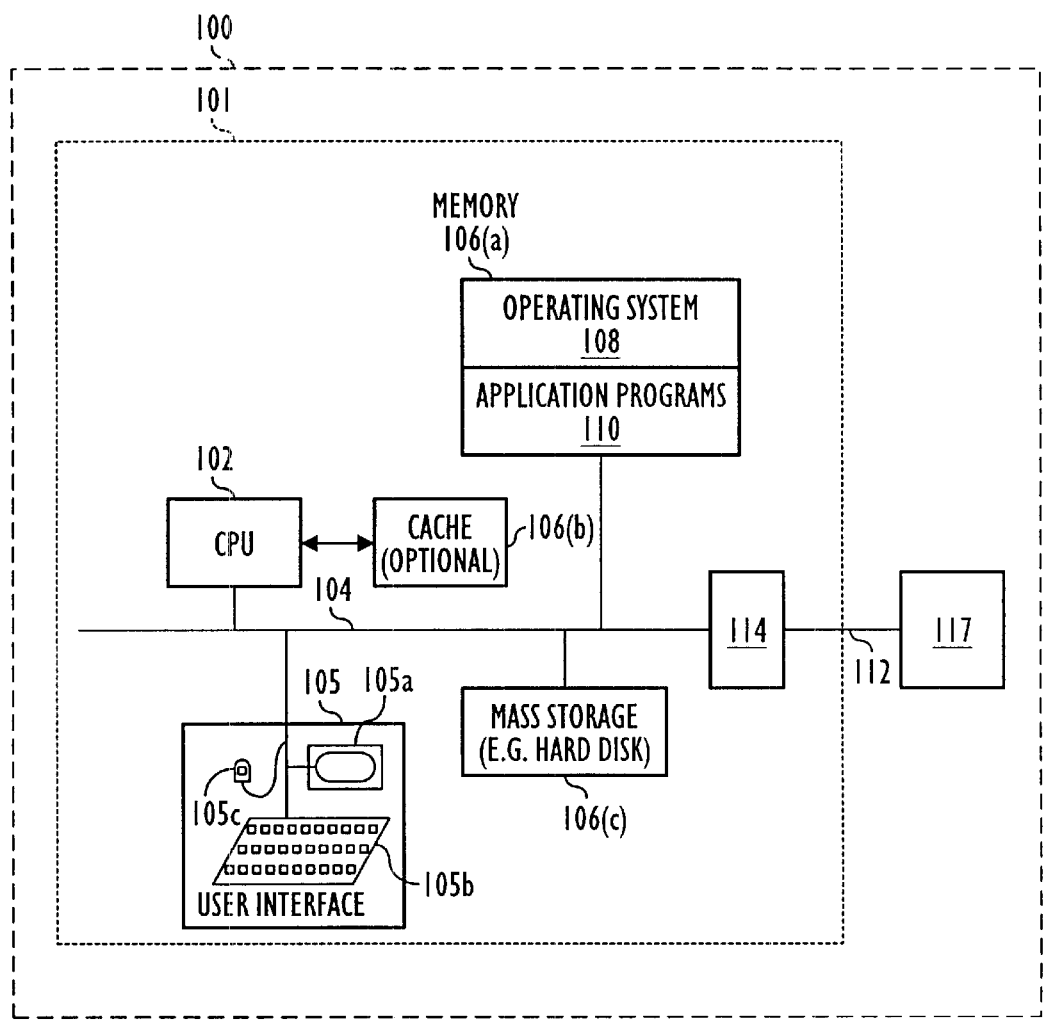
FIG. 1 is a block diagram illustrate aspects of a system according to an embodiment of the present invention, for performing setup operations in a 3-D graphics pipeline using unified primitive descriptors, post tile sorting setup, tile relative y-values, and screen relative x-values.

Referring to FIG. 1, there is shown an embodiment of system 100, for performing setup operations in a 3-D graphics pipeline using unified primitive descriptors, post tile sorting setup, title relative x-values, and screen relative y-values. In particular, FIG. 1 illustrates how various software and hardware elements cooperate with each other, System 100, utilizesa programmed general-purpose computer 101, and 3-D graphics processor 117. Computer 101 is generally conventional in design, comprising: (a) one or more data processing units ("CPUs") 102; (b) memory 106a, 106b and 106c, such as fast primary memory 106a, cache memory 106b, and slower secondary memory 106c, for mass storage, or any combination of these three types of memory; (c) optional user interface 105, including display monitor 105a, keyboard 105b, and pointing device 105c; (d) graphics port 114, for example, an advanced graphics port ("AGP"), providing an interface to specialized graphics hardware; (e) 3-D graphics processor 117 coupled to graphics port 114 across I/O bus 112, for providing high-performance 3-D graphics processing; and (e) one or more communication buses 104, for interconnecting CPU 102, memory 106, specialized graphics hardware 114, 3-D graphics processor 117, and optional user interface 105.

I/O bus 112 can be any type of peripheral bus including but not limited to an advanced graphics port bus, a Peripheral Component Interconnect (PCI) bus, industry Standard Architecture (ISA) bus, Extended Industry Standard Architecture (EISA) bus, Microchannel Architecture, SCSI Bus, and the like. In preferred embodiment, I/O bus 112 is an advanced graphics port pro.

The present invention also contemplates that one embodiment of computer 101 may have command buffer (not shown) on the other side of graphics port 114, for queuing graphics hardware I/O directed to graphics processor 117.

Memory 106a typically includes operating system 108 and one or more application programs 110, or processes, each of which typically occupies a separtate basic system services, including, for example, support for an Application Program Interface ("API") for accessing 3-D graphics API's such as Graphics Device Interface, DirectDraw/Direct3-D and OpenGL. DirectDraw/Direct3-D, and OpenGL are all well-known APIs, and for that reason are not discussed in greater detail herein. The application programs 110 may, for example, include user level programs for viewing and manipulating images.

It will be understood that a laptop or other type of computer, a workstation on a local area network connected to a server, or a dedicated gaming console can be used instead of computer can also be used in connection with the present invention. Accordingly, it should be apparent that the details of computer 101 are not particularly relevant to the present invention. Personal computer 101 simply serves as a convenient interface for receiving and transmitting messages to 3-D graphics processor 117.

Figure 2:
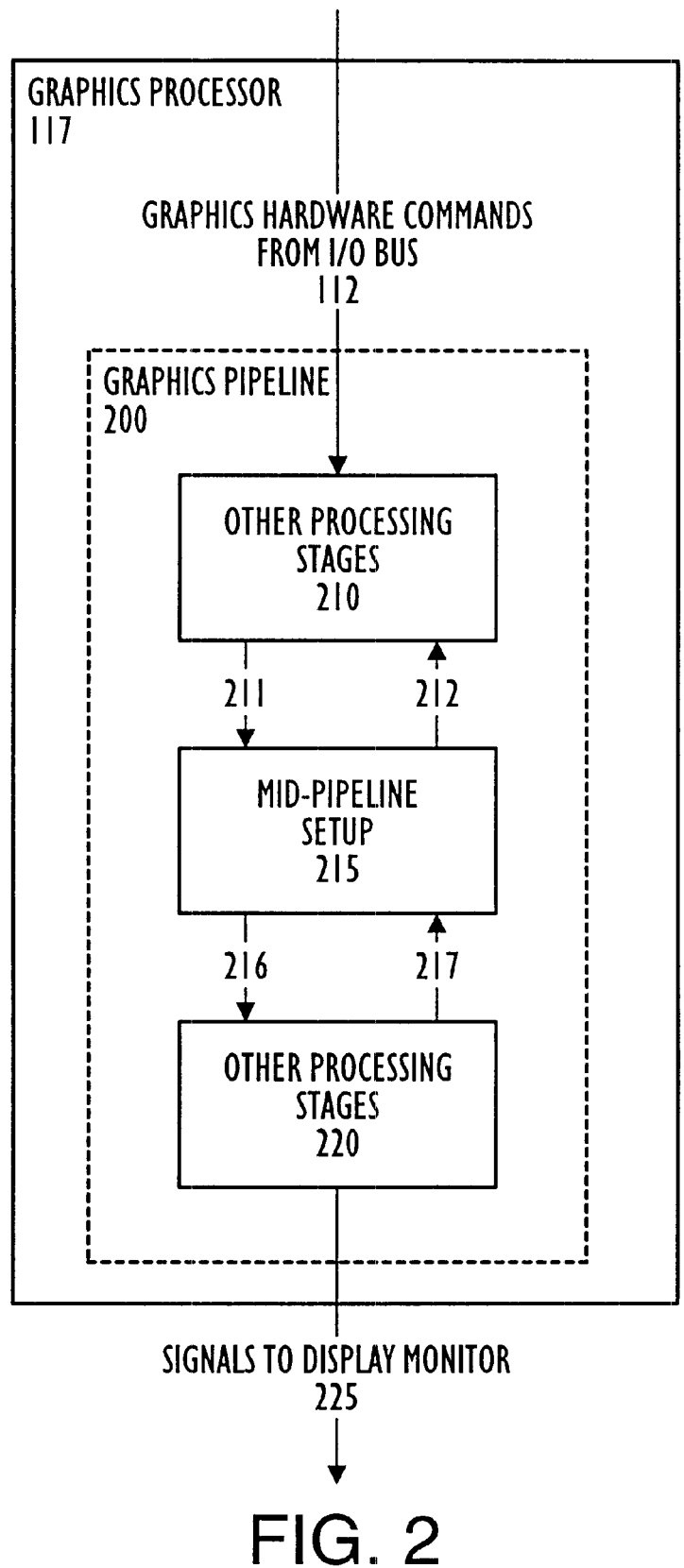
FIG. 2 is a block diagram illustrating aspects of a graphics processor according to an embodiment of the present invention, for performing setup operations in a 3-D graphics pipeline using unified primitive descriptors, post tile sorting setup, tile relative y-values, and screen relative x-values.

Referring to FIG. 2, there is shown an exemplary embodiment of 3-D graphics processor 117, which may be provided as a separate PC Board within computer 101, as a processor intergrated onto the motherboard of computer 101, or as a stand-alone processor, coupled to graphics port 114 across I/O bus 112, or other communication link.

Setup 215 is implemented as one processing stage of multiple processing stages in graphics processor 117. (Setup 215 corresponds to "setup stage 8000," as illustrated in U.S. Provisional Patent Application Serial No. 60.097.336).

Setup 215 is connected to other processing stages 210 across internal bus 211 and signal line 212. Setup 215 is connected to other processing stages 220 across internal bus 216 and signal line 217. Internal bus 211 and internal bus 216 can be any type of peripheral bus including but not limited to a Peripheral Component Interconnect (PCI) bus, Industry Standard Architecture (ISA) bus, Extended Industry Standard Architecture (EISA) bus, Microchannel Architecture, SCSI Bus, and the like. In preferred embodiment, internal bus 211 is dedicated on-chip bus.

5.1.1 Other Processing Stages 210

Figure 3:
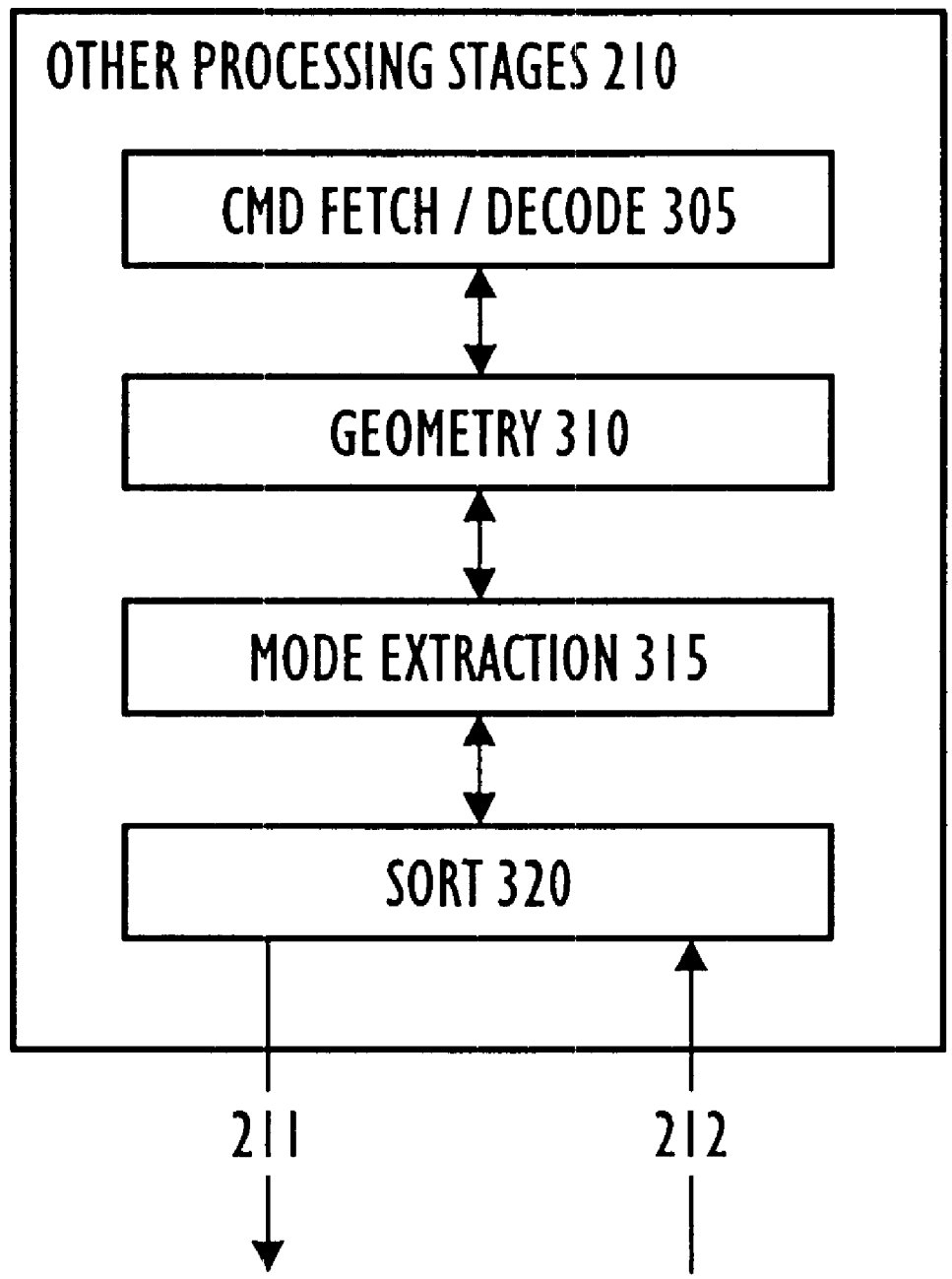
FIG. 3 is a block diagram illustrating other processing stages 210 of graphics pipeline 200 according to a preferred embodiment of the present invention.

Referring to FIG. 3, there is shown an example of a preferred embodiment of other processing stages 210, including, command fetch and decode 305, geometry 310, mode extraction 315, and sort 320. We will now briefly discuss each of these other processing stages 210.

Cmd Fetch/Decode 305, or "CFD 305" handles communications with host computer 101 through graphics port 114. CFD 305 sends 2-D screen based data, such as bitmap blit window operations, directly to backend 440 (see FIG. 4), because 2-D data of this type does not typically need to be processed further with respect to the other processing stage in other processing stages 210 or Other Processing Stages 220. All 3-D operation data (e.g., necessary transform matrices, material and light parameters and other mode settings) are sent by CFD 305 to the geometry 310.

Geometry 310 preforms calculations that pertain to displaying frame geometric primitives, hereinafter, often referred to as "primitives," such as points, line segments, and triangles, in a 3-D model. These calculations include transformations, vertex lighting, clipping, and primitive assembly. Geometry 310 sends "properly oriented" geometry primitives to mode extraction 315.

Mode extraction 315 separates the input data stream from geometry 310 into two parts: (1) spatial data, such as frame geometry coordinates, and any other information needed for hidden surface removal; and, (2) non-spatial data, such as color, texture, and lighting information. Spatial data are sent to sort 320. The non-spatial data are stored into polygon memory (not shown). (Mode injection 415 (see FIG. 4) with pipeline 200).

Sort 320 sorts vertices and mode information with respect multiple regions in a 2-D window. Sort 320 outputs the spatially sorted vertices and mode information on a region-by-region basis setup 215.

The details of processing stages 210 are not necessary to practice the present invention, and for that reason other processing stages 210 are not discussed in further detail here.

5.1.2 Other Processing Stages 220

Figure 4:
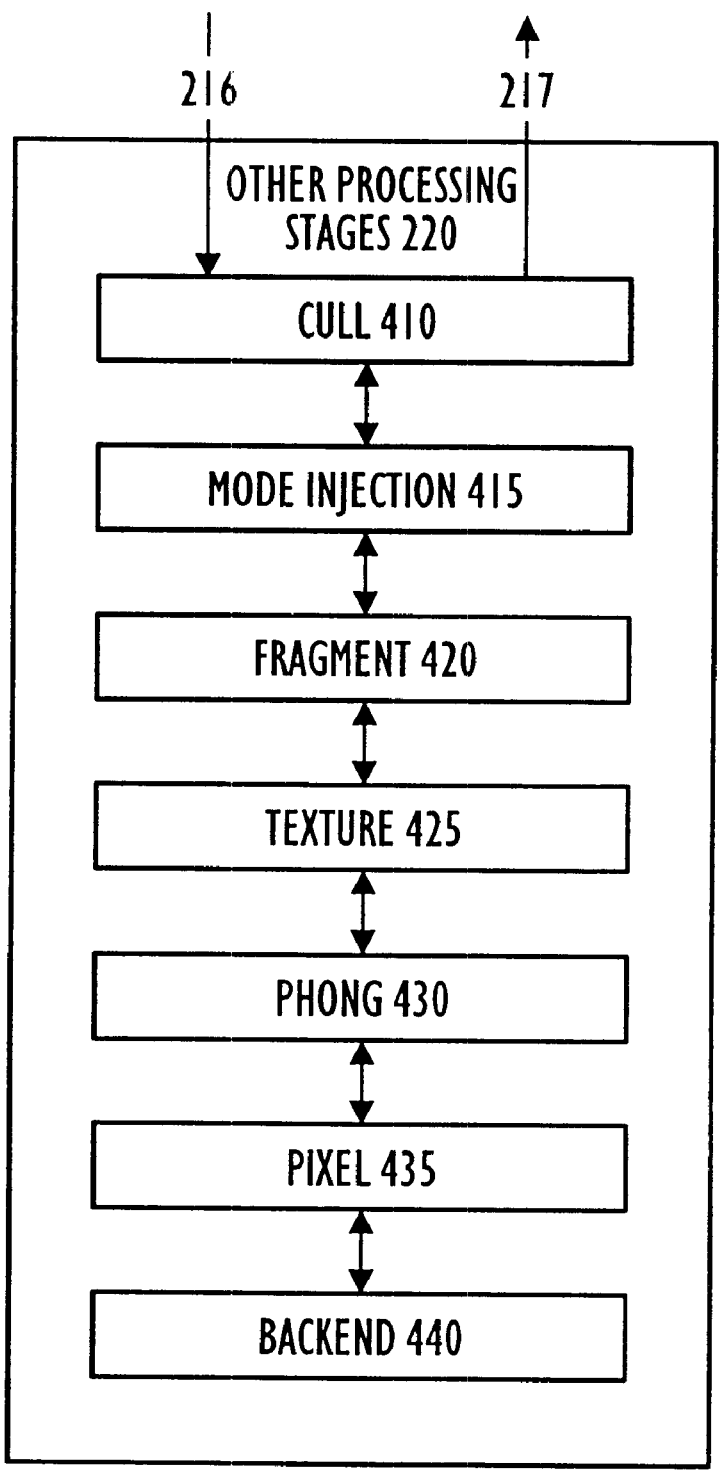
FIG. 4 is a block diagram illustrate Other Processing Stages 220 of graphics pipeline 200 according to a preferred embodiment of the present invention.

Referring to FIG. 4, there is shown an example of a preferred embodiment of other processing stages 220, including, cull 410, mode injection 415, fragment 420, texture 425, Phong Lighting 430, pixel 435, and backend 440. The details of each of the processing stages in Other Processing Stages 220 is not necessary to practice the present invention. However, for purposes of completeness, we well now briefly discuss each of these processing stages.

Cull 410 receives data from a previous stage in the graphics pipeline, such as setup 405, in region-by-region order, and discards any primitives, or parts of perimitives that definitely do not contribute to and rendered image. Cull 410 outputs spatial data that are not hidden by previously processed geometry.

Mode injection 415 retrieves mode information (e.g., colors, material properities, etc . . . ) from polygon memory, such as other memory 235, and passes it to a next stage in graphics pipeline 200, such as fragment 420, as required. Fragment 420 interprets color values for Gouraud shading, surface normals for Phong shading, texture coordinates for texture mapping, and interpolates surface tangents for use in a bump mapping algorithm (if required).

Texture 425 applies texture maps, stored in a texture memory, to pixel fragments. Phong 430 uses the material and lighting information supplied by mode injection 425 to perform Phong shading for each pixel fragment. Pixel 435 receives visible surface portions and the fragment colors and generates the final picture. And, backend 139 receives a tile's worth of data at a time from pixel 435 and stores the data into a frame display buffer.

5.2 Setup 215 Overview

Setup 215 receives a stream of image data from a previous processing stage of pipeline 200 In a preferred embodiment of the present invention the previous processing stage is sort 320 (see FIG. 3). These image data include spatial information about geometric primitives (hereinafter, often referred to as "primitives") to be rendered by pipeline 200. The primitives received from sort 320 can include, for example, filled triangles, line triangles, lines, stippled lines, and points. These image data also include mode information, information that does not necessarily apply to any one particular primitive, but rather, probably applies to multiple primitives. Mode information is not processed by the present invention, but simply passed through to a subsequent stage of pipeline 200, for example, cull 410, and for this reason will not be discussed further detail herein.

By the time that setup 215 receives the image data from Sort 320, the primitives have already been sorted by sort 320, with respect to regions in a 2-D window that are intersected by the respective primitives. Setup 215 receives this image data on a region-by-region basis. That is to say that all primitives that intersect a respective region will be sent to setup 215 before all the primitives that intersect a different respective region are sent to setup 215, and so on. This means that sort 320 may send the same primitive many times, once for each region it intersects, on "touches." In a preferred embodiment of the present invention, each region of the 2-D window is rectangular tile.

Setup 215 receives the image data from sort 320 either organized in "time order" or in "sorted transparency order." In time order, the time order of receipt by all previous processing stages of pipeline 200 of the verices and modes within each tile is preserved. That is, for a given tile, vertices and modes are read out of previous stages of pipeline 200 just as they were received, with the exception of when sort 320 is in sorted transparency mode.

For purposes of explanation, in sorted transparency mode, "guaranteed opaque" primitives are received by setup 215 first, before setup 215 receives potentially transparent geometry. In this context, guaranteed opaque means that a primitive completely obscures more distant primitives that occupies the same spatial are in a window. Potentially transparent geometry is any geometry that is not guaranteed opaque.

Setup 215 prepares the incoming image data for processing by cull 410. Setup 215 processes one tile's worth of image data, on primitive at a time. When it's done processing a primitive, it sends the data to cull 420 (see FIG. 4) in the form of a primitive packet 6000 (see Table 6). Each primitive packet 6000 output from setup 215 represents on primitive: a triangle, line segment, or point. We now briefly describe cull 410 (see FIG. 4) so that the preparatory processing performed by setup 215 )in anticipation of culling) may be more readily understood.

Cull 410 produces the visible stamp portions, or "VSPs" used by subsequent processing stages in pipeline 200. In a preferred embodiment of the present invention, a stamp is a region two pixels by two pixels in dimension; one pixel contains four sample points; and, one tile has 16 stamps (8×8). However, according to the teaching of the present invention, any convenient number of pixels in a stamp, sample, points in a pixel, and pixels in a tile may be used.

Cull 410 receives image data from setup 215 in tile order )in fact in the order that setup 215 receives the image data from sort 320), and culls out those primitives and parts of primitives that definitely do not contribute to a rendered image. Cull 410 accomplishes this in two stages, the MCCAM cull 410 stage and the Z cull 410 stage. MCCAM cull 410, allows detection of those memory elements in a rectangualr, spatially addressable memory array whose "content" (depth values) are greater than a given value. Spatially addressable memory is known.

To prepare the incoming image data for processing by MCCAM cull, setup 215, for each primitive: (a) determines the dimensions of a tight; and, (b) computes a minimum depth value "Zmin," for that part of the primitive that intersects the tile. This is beneficial because MCCAM cull 410 uses the dimensions of the bounding box and the minimum depth value to determine which of multiple "stamps," each stamp lying within the dimensions of the bounding box, may contain depth values less than Zmin. The procedures for determining the dimensions of a bounding box and the procedures for producing a minimum depth value are described in greater detail below. (For purposes of simplifying the description, those stamps that lie within the dimensions of the bounding box are hereinafter, referred to as "candidate stamps.")

Z cull 410 refines the work performed by MCCAM cull 410 in the process of determining which samples are visible, by taking these candidates stamps, and if they are part of the primitive, computing the actual depth value for samples in that stamp. This more accurate depth value is then compared, on a sample-by-sample basis, to the z-values stored in a z-buffer memory in cull 410 to determine if the sample is visible. A sample-by-sample basis simply means that each sample is compared individually, as compared to a step where a whole bounding box is compared at once.

For those primitives that are lines and triangles, setup 215 also calculates spatial derivatives. A spatial derivative is a partial derivative of the depth value. Spatial derivatives are also known as Z-slopes, or depth gradients. As discussed above, the minimum depth value and a bounding box are utilized by MCCAM cull 410. Setup 215 also determines a reference stamp in the bounding box (discussed in greater detail below in section 5.4.10). The depth gradients and zref used by Z-cull 410. Line (edge) slopes, intersections, and corners (top and bottom) are used by Z-cull 410 for edge walking.

5.2.1 Interface I/O With Other Processing Stages of the Pipeline

Setup 215 interfaces with a previous stage of pipeline 200, for example, sort 320 (see FIG. 3), and a subsequent stage of pipeline 200, for example, cull 410 (see FIG. 4). We now discuss sort 320 out put packets.

5.2.1.1 Sort 320 Setup 215 Interface

Referring to table 1, there is shown an example of a begin frame packet 1000, for delimiting the beginning of a frame of image data. Begin frame packet 1000 is received by setup 215 from sort 320. Referring to table 2, there is shown an example of a begin tile packet 2000, for delimiting the beginning of that particular tile's worth of image data.

Referring to table 4, there a shown an example of a clear packet 4000, for indicating a buffer clear event. Referring to table 5, there is shown an example of a cull packet 5000, for indicating, among other things the packet type 5010. Referring to table 6, there is shown an example of an end frame packet 6000, for indicating by sort 320, the end of a frame of image data. Referring to table 7, there is shown an example of a primitive packet 7000, for identifying information with respect to a primitive. Sort 320 sends on primitive packet 7000 to setup 215 for each primitive.

5.2.1.2 Setup 215 Cull 410 Interface

Referring to table 8, there is shown an example of a setup output primitive packet 8000, for indicating to a subsequent stage of pipeline 200, for example, cull 410, a primitive's information, including, information determined by setup 215. Such setup 215 determined information is discussed in greater detail below.

5.2.2 Setup Primitives

To set the context of the present invention, we briefly describe geometric primitives, including, for example, polygons, lines, and points.

5.2.2.1 Polygons

Polygons arriving at setup 215 are essentially triangels, either filled triangles or line mode triangles. A filled triangle is expressed as three vertices. Whereas, a line mode triangle is treated by setup 215 as three individual line segments. Setup 215 receives window coordinates (x, y, z) defining three triangle vertices for both line mode triangles and for filled triangles. Note that the aliased state of the polygon (either aliased or anti-aliased) does not alter the manner in which filled polygon setup is performed by setup 215. Line mode triangles are discussed in greater detail below.

5.2.2.2 Lines

Line segments arriving at setup 215 essentially comprise a width, and two end points. Setup 215 does not modify the incoming line widths. A line segment may be stippled. A line segment may be aliased or anti-aliased. a preferred embodiment of the present invention, a line's width is determined prior to setup 215. For example, it can be determined on a 3-D graphics processing application executing on computer 101 (see FIG. 1).

5.2.2.3 Points

Pipeline 200 renders anti-aliased points as circles and aliased points as squares. Both circles and squares have a width. In a preferred embodiment of the present invention, the determination of a point's size and position are determined in a previous processing stage of pipeline 200, for example, geometry 310.

5.3 Unified Primitive Description

Under the rubric of a unified primitive, we consider a linge segment primitive to be a recatangle and a triangle to be degenerate rectangle, and each is represented mathematically as such. We now discuss a procedure for uniformly describing primitives that allows different types of primitives to share common sets of algorithms/equations/ hardware elements in the graphics pipeline.

Setup 215 describes each primitive with a set of four vertices. Note that not all vertex values are needed to describe all primitives. To describe a triangle, setup 215 uses a triangle's top vertex, and either left corner vertex or right corner vertex, depending on the triangle's orientation. A line segment, is treated as a parallelogram, so setup 215 uses all four veritces to describe a line segment. FIG. 16 shows example of quadrilaterals generated for line segments. Note that quadrilaterals are generated differently for aliased and anti-aliased lines. For aliased lines a quadrilateral's vertices also depend on whether the line is x-major or y-major. Note also that while a triangle's vertices are the same as its original vertices, setup 215 generates new vertices to represent a line segment as parallelogram.

The unified representation of primitives uses two sets of descriptors to represent a primitive. The first set includes vertex descriptors, each of which are assigned to the original set of vertices in window coordinates. Vertex descriptors include, VtxYMin, VtxYmax, VtxXmin and VtxXmax. The second set of descriptors are flag descriptors, or corner flags, used by setup 215 to indicate which vertex descriptors have valid and meaningful values. Flag descriptors include, VtxLeftC, VtxRightC, LeftCorner, RightCorner, VtxTopC, VtxBotC, TopCorner, and BottormCorner. FIG. 23 illustrates aspects of unified primitive descriptor assignments, including corner flags.

All of these descriptors have valid values for line segment primitives, but all of them may not be valid for triangles. Treating triangles as rectangles according to the teachings of the present invention, involves specifying four vertices, one of which (typically y-left or y-right in one particular embodiment is degenerate and not specified. To illustrate this, refer to FIG. 22, and triangle 20, where a left corner vertex (VtxLeftC) is degenerate, or not defined. With respect to triangle 10, a right corner vertex (VtxRightC) is degenerate. Using primitive descriptors according to the teachings of the present invention to describe triangles and line segments as rectangles provides a nice, uniform way to setup primitives, because the same (or similar) algorithms/ equations/calculations/hardware can be used to operate on different primitives, such as, for example, edge walking algorithm in cull 410 (see FIG. 4), thus allowing for more streamlined implementation of logic. We now describe how the primitive descriptors are determined.

Figure 5:
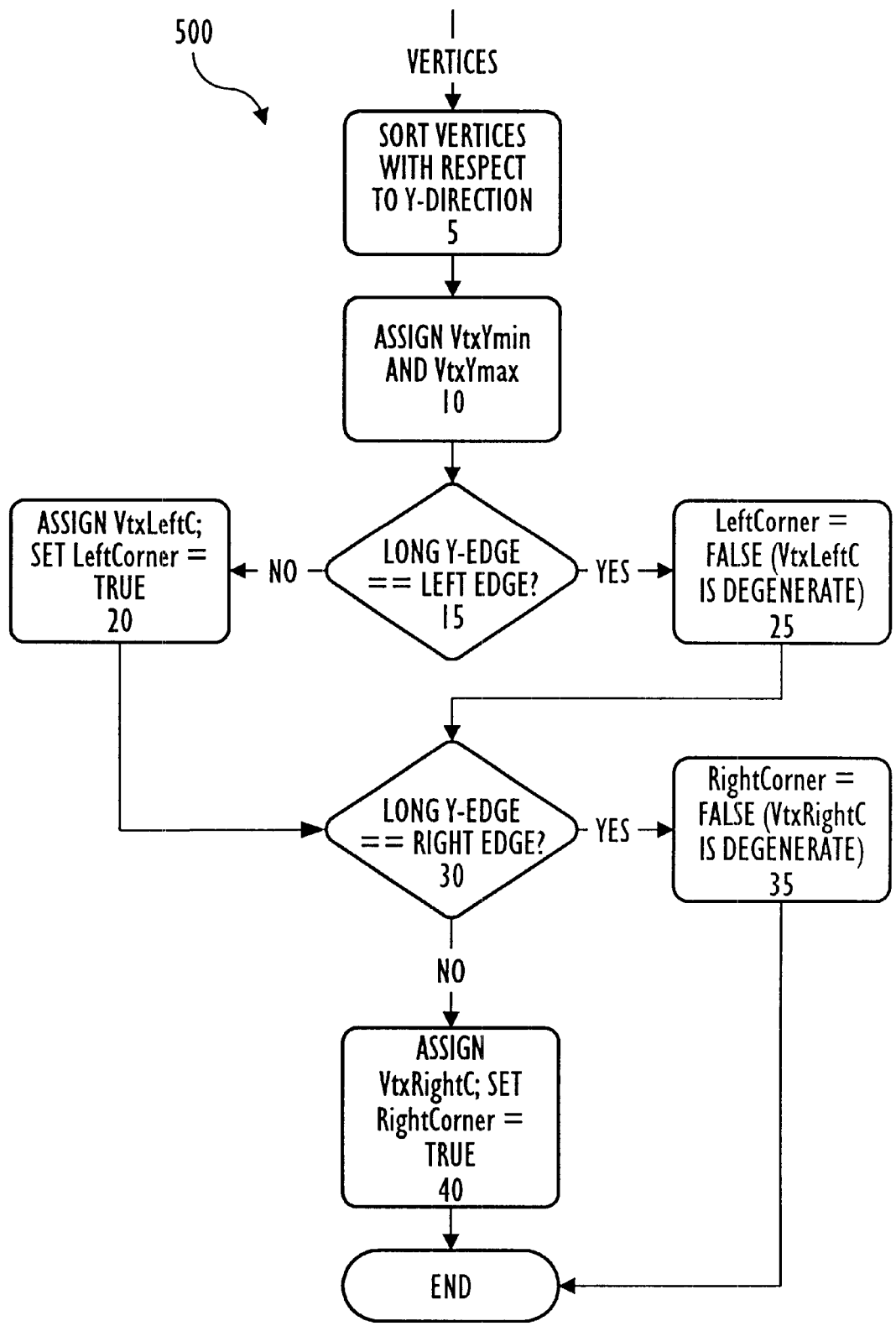
FIG. 5 illustrates vertex assignments according to a uniform primitive description according to one embodiment of the present invention, for describing polygons with an inventive descriptive syntax.

In a preferred embodiment of the present invention, for line segments VtxYmax, VtxLeftC, VtxRightC, LeftCorner, RightCorner descriptors are assigned when line quadrilateral vertices are generated (see section 5.4.5.1). VtxYmin is the vertex with the minimum y value. VtxYmax is the vertex with the maximum y value. VtxLeftC is the vertex that lies to the left of the diagonal formed by joining the vertices VtxYmin and VtxYmax for line segments. VtxRightC is the vertex that lies to the right of the diagonal formed by joining the vertices VtxYmin and VtxYmax for line segments. Referring to FIG. 5, we will now described one embodiment of how VtxYmin, VtxYmax, VtxLeftC, VtxRightC, LeftCorner, RightCorner descriptors are obtained for triangles. At step 5, the vertices are sorted with respect to the y-direction. The procedures for sorting a triangles coordinates with respect to y are discussed in greater detail below in section 5.4.1.1. At step 10, VtxYmin, the vertex with the minimum y value, and VtxYmax, the vertex with the maximum y value are assigned their respective values in a similar manner as that described immediately above with respect to line segments.

Figure 8:
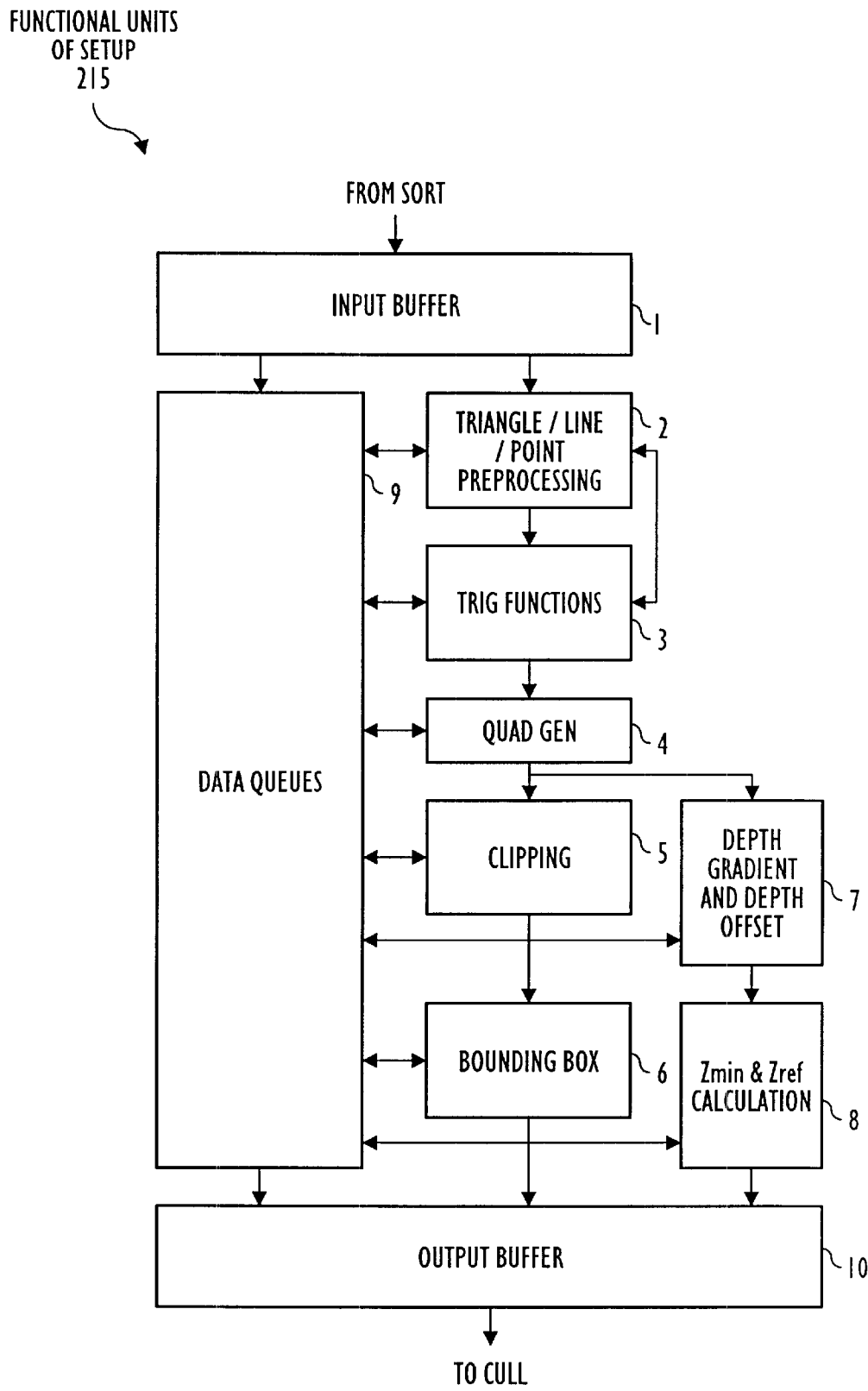
FIG. 8 illustrates a block diagram of functional units of setup 2155 according to an embodiment of the present invention, the functional units implementing the methodology of the present invention.
Figure 10A:
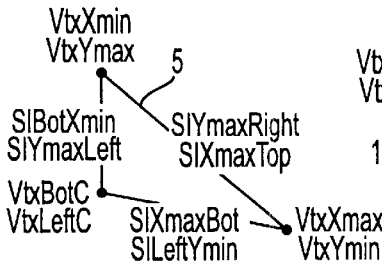
FIG. 10 illustrates slope assignments for triangles and line segments according to an embodiment of the present invention.
Figure 10B:
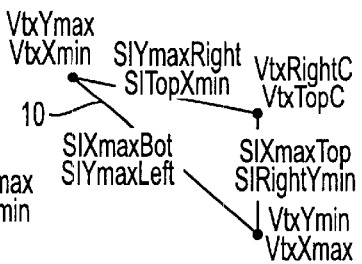
Figure 10C:
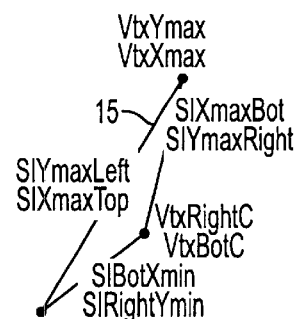
Figure 10D:
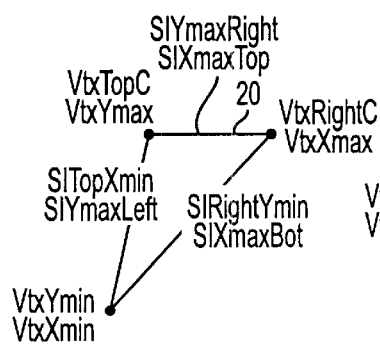
Figure 10E:
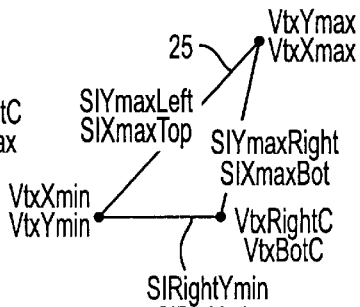
Figure 10F:
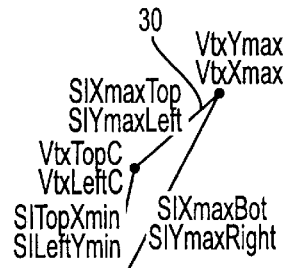
Figure 10G:
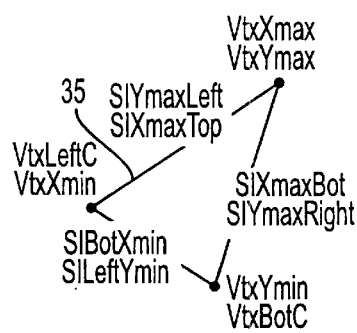
Figure 10H:
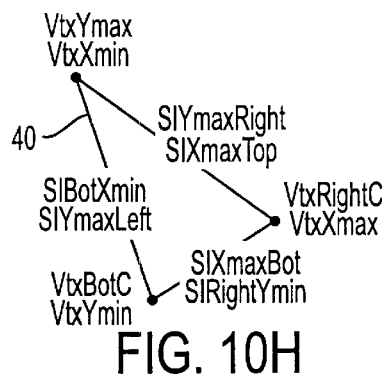
Figure 10I:
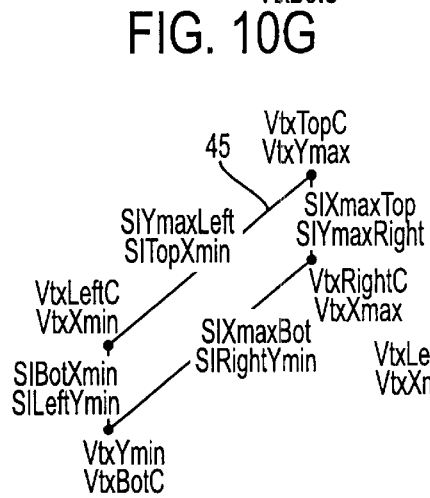
Figure 10J:
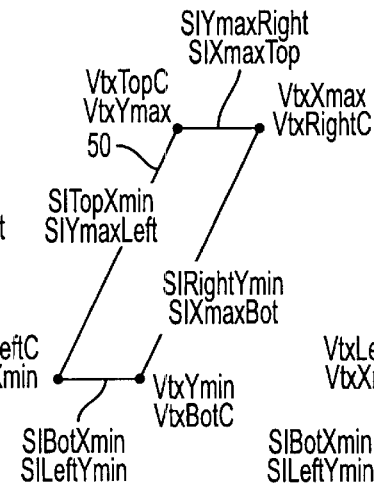
Figure 10K:
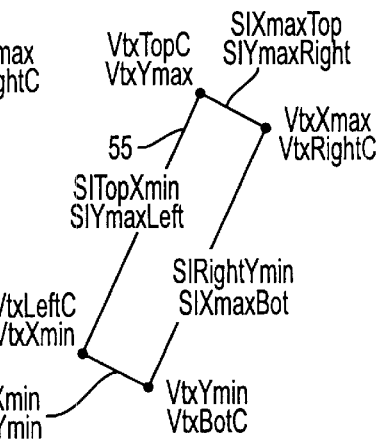
Figure 11D:
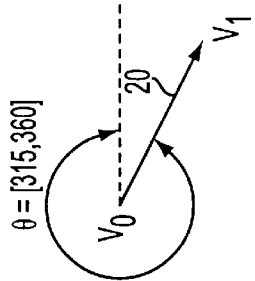
FIG. 11 illustrates aspects of line segments orientation according to an embodiment of the present invention.
Figure 11C:
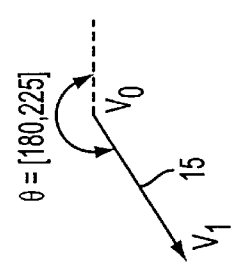
Figure 11B:
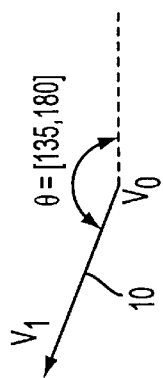
Figure 11A:
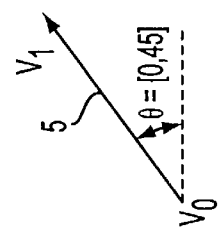
Figure 11H:
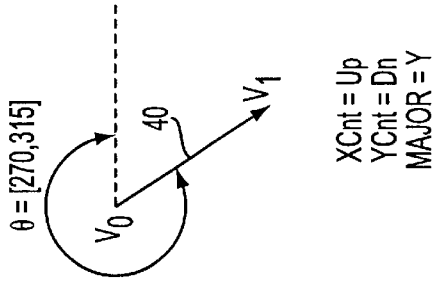
Figure 11G:
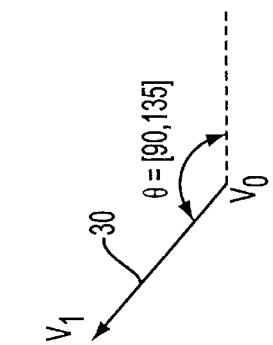
Figure 11F:
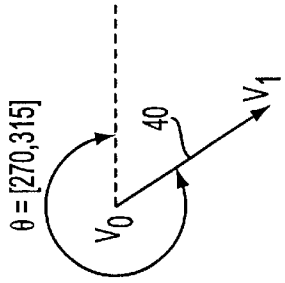
Figure 11E:
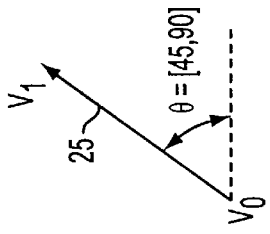
Figure 12A:
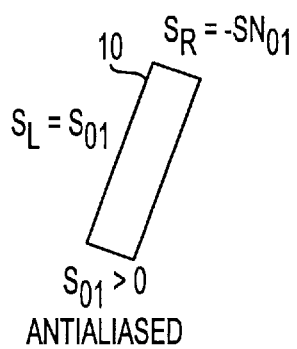
FIG. 12 illustrates aspects of line segments slopes according to an embodiment of the present invention.
Figure 12B:
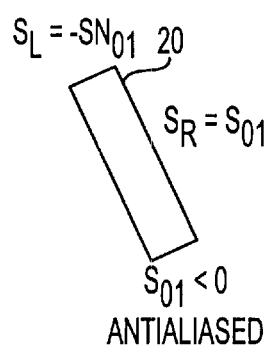
Figure 12C:
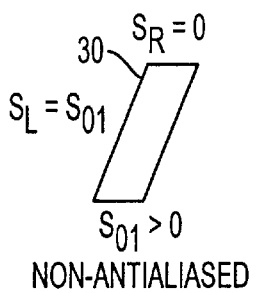
Figure 12D:
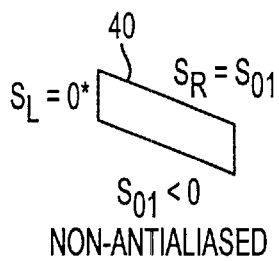

At step 15 is determined whether a long y-edge, refer to FIG. 8. A triangle has exactly two edges that share a top most vertex (VtxYmax). Of these two edges, the one edge with an end point furthest left is the left edge. Analogous to this, the one edge with an end point furthest to the right is the right edge.

Referring to FIG. 5, if the long y-edge is equal to the left edge (step 15), at step 25 LeftCorner is set to equal to the left edge (step 15), at step 20, procedure for uniformly describing primitives 500 assigns a value to VtxLeftC and sets LeftCorner equal to TRUE. For triangles, VtxLeftC is the vertex that lies to the left of the edge of the triangle formed by joining the vertices VtxYmin and VtxYmax (hereinafter, also referred to as the "long y-edge"). The procedure for determining whether a triangle has a left corner is discussed in greater detail below 5.4.1.3.

At step 30, it is determined whether the long y-edge is equal to the right edge, and if so, at step 35, RightCorner is set equal to FALSE, representing that VtxRightC is degenerate, or undefined. However, if long y-edge is not equal to the right edge (step 30), at step 40, a value is assigned to VtxRightC and RightCorner is set to TRUE, indicating that VtxRightC contains a valid value. VtxRightC is the vertex that lies to the right of the long y-edge in the case of a triangle. The procedure for determining whether a triangle has a right corner is discussed in greater detail below 5.4.1.3.

Note that in practice VtxYmin, VtxYmax, VtxLeftC, and VtxRightC are indices into the original primitive vertices. Setup 215 uses VtxYMin, VtxYmax, VtxLeftC, VtxRightC, LeftCorner, and RightCorner to clip a primitive with respect to the top and bottom of the tile. Clipping will be described in greater detail below in section 5.4.6.

In a preferred embodiment of the present invention, for line segments VtxXmin, VtxXmax, VtxTopC, VtxBotC, TopCorner, BottomCorner descriptors are assigned when the line quad vertices are generated (see section 5.4.5.1). VtxXmin is the vertex with the minimum x value. VtxXmax is the vertex with the maximum x value. VtxTopC is the vertex that lies above the diagonal formed by joining the vertices VtxXmin and VtxXmax for parallelograms. VtxBotC is the vertex that lies below the long x-axis in the case of a triangle, and below the diagonal formed by joining the vertices VtxXmin and VtxXmax.

Figure 7:
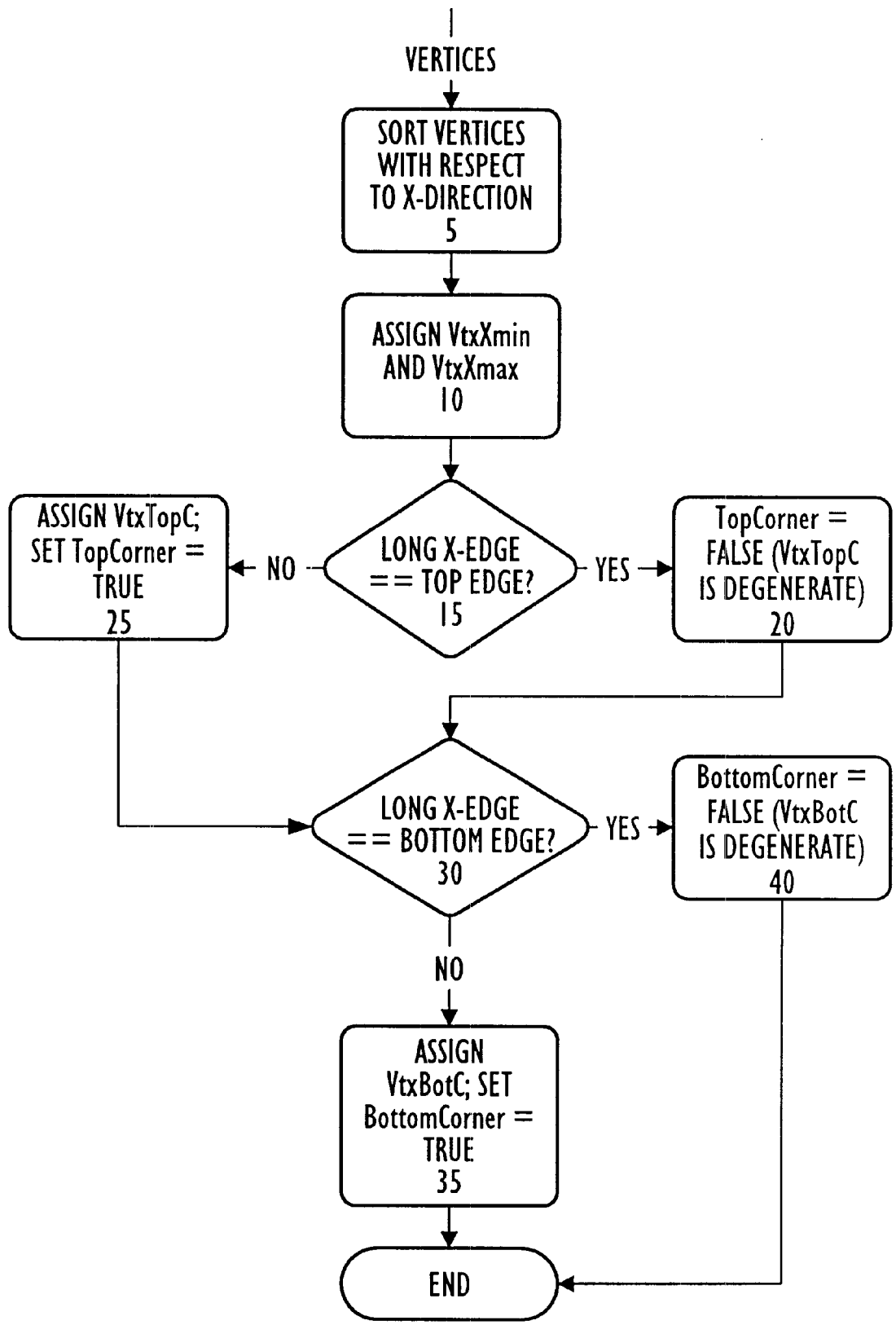
FIG. 7 depicts a procedure for determining a set of unified primitive descriptors for a triangle primitive, according to an embodiment of the present invention.

Referring to FIG. 7, we now describe procedure for determining a set of unified primitive descriptors for a triangle primitive with respect to the x-coordinates. In particular, we illustrate how VtxXmin, VtxXmax, VtxTopC, VtxBotC, TopCorner, BottomCorner descriptors are obtained.

At step 5, for the vertices are sorted with respect to the x-direction. The procedures for sorting a triangles coordinates with respect to x are discussed in greater detail below in section 5.4.1.4. At step 10, VtxXmin and VtxXmax are assigned values as for the discussion immediately above with respect to line segments. At step 15 it is determined whether the triangle's long x-edge is equal to the triangle top edge, and if so, at step 20, TopCorner is set to equal false indicating that VtxTopC is degenerate, or not defined. The top edge is a triangle has to edges that share the maximum x-vertex (VtxXmax). The topmost of these two edges is the "top edge." analogous to this, the bottom most of these two edges is the "bottom edge."

If the triangle's long x-edge is not equal to the triangles top edge (step 15), at step 25, VtxTopC is assigned an appropriate value and TopCorner is set to equal TRUE, indicating that VtxTopC contains a valid value. The appropriate value for VtxTopC is the vertex that lies above the edge joining vertices VtxXmin and VtxXmax (hereinafter, this edge is often referred to as the "long x-edge"). The procedure for determining whether a triangle has a top corner is discussed in greater detail below 5.4.1.5.

At step 30, it is determined whether the long x-edge is equal to the bottom edge, and if so, at step 40, BottomCorner is set to equal FALSE, indicating that VtxBotC is degenerate, or not defined. If the long x-edge is not equal to the bottom edge (step 30), then an appropriate value is assigned to VtxBotX and BottomCorner is set to equal TRUE, indicating that VtxBotC contains a valid value. The appropriate value for VtxBotC is the vertex that lies below the long x-axis. The procedure for determining whether a triangle has a bottom corner is discussed in greater detail below 5.4.1.5.

Note, that in practice VtxXmin, VtxXmax, VtxTopC, and VtxBotC are indices into the original triangle primitive.

Setup 215 uses VtxXmin, VtxXmax, VtxTopC, VtxBotC, TopCorner, and BottomCorner to clip a primitive with respect to the left and right edges of a tile. Clipping will be described in greater detail below.

To illustrate the use of the unified primitive descriptors of the present invention, refer to FIG. 23, where there is shown and illustration of multiple triangles and line segments described using vertex descriptors and flag descriptors according to a preferred embodiment of the unified primitive description of the present invention.

In this manner the procedure for uniformly describing primitives allows different types of primitives to share common sets of algorithms/equations/hardware elements in the graphic pipeline.

5.4 High Level Functional Unit Architecture

Setup's 215 I/O subsystem architecture is designed around the need to process primitive and mode information received from sort 315 (see FIG. 3) in a manner that is optimal for processing by cull 410 (see FIG. 4). To accomplish this task, setup 215 performs a number of procedures to prepare information about a primitive with respect to a corresponding tile for cull 410.

As illustrated in FIG. 8, an examination of these procedures yields the following functional units which implement the corresponding procedures of the present invention: (a) triangle preprocessor 2, for generating unified primitive descriptors, calculating line slopes and reciprocal slopes of the three edges, and determining if a triangle has a left or right corner, (b) line preprocessor 2, for determining the orientation of a line, calculating the slope of the line and the reciprocal, identifying left and right slopes and reciprocal slopes, and discarding end-on lines; (c) point preprocessor 2, for calculating a set of spatial information required by a subsequent clulling stage of pipeline 200; (d) trigonometric unit 3, for calculating the half widths of a line, and trigonometric unit for processing anti-aliased lines by increasing a specified width to improved image quality; (d) quadrilateral generation unit 4, for converting lines into quadrilaterals centered around the line, and for converting aliased points into a square of appropriate width; (d) clipping unit 5, for clipping a primitive (triangle or quadrilateral) to a tile, and for generating the vertices of the new clipped polygon; (e) bounding box unit 6, for determining the smallest box that will enclose the new clipped polygon; (f) depth gradient and depth offset unit 7, for calculating depth gradients (dz/dx & dz/dy) of lines or triangles-for triangles, for also determining the depth offset; and, (g) Zmin and Zref unit 8, for determining minimum depth values by selecting a vertex with the smallest Z value, and for calculating a stamp center closest to the Zmin location.

FIG. 8 illustrates a preferred embodiment of the present invention where triangle preprocessor unit 2, line preprocessor unit 2, and point preprocessor unit 2 are located the same unit 2. However, other in yet other embodiments, each respective unit can be implemented as a different unit.

In one embodiment of the present invention, input buffer 1 comprises a queue and a holding buffer. In a preferred embodiment of the present invention, the queue is approximately 32 entries deep by approximately 140 bytes wide. Input data packets from a subsequent process in pipeline 200, for example, sort 320, requiring more bits then the queue is wide, will be split into two groups and occupy two entries in the queue. The queue is used to balance the different data rates between sort 320 (see FIG. 3) and setup 215. The present invention contemplates that sort 320 and setup 215 cooperate if input queue 1 reaches capacity. The holding buffer holds vertex information read from a triangle primitive embrace the triangle into the visible edges for line mode triangles.

Output buffer 10 is used by setup 215 to queue image data processed by setup 215 for delivery to a subsequent stage of pipeline 200, for example, cull 410.

As discussed above, FIG. 8 also illustrates the data flow between the functional units that implement the procedures of the present invention.

The following subsections detail the architecture and procedures of each of these functional units.

5.4.1 Triangle Preprocessing

For triangles, Setup starts with a set of vertices, (x0,y0, z0), (x1,y1,z1), and (x2,y2,z2). Setup 215 assumes that the vertices of a filled triangle fall within a valid range of window coordinates, that is to say, that a triangle's coordinates have been clipped to the boundaries of the window. This procedure can be performed by a previous processing stage of pipeline 200, for example, geometry 310 (see FIG. 3).

In a preferred embodiment of the present invention, triangle preprocessing unit 2 first generates unified primitive descriptors for each triangle that it receives. Refer to section 5.3 for greater detailed discussion of unified primitive descriptors.

The triangle preprocessor: (1) sorts the three vertices in the y direction, to determine the top-most vertex (VtxYmax), middle vertex (either, VtxRightC or VtxLeftC), and bottom-most vertex (VtxYmin); (2) calculates the slopes and reciprocal slopes of the triangles three edges; (3) determines if the y-sorted triangle has a left corner (LeftCorner) or a right corner (RightCorner); (5) sorts the three vertices in the x-direction, to determine the right-most vertex (VtxXmax), middle vertex, and left-most vertex (VtxXmin); and, (6) identifies the slopes that correspond to x-sorted Top (VtxTopC), Bottom (VtxBotC), or Left.

5.4.1.1 Sort With Respect to the Y Axis

The present invention sorts the filled triangles vertices in the y-direction using, for example, the following three equations.

$$Y_1 GeY_0 = (Y_1 > Y_0) | (Y1 = Y0) \& (X1 > X0))$$

$$Y_2 GeY_1 = (Y_2 > Y_1) | (Y2 = Y1) \& (X2 > X1))$$

$$Y_0 GeY_2 = (Y_0 > Y_2) | (Y0 = Y2) \& (X0 > X2))$$

With respect to the immediately above three equations: (a) "Ge" represents a greater than or equal to relationship; (b) the "|" symbol represents a logical "or"; and, (c) the "&" symbol represents a logical "and."

Y1GeY0, Y2GeY1, and Y0GeY2 are Boolean values.

The time ordered vertices are V0, V1, and V2, where V0 is the oldest vertex, and V2 is the newest vertex.

Pointers are used by setup 215 to identify which time-ordered vertex corresponds to which Y-sorted vertex, including, top (VtxYmax), middle (VtxLeftC or VtxRightC), and bottom (VtxYmin). For example, $$YsortTopSrc = \{Y_2 GeY_1 \& !Y_0 GeY_2, Y_1 GeY_0 \& !Y_2 GeY_1, !Y_1 GeY_0 \& Y_0 GeY_2\}$$

$$YsortMidSrc = \{Y_2 GeY_1 \text{\AA} !Y_0 GeY_2, Y_1 GeY_0 \oplus !Y_2 GeY_1, !Y_1 GeY_0 \oplus Y_0 GeY_2\}$$

$$YsortBotSrc = \{!Y_2 GeY_1 \& Y_0 GeY_2, !Y_1 GeY_0 \& Y_2 GeY_1, Y_1 GeY_0 \& !Y_0 GeY_2\}$$

YsortTopSrc represents three bit encoding to identify which of the time ordered vertices is VtxYmax. YsortMidSrc represents three bit encoding to identify which of the time ordered vertices is VtxYmid. YsortBotSrc represents three bit encoding to identify which of the time ordered vertices is VtxYmin.

Next, pointers to map information back and forth from y-sorted to time ordered, time ordered to y-sorted, and the like, are calculated. Analogous equations are used to identify the destination of time ordered data to x-sorted order.

$$Ysort0dest = \{!Y_1 GeY_0 \& Y_0 GeY_2, !Y_1 GeY_0 \oplus Y_0 GeY_2, Y_1 GeY_0 \& !Y_0 GeY_2\}$$

$$Ysort1dest = \{Y_1 GeY_0 \& !Y_2 GeY_1, Y_1 GeY_0 \oplus !Y_2 GeY_1, !Y_1 GeY_0 \& Y_2 GeY_1\}$$

$$Ysort2dest = \{Y_2 GeY_1 \& !Y_0 GeY_2, Y_2 GeY_1 \oplus !Y_0 GeY_2, !Y_2 GeY_1 \& Y_0 GeY_2\}$$

The symbol "!" represents a logical "not." Ysort0dest represents a pointer that identifies that V0 corresponds to which y-sorted vertex. Ysort1dest represents a pointer that identifies that V1 corresponds to which y-sorted vertex. Ysort2dest represents a pointer that identifies that V2 corresponds to which y-sorted vertex.

Call the de-referenced sorted vertices: $V_T = (X_T, Y_T, Z_T)$, $V_B = (X_B, Y_B, Z_B)$, and $V_M = (X_M, Y_M, Z_M)$, where $V_T$ has the largest Y and $V_B$ has the smallest Y. The word de-referencing is used to emphasize that pointers are kept. $V_T$ is VtxYmax, $V_B$, is VtxYmin, and $V_M$ is VtxYmid.

Reciprocal slopes (described in greater detail below) need to be mapped to labels corresponding to the y-sorted order, because V0, V1 and V2 part-time ordered vertices. S01, S12, and S20 are slopes of edges respectively between: (a) V0 and V1; (b) V1 and V2; and, (c) V2 and V0. So after sorting the vertices with respect to y, we will have slopes between $V_T$ and $V_M$, $V_T$ and $V_B$, and $V_M$ abd $V_B$. In light of this, pointers are determined accordingly.

$V_T$ and $V_M$, $V_T$ and $V_B$, and

A preferred embodiment of the present invention maps the reciprocal slopes to the following labels: (a) YsortSTMSrc represents STM ($V_T$ and $V_M$) corresponds to which time ordered slope; (b) YsortSTBSrc represents STB ($V_T$ and $V_B$) corresponds to which time ordered slope; and, (c) YsortSMBSrc represents SMB ($V_M$ and $V_B$) corresponds to which time ordered slope.

//Pointers to identify the source of the slopes (from time ordered to y-sorted). "Source"
//simply emphasizes that these are pointers to the data.
//encoding is 3bits, "one-hot" {S12, S01, S20}. One hot means that only one bit can be a //"one."
//1,0,0 represents S12; 0,1,0 represents S01; 0,0,1 represents S20.

$$YsortSTMSrc = \{ !Ysort1dest[0] \& !Ysort2dest[0], !Ysort0dest[0] \& !Ysort1dest[0], !Ysort2dest[0] \& !Ysort0dest[0] \}$$

$$YsortSTBSrc = \{ !Ysort1dest[1] \& !Ysort2dest[1], !Ysort0dest[1] \& !Ysort1dest[1], !Ysort2dest[1] \& !Ysort0dest[1] \}$$

$$YsortSMBSrc = \{ !Ysort1dest[2] \& !Ysort2dest[2], !Ysort0dest[2] \& !Ysort1dest[2], !Ysort2dest[2] \& !Ysort 0dest[2] \}$$

The indices refer to which bit is being referenced.

Whether the middle vertex is on the left or the right is determined by comparing the slopes dx2/dy of line formed by vertices v[i2] and v[i1], and dx0/dy of the line formed by vertices v[i2] and v[i0]. If (dx2/dy 22 dx0/dy) then the middle vertex is to the right of the long edge else it is to the left of the long edge. The computed values are then assigned to the primitive descriptors. Assigning the x descriptors is similar. We thus have the edge slopes and vertex descriptors we need for the processing of triangles.

5.4.1.2 Slope Determination

The indices sorted in ascending y-order are used to compute a set of (dx/dy) derivatives. And the indices sorted in ascending x-order used to compute the (dy/dx) derivatives for the edges. The steps are (1) calculate time ordered slopes S01, S12, and, S20; (2) map to y-sorted slope STM, SMB, and STB; and, (3) do a slope comparison to map slopes to SLEFT, SRIGHT, and SBOTTOM.

The slopes are calculated for the vertices in time order. That is, (X0, Y0) represents the first vertex, or "V0" received by setup 215, (X1, Y1) represents the second vertex, or "V2" received by setup 215, and (X2, Y2) represents the third vertex, or V3 received by setup 215.

$$S_{01} = \left[\frac{dy}{dx}\right]_{01} = \frac{y_1 - y_0}{x_1 - x_0} \text{ (Slope between } V1 \text{ and } V0.)$$

$$S_{12} = \left[\frac{dy}{dx}\right]_{12} = \frac{y_2 - y_1}{x_2 - x_1} \text{ (Slope between } V2 \text{ and } V1.)$$

$$S_{20} = \left[\frac{dy}{dx}\right]_{20} = \frac{y_0 - y_2}{x_0 - x_2} \text{ (Slope between } V0 \text{ and } V2.)$$

In Other Processing Stages 220 in pipeline 200, the reciprocals of the slopes are also required, to calculate intercept points in clipping unit 5 (see FIG. 8). In light of this, the following equations are used by a preferred embodiment of the present invention, to calculate the reciprocals of slopes, S01, S12, and S20:

$$SN_{01} = \left[\frac{dx}{dy}\right]_{01} = \frac{x_1 - x_0}{y_1 - y_0} \text{ (Reciprocal slope between } V1 \text{ and } V0.)$$

$$SN_{12} = \left[\frac{dx}{dy}\right]_{12} = \frac{x_2 - x_1}{y_2 - y_1} \text{ (Reciprocal slope between } V2 \text{ and } V1.)$$

$$SN_{01} = \left[\frac{dx}{dy}\right]_{01} = \frac{x_1 - x_0}{y_1 - y_0} \text{ (Reciprocal slope between } V0 \text{ and } V2.)$$

Referring to FIG. 9, there are shown examples of triangle slope assignments. A left slope is defined as slope of dy/dx where "left edge" is defined earlier. A right slope is defined as slope of dy/dx where "right edge" is defined earlier. A bottom slope is defined as the slope of dy/dx where the y-sorted "bottom edge" is defined earlier. (There is also an x-sorted bottom edge.)

5.4.1.3 Determine Y-sorted Left Corner or Right Corner

Call the de-referenced reciprocal slopes SNTM (reciprocal slope between VT and VM), SNTB (reciprocal slope between VT and VB) and SNMB (reciprocal slope between VM and VB). These de-referenced reciprocal slopes are significant because they represent the Y-sorted slopes. That is to say that they identify slopes between y-sorted vertices.

Referring to FIG. 10, there is shown yet another illustration of slope assignments according to one embodiment of the present invention for triangles and line segments. We will now describe a slope naming convention for purposes of simplifying this detailed description.

For example, consider slope "S1StrtEnd," "S1" is for slope, "Strt" is first vertex identifier and "End" is the second vertex identifier of the edge. Thus, S1YmaxLeft represents the slope of the left edge-connecting the VtxYMax and VtxLeftC. If leftC is not valid then, S1YmaxLeft is the slope of the long edge. The letter r in front indicates that the slope is reciprocal. A reciprocal slope represents (y/x) instead of x/y).

Therefore, in this embodiment, the slopes are represented as {S1YmaxLeft, S1YmaxRight, S1LeftYmin, S1RightYmin} and the inverse of slopes (y/x) {rS1XminTop, rS1XminBot, rS1TopXmax, rS1BotXmax}.

In a preferred embodiment of the present invention, setup 215 compares the reciprocal slopes to determine the LeftC or RightC of a triangle. For example, if YsortSNTM is greater than or equal to YsortSNTB, then the triangle has a left corner, nor "LeftC" and the following assignments can be made: (a) set LeftC equal to true ("1"); (b) set RightC equal to false ("0"); (c) set YsortSNLSrc equal to YsortSNTMSrc (identify pointer for left slope); (d) set YsortSNRSrc equal to YsortSNTBSrc (identify pointer for right slope); and, (e) set YsortSNBSrc equal to YsortSNMBSrc (identify pointer bottom slope).

However, if YsortSNTM is less than YsortSNTB, then the triangle has a right corner, or "RightC" and the following assignments can be made: (a) set LeftC equal to false ("0"); (b) RightC equal to true ("1"); (c) YsortSNLSrc equal to YsortSNTBSrc (identify pointer for left slope); (d) sortSNRSrc equal to YsortSNTMSrc (identify pointer for right slope); and, (e) set YsortSNBSrc equal to YsortSNMBSrc (identify pointer bottom slope).

5.4.1.4 Sort Coordinates with Respect to the X Axis

The calculations for sorting a triangle's vertices with respect to "y" also need to be repeated for the triangles vertices with respect to "x," because an algorithm used in the clipping unit 5 (see FIG. 8) needs to know the sorted order of the vertices in the x direction. The procedure for sorting a triangle's vertices with respect to "x" is analogous to the procedure's used above for sorting a triangle's vertices with respect to "y," with the exception, of course, that the vertices are sorted with respect to "x," not "y." However for purposes of completeness and out of an abundance of caution to provide an enabling disclosure the equations for sorting a triangles vertices with respect to "x" are provided below.

For the sort, do six comparisons, including, for example:

$$X_1 GeX_0 = (X_1 > X_0) | ((X1 = X0) \& (Y1 > Y0))$$

$$X_2 GeX_1 = (X_2 > X_1) | ((X2 = X1) \& (Y2 > Y1))$$

$$X_0 GeX_2 = (X_0 > X_2) | ((X0 = X2) \& (Y0 > Y2))$$

The results of these comparisons are used to determine the sorted order of the vertices. Pointers are used to identify which time-ordered vertex corresponds to which Y-sorted vertex. In particular, pointers are used to identify the source vertex (from the time-ordered (V0, V1 and V2) to X-sorted ("destination" vertices VL, VR, and VM)). As noted above, "source" simply emphasizes that these are pointers to the data.

$$XsortRhtSrc = \{X_2 GeX_1, \& !X_0 GeX_2, X_1 GeX_0 \& !X_2 GeX_1, !X_1 GeX_0 \& X_0 GeX_2\}$$

$$XsortMidSrc = \{X_2 GeX_1, \text{Å} !X_0 GeX_2, X_1 GeX_0 \oplus !X_2 GeX_1, !X_1 GeX_0 \oplus X_0 GeX_2\}$$

$$XsortLftSrc = \{!X_2 GeX_1, \& X_0 GeX_2, !X_1 GeX_0 \& X_2 GeX_1, X_1 GeX_0 \& !X_0 GeX_2\}$$

Next, setup 215 identifies pointers to each destination (time-ordered to X-sorted).

$$Xsort0dest = \{!X1GeX0 \& X0GeX2, !X1GeX0X0GeX2, X1GeX0 \& !X0GeX2\}.$$

$$Xsort1dest = \{X1GeX0 \& !X2GeX1, X1GeX0!X2GeX1, !X1GeX0 \& X2GeX1\}.$$

$$Xsort2dest = \{X2GeX1 \& !X0GeX2, X2GeX1!X0GeX2, !X2GeX0 \& X0GeX2\}.$$

Call the de-referenced sorted vertices VR=(XR, YR, ZR), VL=(XL, YL, ZL), and VM=(XM, YM, ZM), where VR has the largest X and VL has the smallest X. Note that X sorted data has no ordering information available with respect to Y or Z. Note also, that X, Y, and Z are coordinates, "R" equals "right," "L"="left," and "M" equals "middle." Context is important: y-sorted VM is different from x-sorted VM.

The slopes calculated above, need to be mapped to labels corresponding to the x-sorted order, so that we can identify which slopes correspond to which x-sorted edges. To accomplish this, one embodiment of the present invention determines pointers to identify the source of the slopes (from time ordered to x-sorted). For example, consider the following equations:

*XsortSRMSrc*={!*Xsort1dest*[0]&!*Xsort2dest*[0], !*Xsort0dest*[0]
&!*Xsort1dest*[0], !*Xsort2dest*[0]&!*Xsort0dest*[0]};

*XsortSRLSrc*={!*Xsort1dest*[1]&!*Xsort2dest*[1], !*Xsort0dest*[1]
&!*Xsort1dest*[1], !*Xsort2dest*[1]&!*Xsort0dest*[1]}; and,

*XsortSMLSrc*={!*Xsort1dest*[2]&!*Xsort2dest*[2], !*Xsort0dest*[2]
&!*Xsort1dest*[2], !*Xsort2dest*[2]&!*Xsort0dest*[2]}, where, XsortSRMSrc represents the source (V0, V1, and V 2) for SRM slope between VR and VM; XsortSRLSrc represents the source for SRL slope, and XsortSMLSrc represents the source for SML slope.

Call the de-referenced slopes XsortSRM (slope between VR and VM), XsortSRL (slope between VR and VL) and XsortSML (slope between VM and VL).

5.4.1.5 Determine X Sorted Top Corner or Bottom Corner and Identify Slopes Setup 215 compares the slopes to determine the bottom corner (BotC or BottomCorner) or top corner (TopC or TopCorner) of the x-sorted triangle. To illustrate this, consider the following example, where SRM represents the slope between x-sorted VR and VM, and SRL represents the slope coming x-sorted VR and VL. If SRM is greater than or equal to SRL, then the triangle has a BotC and the following assignments can be made: (a) set BotC equal to true ("1"); (b) set TopC equal to false ("0"); (c) set XsortSBSrc equal to XsortSRMSrc (identify x-sorted bot slope); (d) set XsortSTSrc equal to XsortSRLSrc (identify x-sorted top slope); and, (e) set XsortSLSrc equal to XsortSMLSrc (identify x-sorted left slope).

However, if SRM is less than SRL, then the triangle has a top corner (TopCorner or TopC) and the following assignments can be made: (a) set BotC equal to false; (b) set TopC equal to true; (c) set XsortSBSrc equal to XsortSRLSrc (identify x-sorted bot slope); (d) set XsortSTSrc equal to XsortSRMSrc (identify x-sorted top slope); and, (e) set XsortSLSrc equal to XsortSMLSrc (identify x-sorted left slope).

V0, V1, and V2 are time ordered vertices. S01, S12, and S20 are time ordered slopes. X-sorted VR, VL, and VM are x-sorted right, left and middle vertices. X-sorted SRL, SRM, and SLM are slopes between the x-sorted vertices. X-sorted ST, SB, and SL are respectively x-sorted top, bottom, and left vertices. BotC, if true means that there is a bottom corner, likewise for TopC and top corner.

5.4.2 Line Segment Preprocessing

Figure 6A:
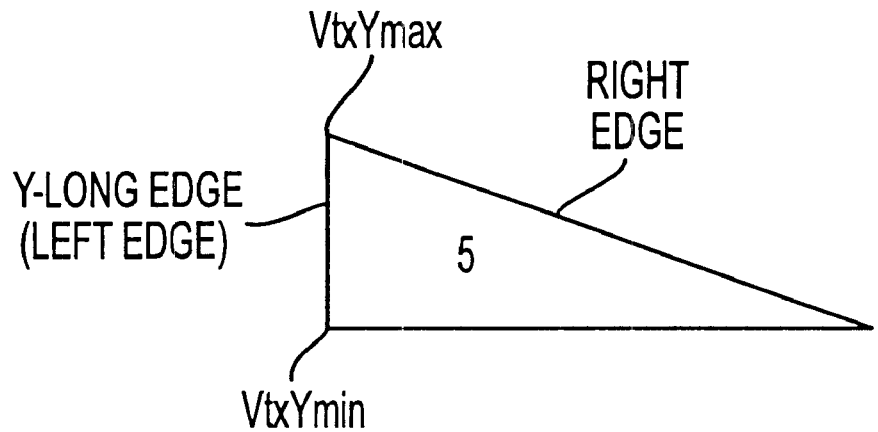
FIG. 6 depicts an orientation of a line segment, according to an embodiment of the present invention.
Figure 6B:
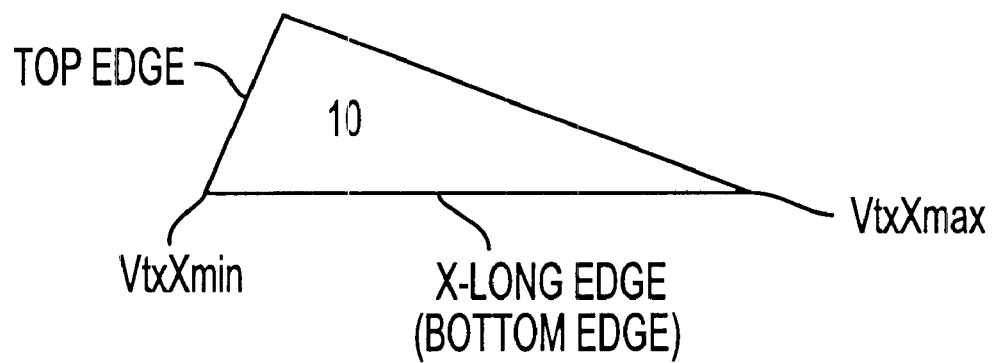

The object of line preprocessing unit 2 (see FIG. 6) is to: (1) determine orientation of the line segment (a line segment's orientation includes, for example, the following: (a) a determination of whether the line is X-major or Y-major; (b) a determination of whether the line segment is pointed right or left (Xcnt); and, (c) a determination of whether the line segment is pointing up or down (Ycnt).), this is beneficial because Xcnt and Ycnt represent the direction of the line, which is needed for processing stippled line segments; and (2) calculating the slope of the line and reciprocal slope,
this is beneficial because the slopes are used to calculate the tile intersection pointed also passed to cull 410 (see FIG. 4).

We will now discuss how this unit of the present invention determines a line segment's orientation with respect to a corresponding tile of the 2-D window.

5.4.2.1 Line Orientation

Referring to FIG. 11, there is shown an example of aspects of line orientation according to one embodiment of the present invention. We now discuss an exemplary procedure used by setup 215 for determining whether a line segment points to the right or pointing to the left.

*DX01=X1-X0*.

If DX01 is greater than zero, then setup 215 sets XCnt equal to "up," meaning that the line segment is pointing to the right. In a preferred embodiment of the present invention, "up" is represented by a "1," and down is represented by a "0." Otherwise, if DX01 is less than or equal to zero, setup 215 sets XCnt equal to down, that is to say that the line segment is pointing down. DX01 is the difference between X1 and X0.

We now illustrate how the present invention determines whether the line segment points up or down.

*DY01=Y1-Y0*;

*If DY01>0*,

Then, Ycnt=up, that is to say that the line is pointing up. Else, Ycnt=dn, that is to say that the line is pointing down. //Determine Major=X or Y (Is line Xmajor or Ymajor?)

If |DX01|>=|DY01|

Then Major=X

Else Major=Y 5.4.2.2 Line Slopes

Calculation of line's slope is beneficial because both slopes and reciprocal slopes are used in calculating intercept points to a tile edge in clipping unit 5. The following equation is used by setup 215 to determine a line's slope.

$$S_{01} = \left[\frac{dy}{dx}\right]_{01} = \frac{y_1 - y_0}{x_1 - x_0}$$

The following equation is used by setup 215 to determine a line's reciprocal slope.

$$SN_{01} = \left[\frac{dx}{dy}\right]_{01} = \frac{x_1 - x_0}{y_1 - y_0}$$

FIG. 12 illustrates aspects of line segment slopes. Setup 215 now labels a line's slope according to the sign of the slope ($S_{01}$) and based on whether the line is aliased or not. For non-antialiased lines, setup 215 sets the slope of the ends of the lines to zero. (Infinite dx/dy is discussed in greater detail below).

If $S_{01}$ is greater than or equal to 0: (a) the slope of the line's left edge ($S_L$) is set to equal $S_{01}$; (b) the reciprocal slope of the left edge ($SN_L$) is set to equal $SN_{01}$; (c) if the line is anti-aliased, setup 215 sets the slope of the line's right edge (SR) to equal $-SN_{01}$, and setup 215 sets the reciprocal slope of the right edge (SNR) to equal $-S_{01}$; (d) if the line is not antialiased, the slope of the lines right edge, and the reciprocal slope of right edge is set to equal zero (infinite dx/dy); (e) LeftCorner, or LeftC is set to equal true ("1"); and, (f) RightCorner, or RightC is set to equal true.

However, if $S_{01}$ less than 0: (a) the slope of the line's right edge ($S_R$) is set to equal $S_{01}$; (b) the reciprocal slope of the right edge ($SN_R$) is set to equal $SN_{O1}$; (c) if the line is anti-aliased, setup 215 sets the slope of the line's left edge ($S_L$) to equal $-SN_{O1}$, and setup 215 sets the reciprocal slope of the left edge ($SN_L$) to equal $-S_{O1}$; (d) if the line is not antialiased, the slope of the lines left edge, and the reciprocal slope of left edge is set to equal zero; (e) LeftCorner, or LeftC is set to equal true ("1"); and, (f) RightCorner, or RightC is set to equal true.

Note the commonalty of data:(a) SR/SNR; (b) SL/SNR; (c) SB/SNB (only for triangles);(d) LeftC/RightC; and, (e) the like.

To discard end-on lines, or line that are viewed end-on and thus ,are not visible, setup 215 determines whether ($y_1-y_0=$ 0) and ($x_1-x_0=0$), and if so, the line will be discarded.

5.4.2.3 Line Mode Triangles

Setup 215 receives edge flags in addition to window coordinates (x, y, z) corresponding to the three triangle vertices. Referring to table 6, there is shown edge flags (LineFlags) 5, having edge flags. These edge flags 5 tell setup 215 which edges are to be drawn. Setup 215 also receives a "factor" (see table 6, factor (ApplyOffsetFactor) 4) used in the computation of polygon offset. This factor is factor "f" and is used to offset the depth values in a primitive. Effectively, all depth values are to be offset by an amount equal to offset equals max [|Zx|,|Zy|] plus factor. Factor is supplied by user. Zx is equal to dx/dz. Zy is equal to dy/dz. The edges that are to be drawn are first offset by the polygon offset and then drawn as ribbons of width w (line attribute). These lines may also be stippled if stippling is enabled.

For each line polygon, setup 215: (1) computes the partial derivatives of z along x and y (note that these z gradients are for the triangle and are needed to compute the z offset for the triangle; these gradients do not need to be computed if factor is zero); (2) computes the polygon offset, if polygon offset computation is enabled, and adds the offset to the z value at each of the three vertices; (3) traverses the edges in order; if the edge is visible, then setup 215 draws the edge using line attributes such as the width and stipple (setup 215 processes one triangle edge at a time); (4) draw the line based on line attributes such as anti-aliased or aliased, stipple, width, and the like; and, (5) assign appropriate primitive code to the rectangle depending on which edge of the triangle it represents and send it to Cull 410. A "primitive code" is an encoding of the primitive type, for example, 01 equals a triangle, 10 equals a line, and 11 equals a point.

5.4.2.4 Stippled Line Processing

Given a line segment, stippled line processing utilizes "stipple information," and line orientation information (see section 5.2.5.2.1 Line Orientation) to reduce unnecessary processing by setup 215 of quads that lie outside of the current tile's boundaries. In particular, stipple preprocessing breaks up a stippled line into multiple individual line segments. Stipple information includes, for example, a stipple pattern (LineStipplePattern) 6 (see table 6), stipple repeat factor (LineStippleRepeatFactor) r 8, stipple start bit (StartLineStippleBit1 and StartLineStippleBit1), for example stipple start bit 12, and stipple repeat start (for example, StartStippleRepeatFactor0) 23 (stpIRepeatStart)).

In a preferred embodiment of pipeline 200, Geometry 315 is responsible for computing the stipple start bit 12, and stipple repeat start 23 offsets at the beginning of each line segment. We assume that quadrilateral vertex generation unit 4 (see FIG. 8) has provided us with the half width displacements.

Stippled Line Preprocessing will break up a stippled line segment into multiple individual line segments, with line segment lengths corresponding to sequences of 1 bits in a stipple pattern, starting at stp1Start bit with a further repeat factor start at stp1RepeatStart for the first bit. To illustrate this, consider the following example. If the stp1Start is 14, and stp1Repeat is 5, and stp1RepeatStart is 4, then we shall paint the 14th bit in the stipple pattern once, before moving on to the 15th, i.e. the last bit in the stipple pattern. If both bit 14 and 15th are set, and the 0th stipple bit is nor set, then the quad line segment will have a length of 6.

In a preferred embodiment of the present invention, depth gradients, line slopes, depth offsets, x-direction widths (xhw), and y-direction widths (yhw) are common to all stipple quads if a line segment, and therefore need to be generated only once.

Line segments are converted by Trigonometric Functions and Quadrilateral Generation Units, described in greater detail below (see sections 5.2.5.X and 5.2.5.X, respectively) into quadrilaterals, or "quads." For antialiased lines the quads are rectangles. For non-antialiased lines the quads are parallelograms.

5.4.3 Point Preprocessing

Figure 13B:
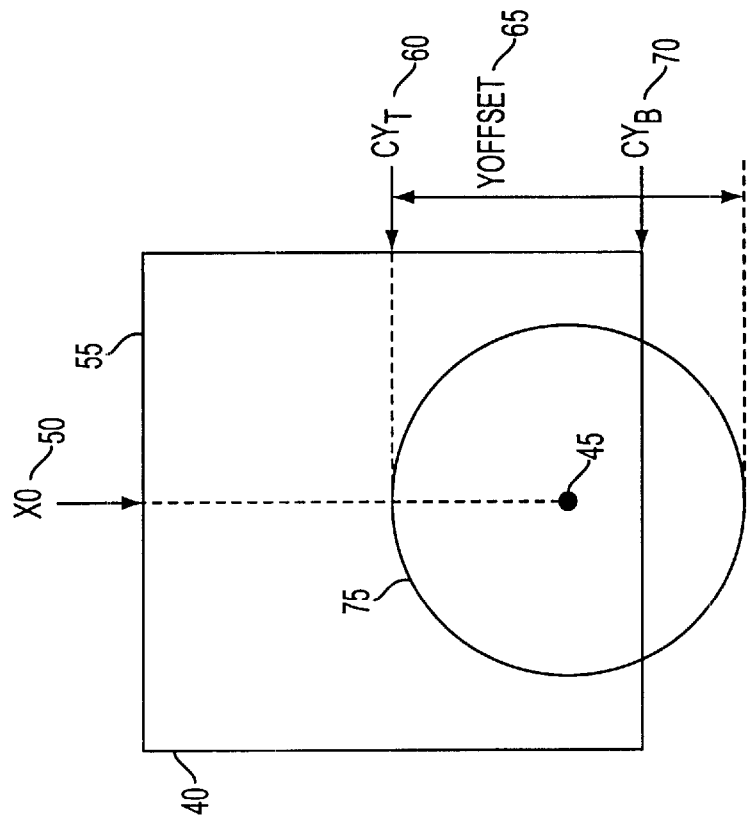
FIG. 13 illustrates aspects of point preprocessing according to an embodiment of the present invention.
Figure 13A:
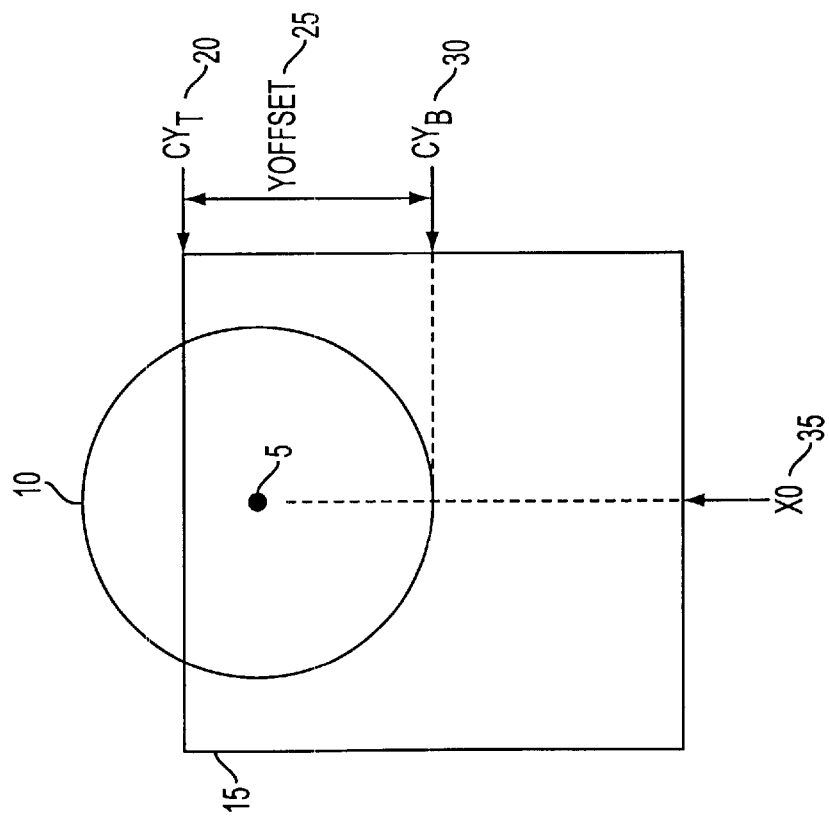
Figure 14A:
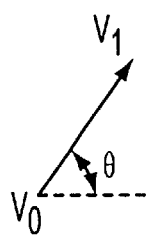
FIG. 14 illustrates the relationship of trigonometric functions to line segment orientations.
Figure 14B:
Figure 14C:
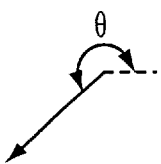
Figure 14D:
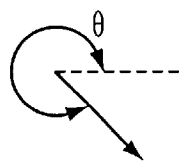

Referring to FIG. 13, there is shown an example of an unclipped circle 5 intersecting parts of a tile 15, for illustrating the various data to be determined.

$CY_T$ 20 represents circle's 5 topmost point, clipped by tile's 15 top edge, in tile coordinates. $CY_B$ 30 represents circle's 10 bottom most point, clipped by tile's 15 bottom edge, in tile coordinates. $Y_{Offset}$ 25 represents the distance between $CY_T$ 20 and $CY_B$ 30, the bottom of the unclipped circle 10. XO 35 represents the "x" coordinate of the center 5 of circle 10, in window coordinates. This information is required and used by cull 410 to determine which sample points are covered by the point.

This required information for points is obtained with the following calculations:

$V_0=(X_0, Y_0, Z_0)$ (the center of the circle and the Zmin);

$Y_T=Y_0+$width/2;

$Y_B=Y_0-$width/2;

$DY_T=Y_T-$bot (convert to tile coordinates);

$DY_B=Y_B-$bot (convert to tile coordinates);

$Y_T$GtTOP=$DY_T$>='d16 (check the msb);

$Y_B$LtBot=$DY_T$<'d0 (check the sign);

if ($Y_T$GtTop) then $CY_T$=tiletop, else $CY_T$=[$DY_T$]$_{8bits}$ (in tile coordinates);

if ($Y_B$LtBot) then, $CY_B$=tilebot, else $CY_B$=[$DY_B$]$_{8bits}$ (in tile coordinates); and, Yoffset=$CY_T-DY_B$.

5.4.4 Trigonometric Functions Unit

As discussed above, setup 215 converts all lines, including line triangles and points, into quadrilaterals. To accomplish this, the trigonometric function unit 3 (see FIG. 8) calculates a x-direction half-width and a y-direction half-width for each line and point. (Quadrilateral generation for filled triangles is discussed in greater detail above in section 5.4.1). Procedures for generating vertices for line and point quadrilaterals are discussed in greater detail below in section 5.4.5.

Before trigonometric unit 3 can determine a primitive's half-width, it must first calculate the trigonometric functions tan θ, cos θ, sin θ. In a preferred embodiment of the present invention, setup 215 determines the trigonometric functions cos θ and sin θ using the line's slope that was calculated in the line preprocessing functional unit described in great detail above. For example:

$$\tan\theta = S_{10} \quad \sin\theta = \pm\frac{\tan\theta}{\sqrt{1+\tan^2\theta}} \quad \cos\theta = \pm\frac{1}{\sqrt{1+\tan^2\theta}}$$

In yet another embodiment of the present invention the above discussed trigonometric functions are calculated using lookup table and iteration method, similar to rsqrt and other complex math functions. Rsqrt stands for the reciprocal square root.

Referring to FIG. 14, there is shown an example of the relationship between the orientation of a line and the sign of the resulting cos θ and sin θ. As is illustrated, the signs of the resulting cos θ and sin θ will depend on the orientation of the line.

We will now describe how setup 215 uses the above determined cos θ and sin θ to calculate a primitive's "x" direction half-width ("HWX") and a primitive's "y" direction half width ("HWY"). For each line, the line's half width is offset distance in the x and y directions from the center of the line to what will be a quadrilateral's edges. For each point, the half width is equal to one-half of the point's width. These half-width's are magnitudes, meaning that the x-direction half-widths and the y-direction half-width's are always positive.

For purposes of illustration, refer to FIG. 15, where there is shown three lines, an antialiased line 1405, a non-aliased x-major line 1410, and a non-aliased y-major line 1415, and their respective associated quadrilaterals, 1420, 1425, and 1430. Each quadrilateral 1420, 1425 and 1430 has a width ("W"), for example, W 1408, W1413, and W 1418. In a preferred embodiment of the present invention, this width "W" is contained in a primitive packet 6000 (see table 6). (Also, refer to FIG. 16, where there are shown examples of x-major and -major aliased lines in comparison to an antialiased line.).

To determine an anti-aliased line's half width, setup 215 uses the following equations:

$$HWX = \frac{W}{2}|\sin\theta|$$

$$HWY = \frac{W}{2}|\cos\theta|$$

To determine the half width for an x-major, non-antialiased line, setup 215 uses the following equations:

$$HWX = 0$$

$$HWY = \frac{W}{2}$$

To determine the half width for a y-major, non-antialiased line, setup 215 uses the following equations:

$$HWX = \frac{W}{2}$$

$$HWY = 0$$

To determine the half-width for a point, setup 215 uses the following equations:

$$HWX = \frac{W}{2}$$

$$HWY = \frac{W}{2}$$

5.4.5 Quadrilateral Generation Unit

Quadrilateral generation unit 4 (see FIG. 8): (1) generates a quadrilateral centered around a line or a point; and, (2) sorts a set of vertices for the quadrilateral with respect to a quadrilateral's top vertex, bottom vertex, left vertex, and right vertex. With respect to quadrilaterals, quadrilateral generation unit 4 converts anti-aliased lines into rectangles; (b) converts non-anti-aliased lines into parallelograms; and, (c) converts aliased points into squares centered around the point. (For filled triangles, the vertices are just passed through to the next functional unit, for example, clipping unit 5 (see FIG. 8)). We now discuss an embodiment of a procedure that quadrilateral generation unit 4 takes to generate a quadrilateral for a primitive.

5.4.5.1. Line Segments

With respect to line segments, a quadrilateral's vertices are generated by taking into consideration: (a) a line segment's original vertices (a primitive's original vertices are sent to setup 215 in a primitive packet 6000, see table 6, WindowX0 19, WindowY0 20, WindowZ0 21, WindowX1 14, WindowY1 15, WindowZ1 16, WindowX2 9, WindowY2 10, and, WindowZ2 11); (b) a line segment's orientation (line orientation is determined and discussed in greater detail above in section 5.2.5.2.1); and, (c) a line segment's x-direction half-width and y-direction half-width (half-widths are calculated and discussed in greater detail above in section 5.2.5.4). In particular, a quadrilateral vertices are generated by adding, or subtracting, a line segment's half-widths with respect to the line segment's original vertices.

If a line segment is pointing to the right (Xcnt>0) and the line segment is pointing up (Yxnt>0) then setup 215 performs the following set of equations to determine a set of vertices defining a quadrilateral centered on the line segment:

QY0=Y0−HWY QX0=X0+HWX
QY1=Y0+HWY QX1=X0−HWX
QY2=Y1−HWY QX2=X1+HWX
QY3=Y1+HWY ,and QX3=X1−HWX, where:

QV0, VQV1, QV2, and QV3 are a quadrilateral vertices. The quadrilateral vertices are, as of yet un-sorted, but the equations were chosen, such that they can easily be sorted based on values of Ycnt and Xcnt.

To illustrate this please refer to FIG. 17, illustrating aspects of pre-sorted vertex assignments for quadrilaterals according to an embodiment of the present invention. In particular, quadrilateral 1605 delineates a line segment that points right and up, having vertices QV0 1606, QV1 1607, QV2 1608, and QV3 1609.

If a line segment is pointing to the left (Xcnt<0) and the line segment is pointing up, then setup 215 performs the following set of equations to determine set of vertices defining a quadrilateral centered on the line segment:

QY0=Y0+HWY QX0=X0−HWX
QY1=Y0−HWY QX1=X0+HWX
QY2=Y1+HWY QX2=X1−HWX
QY3=Y1−HWY, and QX3=X1+HWX To illustrate this, consider that quadrilateral 1610 delineates a line segment that points left and up, having vertices QV0 1611, QV1 1612, QV2 1613, and QV3 1614.

If a line segment is pointing to the left (Xcnt<0) and the line segment is pointing down (Ycnt<0), then setup 215 performs the following set of equations to determine a set of vertices defining a quadrilateral centered on the line segment:

QY0=Y0+HWY QX0=X0+HWX
QY1=Y0−HWY QX1=X0−HWX
QY2=Y1+HWY QX2=X1+HWX
QY3=Y1−HWY , and QX3=X1−HWX To illustrate this, consider that quadrilateral 1615 delineates a line segment that points left and down, having vertices QV0 1616, QV1 1617, QV2 1618, and QV3 1619.

If a line segment is pointing right and the line segment is pointing down, then setup 215 performs the following set of equations to determine a set of vertices defining a quadrilateral centered on the line segment:

QY0=Y0−HWY QX0=X0−HWX
QY1=Y0+HWY QX1=X0+HWX
QY2=Y1−HWY QX2=X1−HWX
QY3=Y1+HWY, and QX3=X1+HWX To illustrate this, consider that quadrilateral 1620 delineates a line segment that points right and down, having vertices QV0 1621, QV1 1622, QV2 1623, and QV3 1624.

In a preferred embodiment of the present invention, a vertical line segment is treated as the line segment is pointing to the left and top. A horizontal line segment is treated as if it is pointing right and up.

These vertices, QX0, QX1, QX2, QX3, QY0, QY1, QY2, AND QY3, for each quadrilateral are now reassigned to top (QXT, QYT, QZT), bottom (QXB, QYB, QZB), left (QXL, QYL, QZL), and right vertices (QXR, QYR, QZR) by quadrilateral generation functional unit 4 to give the quadrilateral the proper orientation to sort their vertices so as to identify the top list, bottom, left, and right most vertices, where the Z-coordinate of each vertex is the original Z-coordinate of the primitive.

To accomplish this goal, quadrilateral generation unit 4 uses the following logic. If a line segment is pointing up, then the top and bottom vertices are assigned according to the following equations: (a) vertices (QXT, QYT, QZT) are set to respectively equal (QX3, QY3, Z1); and, (b) vertices (QXB, QYB, QZB) are set to respectively equal (QX0, QY0, Z0).

If a line segment is pointing down, then the top and bottom vertices are assigned according to the following equations: (a) vertices (QXT, QYT, QZT) are set to respectively equal (QX0, QY0, Z0); and, (b) vertices (QXB, QYB, QZB) are set to respectively equal (QX3, QY3, Z1).

If a line segment is pointing right, then the left and right vertices are assigned according to the following equations: (a) vertices (QXL, QYL, QZL) are set to respectively equal (QX1, QY1, Z0); and, vertices (QXR, QYR, QZR) are set to respectively equal (QX2, QY2, Z1). Finally, if a line segment is pointing left, the left and right vertices are assigned according to the following equations: (a) vertices (QXL, QYL, QZL) are set to respectively equal (QX2, QY2, Z1); and, (b) vertices (QXR, QYR, QZR) are set to respectively equal (QX1, QY1, Z0).

5.4.1.2 Aliased Points

An aliased point is treated as a special case, meaning that it is treated as if it were a vertical line segment.

5.4.6 Clipping Unit

For purposes of the present invention, clipping a polygon to a tile can be defined as finding the area of intersection between a polygon and a tile. The clip points are the vertices of this area of intersection.

To find a tight bounding box that encloses parts of a primitive that intersect a particular tile, and to facilitate a subsequent determination of the primitive's minimum depth value (Zmin), clipping unit 5 (see FIG. 8), for each edge of a tile: (1) selects a tile edge from a tile (each tile has four edges), to determine which, if any of a quadrilateral's edges, or three triangle edges, cross the tile edge; (b) checks a clip codes (discussed in greater detail below) with respect to the selected edge; (c) computes the two intersection points (if any) of a quad edge or a triangle edge with the selected tile edge; (d) compare computed intersection points to tile boundaries to determine validity and updates the clip points if appropriate.

The "current tile" is the tile currently being set up for cull 410 by setup 215. As discussed in greater detail above, a previous stage of pipeline 200, for example, sort 320, sorts each primitive in a frame with respect to those regions, or tiles of a window (the window is divided into multiple tiles) that are touched by the primitive. These primitives were sent in a tile-by-tile order to setup 215. It can be appreciated, that with respect to clipping unit 5, setup 215 can select an edge in an arbitrary manner, as long as each edge is eventually selected. For example, in one embodiment of clipping unit 5 can first select a tile's top edge, next the tile's right edge, next the tile's bottom edge, and finally the tiles left edge. In yet another embodiment of clipping unit 5, the tile edges may be selected in a different order.

Sort 320 (see FIG. 3) provides setup 215 the x-coordinate (TileXLocation) for the current tile's left tile edge, and the y-coordinate (TileXLocation) for the bottom right tile edge via a begin tile packet (see table 2). For purposes of this description, the tile's x-coordinate is referred to as "tile x," and the tiles y-coordinate is referred to as "tile y." To identify a coordinate location for each edge of the current tile, clipping unit 5 sets the left edge of tile equal to tile x, which means that left tile edge x-coordinate is equal to tile x+0. The current tile's right edge is set to equal the tiles left edge plus the width of the tile. The current tile's bottom edges set to equal tile y, which means that this y-coordinate is equal to tile y+0. Finally, the tile's top edge is set to equal and the bottom tile edge plus the height of the tile in pixels.

In a preferred embodiment of the present invention, the width and height of a tile is 16 pixels. However, and yet other embodiments of the present invention, the dimensions of the tile can be any convenient size.

5 5.4.6.1 Clip Codes

Clip codes are used to determine which edges of a polygon, if any, touch the current tile. (A previous stage of pipeline 200 has sorted each primitive with respect to those tiles of a 2-D window that each respective primitive touches.). In one embodiment of the present invention, clip codes are Boolean values, wherein "0" represents false and "1" represents true. A clip code value of false indicates that a primitive does not need to be clipped with respect to the edge of the current tile that particular clip code represents. Whereas, a value of true indicates that a primitive does need to be clipped with respect to the edge of the current tile that that particular clip code represents.

To illustrate how one embodiment of the present invention determines clip codes for a primitive with respect to the current tile, consider the following pseudocode, wherein there is shown a procedure for determining clip codes. As noted above, the pseudocode used is, essentially, a computer language using universal computer language conventions. While the pseudocode employed here has been invented solely for the purposes of this description, it is designed to be easily understandable by any computer programmer skilled in the art.

In one embodiment of the present invention, clip codes are obtained as follows for each of a primitives vertices. $C[i]=((v[i].y>tile\_ymax)<<3) \| ((v[i].x<tile\_xmin)<<2) \| ((v[i].y<tile\_ymin)<<1) \| (v[i].x>tile\_xmax))$, where, for each vertex of a primitive: (a) $C[i]$ represents a respective clip code; (b) $v[i].y$ represents a y vertex; (c) tile_ymax represents the maximum y-coordinate of the current tile; (d) $v[i].x$ represents an x vertex of the primitive; (e) tile_xmin represents the minimum x-coordinate of the current tile; (f) tile_ymin represents the minimum y-coordinates of the current tile; and, (g) tile_xmax represents the maximum x-coordinate of the current tile. In this manner, the boolean values corresponding to the clip codes are produced.

In yet another embodiment of the present invention, clip codes are obtained using the following set of equations: (1) in case of quads then use the following mapping, where "Q" represents a quadrilaterals respective coordinates, and TileRht, TileLft, TileTop and TileBot respectively represent the x-coordinate of a right tile edge, the x-coordinate of a left tile edge, the y-coordinate of a top tile edge, and the y-coordinate of a bottom tile edge.
(X0, Y0)=(QXBot, QYBot); (X1,Y1)=(QXLft, QYLft); (X2,Y2) (QXRht, QYRht); (X3,Y3) (QXTop, QYTop);
//left
ClpFlagL[3:0]={(X3<=TileLft), (X2<=TileLft), (X1<=TileLft), (X0<=TileLft)}
//right
ClpFlagD[3:0]={(X3>=TileRht), (X2>=TileRht), (X1>=TileRht), (X0>=TileRht)}
//down
ClpFlagD[3:0]={(Y3<=TileBot), (Y2<=TileBot), (Y1<=TileBot), (Y0>=TileBot)}
//up
ClpFlagU[3:0]={(Y3>=TileTop), (Y2>=TileTop), (Y1>=TileTop), (Y0>=TileTop)}

(ClpFlag[3] for triangles is don't care.). ClpFlagL[1] asserted means that vertex 1 is clipped by the left edge of the tile (the vertices have already been sorted by the quad generation unit 4, see FIG. 8 ). ClpFlagR[2] asserted means that vertex 2 is clipped by right edge of tile, and the like. Here are "clipped" means that the vertex lies outside of the tile.

5.4.6.2 Clipping Points

After using the clip codes to determine that a primitive intersects the boundaries of the current tile, clipping unit 5 clips the primitive to the tile by determining the values of nine possible clipping points. A clipping point is a vertex of a new polygon formed by clipping (finding area of intersection) the initial polygon by the boundaries of the current tile. There are nine possible clipping points because there are eight distinct locations were a polygon might intersect a tile's edge. For triangles only, there is an internal clipping point which equals y-sorted VtxMid. Of these nine possible clipping points, at most, eight of them can be valid at any one time.

For purposes of simplifying the discussion of clipping points in this specification, the following acronyms are adopted to represent each respective clipping point: (1) clipping on the top tile edge yields left (PTL) and right (PTR) clip vertices; (b) clipping on the bottom tile edge is performed identically to that on the top tile edge. Bottom edge clipping yields the bottom left (PBL) and bottom right (PBR) clip vertices; (c) clipping vertices sorted with respect to the x-coordinate yields left high/top (PLT) and left low/bottom (PLB) vertices; (d) clipping vertices sorted with respect to the y-coordinate yields right high/ top (PRT) and right low/bottom (PRB); and, (e) vertices that lie inside the tile are assigned to an internal clipping point (PI). Referring to FIG. 18, there is illustrated clipping points for two polygons, a rectangle 10 and a triangle 10 intersecting respective tiles 15 and 25.

5.4.6.3 Validation of Clipping Points

Clipping unit 5 (see FIG. 8) now validates each of the computed clipping points, making sure that the coordinates of each clipping point are within the coordinate space of the current tile. For example, points that intersect the top tile edge may be such that they are both to the left of the tile. In this case, the intersection points are marked invalid.

In a preferred embodiment of the present invention, each clip point has an x-coordinate, a y-coordinate, and a one bit valid flag. Setting the flag to "0" indicates that the x-coordinate and the y-coordinate are not valid. If the intersection with the edge is such that one or both off a tile's edge corners (such corners were discussed in greater detail above in section are included in the intersection, then newly generated intersection points are valid.

A primitive is discarded if none of its clipping points are found to be valid.

The pseudo-code for an algorithm for determining clipping points according to one embodiment of the present invention, is illustrated below:

---

Notation Note: P = (X, Y), eg. PT = (XT, YT);
Line(P1,P0) means the line formed by endpoints P1 and P0;
// Sort the Clip Flags in X
XsortClpFlagL[3:0] = LftC & RhtC ? ClpFlagL[3:0] :
ClpFlagL[XsortMidSrc,XsortRhtSrc,XsortLftSrc,XsortMidSrc], where indices of clip flags 3:0 referred to vertices. In particular, 0 represents bottom; 1 represents left; 2 represents right; and 3 represents top. For example, ClpFlagL[2] refers to time order vertex 2 is clipped by left edge. XsortClipFlagL[2] refers to right most vertex.
XsortClpFlagR[3:0] = LftC & RhtC ? ClpFlagR[3:0] :
ClpFlagR[XsortMidSrc,XsortRhtSrc,XsortLftSrc,XsortMidSrc]
XsortClpFlagD[3:0] = LftC & RhtC ? ClpFlagD[3:0] :
ClpFlagD[XsortMidSrc,XsortRhtSrc,XsortLftSrc,XsortMidSrc]
XsortClpFlagU[3:0] = LftC & RhtC ? ClpFlagU[3:0] :
ClpFlagU[XsortMidSrc,XsortRhtSrc,XsortLftSrc,XsortMidSrc]
// Sort the Clip Flags in Y
YsortClpFlagL[3:0] = LftC & RhtC ? ClpFlagL[3:0] :
ClpFlagL[YsortTopSrc,YsortMidSrc,YsortMidSrc,YsortBotSrc]
YsortClpFlagR[3:0] = LftC & RhtC ? ClpFlagR[3:0] :
ClpFlagR[YsortTopSrc,YsortMidSrc,YsortMidSrc,YsortBotSrc]
YsortClpFlagD[3:0] = LftC & RhtC ? ClpFlagD[3:0] :
ClpFlagD[YsortTopSrc,YsortMidSrc,YsortMidSrc,YsortBotSrc]
YsortClpFlagU[3:0] = LftC & RhtC ? ClpFlagU[3:0] :
ClpFlagU[YsortTopSrc,YsortMidSrc,YsortMidSrc,YsortBotSrc]
// Pass #1 Clip to Left Tile edge using X-sorted primitive
// For LeftBottom: check clipping flags, dereference vertices and slopes
If (XsortClipL[0])    // bot vertex clipped by TileLeft)
Then
    Pref= (quad)    ? P2
BotC  ? XsortRhtSrc→mux(P0, P1, P2)
TopC  ? XsortRhtSrc→mux(P0, P1, P2)
    Slope = (quad)? SL :  BotC   ? XsortSBTopC ? XsortSB
Else
    Pref= (quad)    ? P0 :
BotC  ? XsortMidSrc®mux(P0, P1, P2)
TopC  ? XsortRhtSrc
    Slope=    (quad)    ? SR :
BotC  ? XsortSL
TopC  ? XsortSB
EndIf
YLB = Yref + slope * (TileLeft − Xref)
// For LeftBottom: calculate intersection point, clamp, and check validity
IntYLB = (XsortClpFlgL[1])   ?   Yref + slope * (TileLeft − Xref) :
                                  XsortLftSrc→mux(Y0, Y1, Y2)
ClipYLB = (intYLB < TileBot) ?         TileBot :
IntXBL
ValidYLB = (intYBL <= TileTop)
//For LeftTop: check clipping flags, dereference vertices and slopes
If (XsortClpFlagL[3])      // Top vertex clipped by TileLeft)
Then
    Pref= (quad)    ? P2 :
BotC  ? XsortRhtSrc→mux(P0, P1, P2):
TopC  ? XsortRhtSrc→mux(P0, P1, P2):
    Slope= (quad)       ? SR :
      BotC ? XsortST
      TopC ? XsortST
Else
    Pref= (quad)    ? P3 :
      BotC ? XsortRhtSrc→mux(P0, P1, P2):
      TopC ? XsortMidSrc→mux(P0, P1, P2):
    Slope=    (quad) ? SL :
      BotC ? XsortST :
      TopC ? XsortSL
EndIf
YLT = Yref + slope * (TileLeft − Xref)

```
// For LeftTop: calculate intersection point, clamp, and check validity
IntYLT = (XsortClpFlgL[1]) ?    Yref + slope * (TileLeft – Xref)
                                XsortLftSrc→mux(Y0, Y1, Y2)
ClipYLT = (intYLT > TileTop) ?          TileTop :
                                        IntYLT
ValidYLT = (intYLT >= TileBot)
// The X Left coordinate is shared by the YLB and YLT
ClipXL = (XsortClpFlg1[1]) ?    TileLeft :
                                XsortLftSrc→mux(X0, X1, X2)
ValidClipLft = ValidYLB & ValidYLT
// Pass #2 Clip to Right Tile edge using X-sorted primitive
//For RightBot: check clipping flags, dereference vertices and slopes
If (XsortClpFlagR[0])           //Bot vertex clipped by TileRight
Then
        Pref= (quad)            ? P0 :
BotC    ? XsortMidSrc→mux(P0, P1, P2)
TopC    ? XsortRhtSrc→mux(P0, P1, P2)
        Slope=  (quad)          ? SR :
BotC    ? XsortSL
TopC    ? XsortSB
Else
        Pref= (quad)            ? P2 :
BotC    ? XsortRhtSrc→mux(P0, P1, P2)
TopC    ? XsortRhtSrc→mux(P0, P1, P2)
        Slope=  (quad) ? SL :
            BotC ? XsortSB
            TopC ? XsortSB
EndIf
// For RightBot: calculate intersection point, clamp, and check validity
IntYRB = (XsortClpFlgR[2]) ?    Yref + slope * (TileRight – Xref) :
                                XsortRhtSrc→mux(Y0, Y1, Y2)
ClipYRB = (intYRB < TileBot) ?          TileBot :
IntYRB
ValidYRB = (intYRB <= TileTop)
//For RightTop: check clipping flags, dereference vertices and slopes
If (XsortClpFlagR[3])           // Top vertex clipped by TileRight
Then
        Pref= (quad)            ? P3 :
BotC    ? XsortRhtSrc→mux(P0, P1, P2):
                TopC   ? XsortMidSrc→mux(P0, P1, P2):
        Slope= (quad)           ? SL :
            BotC ? XsortST :
            TopC ? XsortSL
Else
        Pref= (quad)            ? P2 :
BotC    ? XsortRhtSrc→mux(P0, P1, P2):
TopC    ? XsortRhtSrc→mux(P0, P1, P2):
        Slope= (quad)           ? SR :
            BotC ? XsortST
            TopC ? XsortST
EndIf
YRT = Yref + slope * (TileRight – Xref)
// For RightTop: calculate intersection point, clamp, and check validity
IntYRT = (XsortClpFlgR[2]) ?    Yref + slope * (TileRight – Xref)
                                XsortRhtSrc→mux(Y0, Y1, Y2)
ClipYRT = (intYRT > TileTop) ?          TileTop :
                                        IntYRT
Valid YRT = (intYRT >= TileBot)
// The X right coordinate is shared by the YRB and YRT
ClipXR = (XsortClpFlgR[2]) ?    TileRight :
                                XsortRhtSrc→mux(X0, X1, X2)
ValidClipRht = ValidYRB & ValidYRT
// Pass #3 Clip to Bottom Tile edge using Y-sorted primitive
// For BottomLeft: check clipping flags, dereference vertices and slopes
If (YsortClpFlagD[1])           // Left vertex clipped by TileBot)
Then
        Pref= (quad)            ? P3 :
LeftC   ? YsortTopSrc→mux(P0, P1, P2)
RhtC    ? YsortTopSrc→mux(P0, P1, P2)
        Slope=  (quad) ? SNL :
            LeftC   ? YsortSNL
            RightC          ? YsortSNL
Else
        Pref= (quad)            ? P1 :
            LeftC ? YsortMidSrc→mux(P0, P1, P2)
            RhtC ? YsortTopSrc→mux(P0, P1, P2)
        Slope=  (quad)          ? SNR :
LeftC   ? YsortSNB
RightC          ? YsortSNL
EndIf
// For BottomLeft: calculate intersection point, clamp, and check validity
IntXBL = (YsortClpFlgD[0]) ?    Xref + slope * (TileBot – Yref) :
                                YsortBotSrc→mux(X0, X1, X2)
ClipXBL = (intXBL < TileLeft) ?         TileLeft :
IntXBL
ValidXBL = (intXBL <= TileRight)
//For BotRight: check clipping flags, dereference vertices and slopes
If (YsortClpFlagD[2])           // Right vertex clipped by TileBot)
Then
        Pref= (quad)            ? P3 :
LeftC   ? YsoftTopSrc→mux(P0, P1, P2):
RhtC    ? YsoftTopSrc→mux(P0, P1, P2):
        Slope= (quad)           ? SNR :
            LeftC ? YsortSNR
            RightC          ? YsortSNR
Else
        Pref= (quad)            ? P2 :
LeftC   ? YsortTopSrc→mux(P0, P1, P2):
RhtC    ? YsortMidSrc→mux(P0, P1, P2):
        Slope=  (quad) ? SNL :
            LeftC   ? YsortSNR :
            RightC          ? YsortSNB
EndIf
// For BotRight: calculate intersection point, clamp, and check validity
IntXBR = (YsortClpFlgD[0]) ?    Xref + slope * (TileBot – Yref)
                                YsortBotSrc→mux(X0, X1, X2)
ClipXBR = (intXBR > TileRight) ?        TileRight :
                                        IntXTR
ValidXBR = (intXBR >= TileLeft)
// The Y bot coordinate is shared by the XBL and XBR
ClipYB = (YsortClpFlgD[0]) ?    TileBot :
                                YsortBotSrc→mux(Y0, Y1, Y2)
ValidClipBot = ValidXBL & ValidXBR
// Pass #4 Clip to Top Tile edge using Y-sorted primitive
//For TopLeft: check clipping flags, dereference vertices and slopes
If (ClpFlagU[1])                //Left vertex clipped by TileTop)
Then
        Pref= (quad)            ? P1 :
LftC    ? YsortMidSrc→mux(P0, P1, P2)
RhtC    ? YsortTopSrc→mux(P0, P1, P2)
        Slope=  (quad)          ? SNR :
LeftC   ? YsortSNB
RightC          ? YsortSNL
Else
        Pref= (quad)            ? P3 :
LftC    ? YsortTopSrc→mux(P0, P1, P2)
RhtC    ? YsortTopSrc→mux(P0, P1, P2)
        Slope=  (quad) ? SNL :
            LeftC ? YsortSNL
            RightC          ? YsortSNL
EndIf
// For topleft: calculate intersection point, clamp, and check validity
IntXTL = (YsortClpFlgU[3]) ?    Xref + slope * (TileTop – Yref) :
                                YsortTopSrc→mux(X0, X1, X2)
ClipXTL = (intXTL < TileLeft) ?         TileLeft :
IntXTL
ValidXTL = (intXTL <= TileRight)
//For TopRight: check clipping flags, dereference vertices and slopes
If (YsortClpFlagU[2])           // Right vertex clipped by TileTop)
Then
        Pref= (quad)            ? P2 :
LftC    ? YsortTopSrc→mux(P0, P1, P2):
RhtC    ? YsortMidSrc→mux(P0, P1, P2):
        Slope=  (quad)          ? SNL :
            LeftC ? YsortSNR :
            RightC          ? YsortSNB
Else
        Pref= (quad)            ? P3 :
LftC    ? YsoftTopSrc→mux(P0, P1, P2):
RhtC    ? YsoftTopSrc→mux(P0, P1, P2):
        Slope=  (quad)          ? SNR :
            LeftC ? YsortSNR :
            RightC          ? YsortSNR
EndIf
// For TopRight: calculate intersection point, clamp, and check validity
IntXTR = (YsortClpFlgU[3]) ?    Xref + slope * (TileTop – Yref)
                                YsortTopSrc→mux(X0, X1, X2)
```

-continued

```
ClipXTR = (intXTR > TileRight) ?      TileRight :
                                      IntXTR
Valid XTR = (intXTR >= TileLeft)
// The Y top coordinate is shared by the XTL and XTR
ClipYT = (YsortClpFlgU[3]) ?   TileTop :
                               YsortTopSrc→mux(Y0, Y1, Y2)
ValidClipTop = ValidXTL & ValidXTR
```

The 8 clipping points identifed so far can identify points clipped by the edge of the tile and also extreme vertices (ie topmost, bottommost, leftmost or rightmost) that are inside of the tile. One more clipping point is needed to identify a vertex that is inside the tile but is not at an extremity of the polygon (ie the vertex called VM)

```
// Identify Internal Vertex
(ClipXI, ClipYI) = YsortMidSrc→mux(P0, P1, P2)
ClipM = XsortMidSrc→mux(Clip0, Clip1, Clip2)
ValidClipI =  !(ClpFlgL[YsortMidSrc]) & !(ClpFlgR[YsortMidSrc])
         &    !(ClpFlgD[YsortMidSrc]) & !(ClpFlgU[YsortMidSrc])
```

Geometric Data Required By Cull 410:
Furthermore, some of the geometric data required by Cull Unit is determined here.
Geometric data required by cull:
CullXTL and CullXTR. These are the X intercepts of the polygon with the line of the top edge of the tile. They are different from the PTL and PTR in that PTL and PTR must be within or at the tile boundaries, while CullXTL and CullXTR may be right or left of the tile boundaries. If YT lies below the top edge of the tile then CullXTL =CullXTR= XT.

```
CullYTLR : the Y coordinate shared by CullXTL and CullXTR
(CullXL, CullYL) : equal to PL, unless YL lies above the top edge. In which case, it
equals (CullXTL, CullYTLR)
(CullXR, CullYR) : equal to PR, unless YR lies above the top edge. In which case, it
equals (CullXTR, CullYTLR)
// CullXTL and CullXTR (clamped to window range)
CullXTL = (IntXTL < MIN) ?MIN : IntXTL
CullXTR = (IntXTR > MAX) ?MAX :IntXTR
// (CullXL, CullYL) and (CullXR, CullYR)
VtxRht =    (quad) ?P2 : YsortMidSrc→mux(P0, P1, P2)
VtxLft = (quad) ?P1 : YsortMidSrc→mux(P0, P1, P2)
(CullXL, CullYL)temp = (YsortClipL clipped by TileTop) ?(IntXTL, IntYT) : VtxLft
(CullXL, CullYL) = (CullXLtemp < MIN) ? (ClipXL, ClipYLB) :CullXLtemp
(CullXR, CullYR)temp = (YsortClipR clipped by TileTop) ?(IntXTR, IntYT) : VtxRht
(CullXR, CullYR) = (CullXRtemp > MAX) ?(ClipXR, ClipYRB) :CullXRtemp
// Determine Cull Slopes
CullSR, CullSL, CullSB = cvt (YsortSNR, YsortSNL, YsortSNB)
```

5.4.6.4 Quadrilateral Vertices Outside of Window

Figure 19:
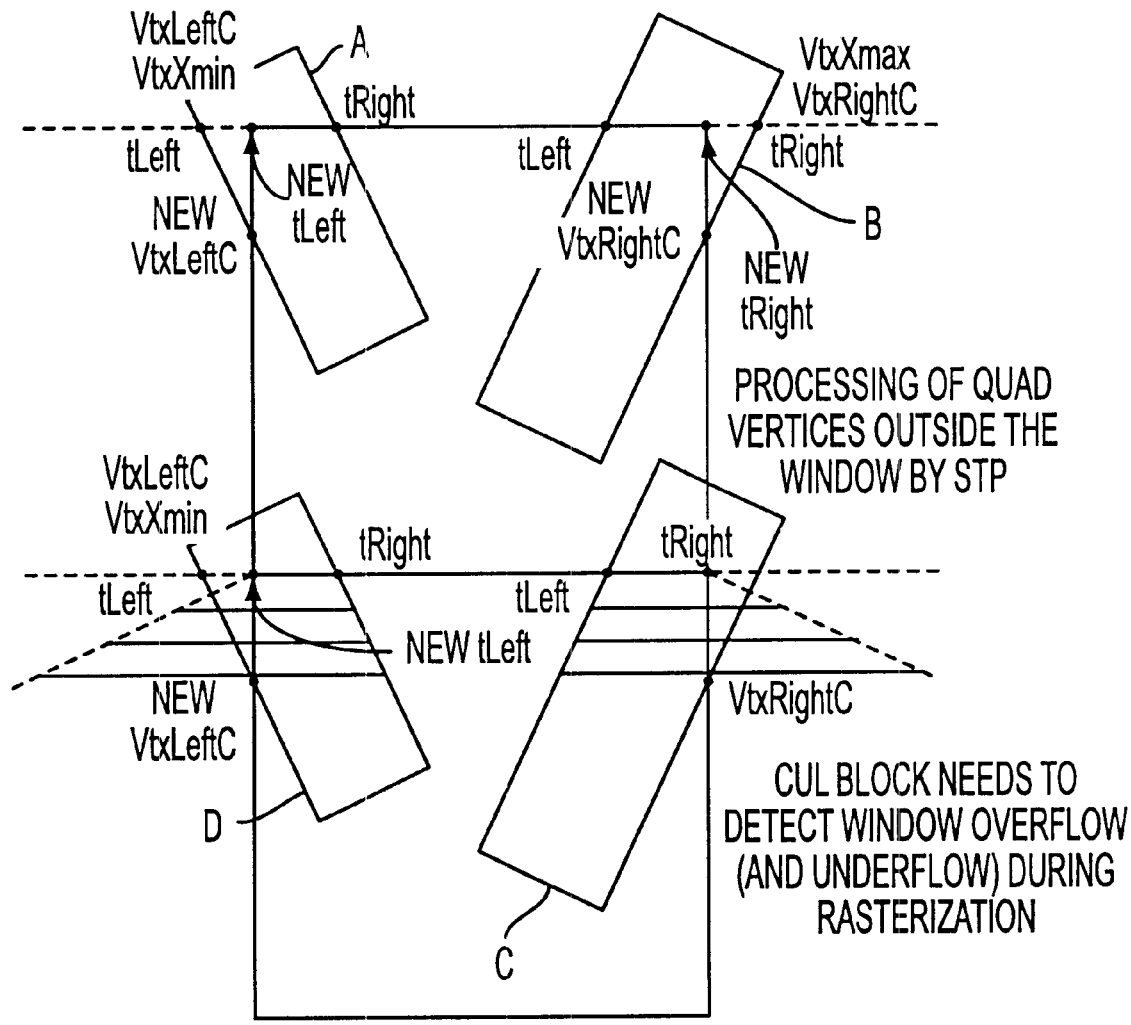
FIG. 19 illustrates aspects of processing quadrilateral vertices that lie outside of a 2-D window according to and embodiment of the present mention.
Figure 22:
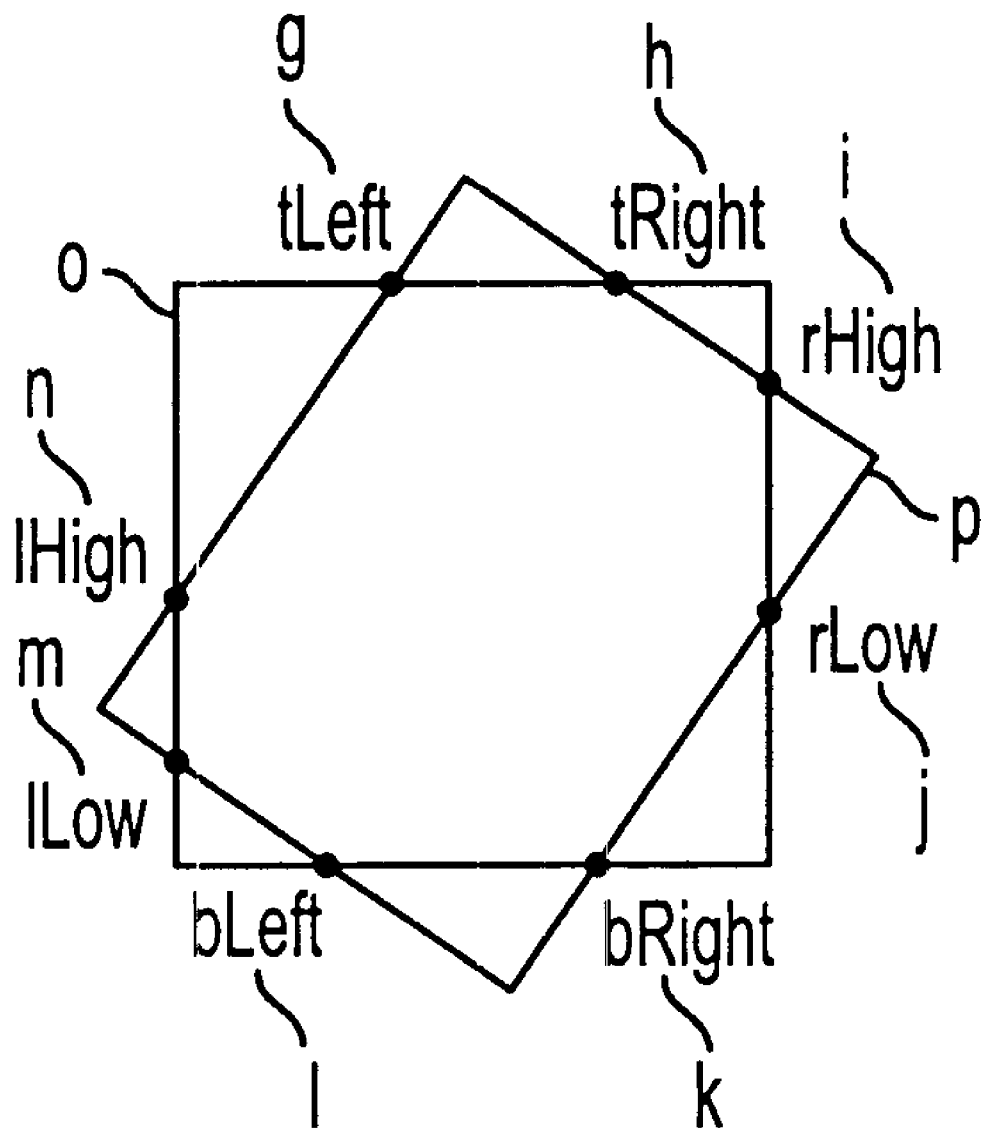
FIG. 22 illustrates aspects of clip code vertex assignment according to embodiment of the present invention; and, FIG. 23 illustrates aspects of unified primitive descriptor assignments, including corner flags, according to an embodiment of the present invention.

With wide lines on tiles at the edge of the window, it is possible that one or more of the calculated vertices (see section 5.4.5.1) may lie outside of the window range. Setup can handle this by carrying 2 bits of extra coordinate range, one to allow for negative values, one to increase the magnitude range. In a preferred embodiment of the present invention, the range and precision of the data sent to cull 410 (14.2 for x coordinates) is just enough to define the points inside the window range. The data cull 410 gets from setup 215 includes the left and right corner points. In cases where a quad vertex falls outside of the window range, Setup 215 will pass the following values to cull 410: (1) If tRight.x is right of the window range then clamp to right window edge; (2) If tLeft.x is left of window range then clamp to left window edge; (3) If v[VtxRightC].x is right of window range then send vertex rLow (that is, lower clip point on the right tile edge as the right corner); and, (4) If v[VtxLeftC].x is left of window range-then send Low (that is, the lower clip point on the left tile edge as the left corner). This is illustrated in FIG. 19, where there is shown an example of processing quadrilateral vertices outside of a window. (FIG. 18 corresponds to FIG. 51 in U.S. Provisional Patent Application Serial No. 60/097,336). FIG. 22 illustrates aspects of clip code vertex assignment.

Note that triangles are clipped to the valid window range by a previous stage of pipeline 200, for example, geometry 310. Setup 215, in the current context, is only concerned with quads generated for wide lines. Cull 410 (see FIG. 4) needs to detect overflow and underflow when it calculates the span end points during the rasterization, because out of range x values may be caused during edge walking. If an overflow or underflow occurs then the x-range should be clamped to within the tile range.

We now have determined a primitive's intersection points (clipping points) with respect to the current tile, and we have determined the clip codes, or valid flags. We can now proceed to computation of bounding box, a minimum depth value (Zmin), and a reference stamp, each of which will be described in greater detail below.

5.4.7 Bounding Box

The bounding box is the smallest box that can be drawn around the clipped polygon.

The bounding box of the primitive intersection is determined by examining the clipped vertices (clipped vertices, or clipping points are described in greater detail above). We use these points to compute dimensions for a bounding box.

The dimensions of of the bounding box are identified by BXL (the left most of valid clip points), BXR (the right most of valid clip points), BYT (the top most of valid clip points), BYB (the bottom most of valid clip points) in stamps. Here, stamp refers to the resolution we want to determine the bounding box to.

Finally, setup 215 identifies the smallest Y (the bottom most y-coordinate of a clip polygon). This smallest Y is required by cull 410 for its edge walking algorithm.

To illustrate a procedure, according to one embodiment of present invention, we now describe pseudocode for determining such dimensions of a bounding box. The valid flags for the clip points are as follows: ValidClipL (needs that clip points PLT and PLB are valid), ValidClipR, ValidClipT, and ValidClipB, correspond to the clip codes described in greater detail above in reference to clipping unit 5 (see FIG. 8). "PLT" refers to "point left, top." PLT and (ClipXL, ClipyLT) are the same.

```
BXLtemp = min valid(ClipXTL, ClipXBL);
BXL = ValidClipL ? ClipXL : BXLtemp;
BXRtemp = max valid(ClipXTR, ClipXBR);
BXR = ValidClipR ? ClipXR : BXRtemp;
BYTtemp = max valid(ClipYLT, ClipYRT);
BYT = ValidClipT ? ClipYT : BYTtemp;
BYBtemp = min valid(ClipYLB, ClipYRB);
BYB = ValidClipB ? ClipYB : BYBtemp;
CUllYB = trunc(BYB)subpixels (CUllYB is the smallest Y value);
//expressed in subpixels -- 8x8 subpixels = 1 pixel; 2x2 pixels = 1 stamp.
```

We now have the coordinates that describe a bounding box that circumscribes those parts of a primitive that intersect the current tile. These xmin (BXL), xmax (BXR), ymin (BYB), ymax (BYT) are in screen relative pixel coordinates and need to be converted to the tile relative stamp coordinates.

Screen relative coordinates can describe a 2048 by 2048 pixel screen. As discussed above, in a preferred embodiment of the present invention, tiles are only 16 by 16 pixels in size. By expressing coordinates as tile relative, we can save having to store many bits by converting from screen coordinates to tile relative coordinates. Converting from screen coordinates to tile relative coordinates is simply to ignore (or truncated) the most significant bits. To illustrate this, consider the example: it takes 11 bits to describe 2048 pixels, whereas it takes only 4 bits to describe 16 pixels. discarding the top 7 bits will yield a tile relative value. We now illustrate a set of equations for converting x-coordinates and y-coordinates from screen based values to tile relative values.

This can be accomplished by first converting the coordinates to tile relative values and then considering the high three bits only (i.e. shift right by 1 bit). This works; except when xmax (and/or ymax) is at the edge of the tile. In that case, we decrement the xmax (and/or ymax) by 1 unit before shifting.

```
// The Bounding box is expressed in stamps
BYT = trunc(BYT - 1 subpixel)stamp;
BYB = trunc(BYB)stamp;
BXL = trunc(BXL)stamp; and,
BXR = trunc(BXR - 1 subpixel)stamp.
```

5.4.8 Depth Gradients and Depth Offset Unit

The object of this functional unit is to:

Calculate Depth Gradients Zx=dz/dx and Zy=dz/dy

Calculate Depth Offset O, which will be applied in the Zmin & Zref subunit

Determine if triangle is x major or y major

Calculate the ZslopeMjr (z gradient along the major edge)

Determine ZslopeMnr (z gradient along the minor axis)

In the case of triangles, the input vertices are the time-ordered triangle vertices (X0, Y0, Z0), (X1, Y1, Z1), (X2, Y2, Z2). For lines, the input vertices are 3 of the quad vertices produced by Quad Gen (QXB, QYB, ZB), (QXL, QYL, ZL), (QXR, QYR, ZR). In case of stipple lines, the Z partials are calculated once (for the original line) and saved and reused for each stippled line segment.

In the case of line mode triangles, an initial pass through this subunit is taken to calculate the depth offset, which will be saved and applied to each of the triangle's edges in subsequent passes. The Depth Offset is calculated only for filled and line mode triangles and only if the depth offset calculation is enabled.

5.4.8.1 Depth Gradients

The vertices are first sorted before being inserted in to the equation to calculate depth gradients. For triangles, the sorting information is was obtained in the triangle preprocessing unit described in greater detail above. (The information is contained in the pointers YsortTopSrc, YsortMidSrc, and YsortBotSrc.). For quads, the vertices are already sorted by Quadrilateral Generation unit 4 described in greater detail above. Note: Sorting the vertices is desirable so that changing the input vertex ordering will not change the results.

We now describe pseudocode for sorting the vertices:
If triangles:

```
X'0 = YsortBotSrc→mux(x2,x1,x0); Y'0 = YsortBotSrc→mux(y2,y1,y0);
X'1 = YsortMidSrc→mux(x2,x1,x0); Y'0 = YsorMidSrc→mux(y2,y1,y0);
X'2 = YsortTopSrc→mux(x2,x1,x0); Y'0 = YsortTopSrc→mux(y2,y1,y0)
```

To illustrate the above notation, consider the following example where X'=ptr->mux(x2, x1, x0) means: if ptr=001, then X'=x0; if ptr=010; then X'=x1; and, if ptr=100, then X'=x2.

If Quads:

$$X'0 = QXB \quad Y'0 = QYB$$

$$X'1 = QXL \quad Y'1 = QYL$$

$$X'2 = QXR \quad Y'2 = QYR$$

The partial derivatives represent the depth gradient for the polygon. They are given by the following equation:

$$Z_X = \frac{\delta z}{\delta x} = \frac{(y'_2 - y'_0)(z'_1 - z'_0) - (y'_1 - y'_0)(z'_2 - z'_0)}{(x'_1 - x'_0)(y'_2 - y'_0) - (x'_2 - x'_0)(y'_1 - y'_0)}$$

$$Z_Y = \frac{\delta z}{\delta y} = \frac{(x'_1 - x'_0)(z'_2 - z'_0) - (x'_2 - x'_0)(z'_1 - z'_0)}{(x'_1 - x'_0)(y'_2 - y'_0) - (x'_2 - x'_0)(y'_1 - y'_0)}$$

5.4.8.2 Depth Offset 7 (see FIG. 8)

The depth offset for triangles (both line mode and filled) is defined by OpenGL® as:

O=M*factor+Res*units, w here:

M=max($|ZX|$, $|ZY|$) of the triangle;

Factor is a parameter supplied by the user;

Res is a constant; and,

Units is a parameter supplied by the user.

The "Res*units" term has already been added to all the Z values by a previous stage of pipeline 200, for example, geometry Geometry 310. So Setup's 215 depth offset component becomes:

O=M*factor*8

Clamp O to lie in the range (−224, +224)

The multiply by 8 is required to maintain the units. The depth offset will be added to the Z values when they are computed for Zmin and Zref later.

In case of line mode triangles, the depth offset is calculated once and saved and applied to each of the subsequent triangle edges.

5.4.8.2.1 Determine X Major for Triangles

In the following unit (Zref and Zmin Subunit) Z values are computed using an "edge-walking" algorithm. This algorithm requires information regarding the orientation of the triangle, which is determined here.

```
YT = YsortTopSrc→mux(y2,y1,y0);
YB = YsortBotSrc→mux(y2,y1,y0);
XR = XsortRhtSrc→mux(x2,x1,x0);
XL = XsortLftSrc→mux(x2,x1,x0);
DeltaYTB = YT - YB;
DeltaXRL = XR - XL;
    If triangle:
Xmajor = |DeltaXRL| >= |DeltaYTB|
    If quad
Xmajor = value of Xmajor as determined for lines in the TLP subunit.
```

An x-major line is defined in OpenGL® specification. In setup 215, an x-major line is determined early, but conceptually may be determined anywhere it is convenient.

5.4.8.2.2 Compute ZslopeMjr and ZslopeMnr (Z min and Z ref SubUnit) are the ZslopeMjr (Z derivative along the major edge), and ZslopeMnr (the Z gradient along the minor axis). Some definitions: (a) Xmajor Triangle: If the triangle spans greater or equal distance in the x dimension than the y dimension, then it is an Xmajor triangle, else it is a Ymajor triangle; (b) Xmajor Line: if the axis of the line spans greater or equal distance in the x dimension than the y dimension, then it is an Xmajor line, else it is a Ymajor line; (c) Major Edge (also known as Long edge). For Xmajor triangles, it is the edge connecting the Leftnost and Rightmost vertices. For Ymajor triangles, it is the edge connecting the Topmost and Bottommost vertices. For Lines, it is the axis of the line. Note that although, we often refer to the Major edge as the "long edge" it is not necessarily the longest edge. It is the edge that spans the greatest distance along either the x or y dimension; and, (d) Minor Axis: If the triangle or line is Xmajor, then the the minor axis is the y axis. If the triangle or line is Ymajor, then the minor axis is the x axis.

To compute ZslopeMjr and ZslopeMnr:

```
If Xmajor Triangle:
    ZslopeMjr = (ZL - ZR) / (XL - XR)         ZslopeMnr = ZY
If Ymajor Triangle:
    ZslopeMjr = (ZT - ZB) / (YT - YB)         ZslopeMnr = ZX
If Xmajor Line & (xCntUp==yCntUp)
    ZslopeMjr = (QZR - QZB) / (QXR - QXB)     ZslopeMnr = ZY
If Xmajor Line & (xCntUp != yCntUp)
    ZslopeMjr = (QZL - QZB) / (QXL - QXB)     ZslopeMnr = ZY
If Ymajor Line & (xCntUp==yCntUp)
    ZslopeMjr = (QZR - QZB) / (QYR - QYB)     ZslopeMnr = ZX
If Ymajor Line & (xCntUp != yCntUp)
    ZslopeMjr = (QZL - QZB) / (QYL - QYB)     ZslopeMnr = ZX
```

5.4.8.2.3 Special Case for Large Depth Gradients

It is possible for triangles to generate arbitrarily large values of Dz/Dx and Dz/Dy. Values that are too large present two problems caused by fixed point data paths and errors magnified by a large size of a depth gradient.

In a preferred embodiment of the present invention, because cull 410 has a fixed point datapath that is capable of handling Dz/Dx and Dz/Dy of no wider than 35b. These 35b are used to specify a value that is designated T27.7 (a two's complement number that has a magnitude of 27 integer bits and 7 fractional bits) Hence, the magnitude of the depth gradients must be less than $2^{27}$.

As mentioned above, computation of Z at any given (X,Y) coordinate would be subject to large errors, if the depth gradients were large. In such a situation, even a small error in X or Y will be magnified by the depth gradient. Therefore, in a preferred embodiment of the present invention, the following is done in case of large depth gradients, where GRMAX is the threshold for the largest allowable depth gradient (it is set via the auxiliary ring—determined and set via software executing on, for example, computer 101—see FIG. 1:

```
If( (|Dz/Dx| > GRMAX) or (|Dz/Dy| > GRMAX) )
Then
    If Xmajor Triangle or Xmajor Line
        Set ZslopeMnr = 0;
    Set Dz/Dx = ZslopeMjr;
        Set Dz/Dy = 0;
    If Ymajor Triangle or Ymajor Line
        Set ZslopeMnr = 0;
        Set Dz/Dx = 0; and,
        Set Dz/Dy = ZslopeMjr.
```

5.4.8.2.4 Discarding Edge-On Triangles

Edge-on triangles are detected in depth gradient unit 7 (see FIG. 8). Whenever the Dz/Dx or Dz/Dy is infinite (overflows) the triangle is invalidated. However, edge-on line mode triangles are not discarded. Each of the visible edges are to be rendered. In a preferred embodiment of the present invention the depth offset (if turned on) for such a triangle will however overflow, and be clamped to $+/-2^{24}$.

5.4.8.2.5 Infinite dx/dy

An infinite dx/dy implies that an edge is perfectly horizontal. In the case of horizontal edges, one of the two end-points has got to be a corner vertex (VtxLeftC or VtxRightC). With a primitive whose coordinates lie within the window range, Cull 410 (see FIG. 4) will not make use of an infinite slope. This is because with Cull's 410 edge walking algorithm, it will be able to tell from the y value of the left and/or right corner vertices that it has turned a corner and that it will not need to walk along the horizontal edge at all.

In this case, Cull's 410 edge walking will need a slope. Since the start point for edge walking is at the very edge of the window, any X that edge walking calculates with a correctly signed slope will cause an overflow (or underflow) and X will simply be clamped back to the window edge. So it is actually unimportant what value of slope it uses as long as it is of the correct sign.

A value of infinity is also a don't care for setup's 215 own usage of slopes. Setup uses slopes to calculate intercepts of primitive edges with tile edges. The equation for calculating the intercept is of the form $X=X_0+\_Y * dx/dy$. In this case, a dx/dy of infinity necessarily implies a _Y of zero. If the implementation is such that zero plus any number equals zero, then dx/dy is a don't care.

Setup 215 calculates slopes internally in floating point format. The floating point units will assert an infinity flag should an infinite result occur. Because Setup doesn't care about infinite slopes, and Cull 410 doesn't care about the magnitude of infinite slopes, but does care about the sign, setup 215 doesn't need to express infinity. To save the trouble of determining the correct sign, setup 215 forces an infinite slope to ZERO before it passes it onto Cull 410.

5.4.9 Z min and Z ref

We now compute minimum z value for the intersection of the primitive with the tile. The object of this subunit is to: (a) select the 3 possible locations where the minimum Z value may be; (b) calculate the Z's at these 3 points, applying a correction bias if needed; (c) sSelect he minimum Z value of the polygon within the tile; (d) use the stamp center nearest the location of the minimum Z value as the reference stamp location; (e) compute the Zref value; and, (f) apply the Z offset value.

There are possibly 9 valid clipping points as determined by the Clipping subunit. The minimum Z value will be at one of these points. Note that depth computation is an expensive operation, and therefore is desirable to minimize the number of depth computations that need to be carried out. Without pre-computing any Z values, it is possible to reduce the 9 possible locations to 3 possible Z min locations by checking the signs of ZX and ZY (the signs of the partial z derivatives in x and y).

Clipping points (Xmin0, Ymin0, Valid), (Xmin1, Ymin1, Valid), (Xmin2, Ymin2, Valid) are the 3 candidate Zmin locations and their valid bits. It is possible that some of these are invalid. It is desirable to remove invalid clipping points from consideration. To accomplish this, setup 215 locates the tile corner that would correspond to a minimum depth value if the primitive completely covered the tile. Once setup 215 has determined that tile corner, then setup 215 need only to compute the depth value at the two nearest clipped points.

These two values along with the z value at vertex iI (Clip Point PI) provide us with the three possible minimum z values. Possible clip points are PTL, PTR, PLT, PLB, PRT, PRB, PBR, PBL, and PI (the depth value of PI is always depth value of y-sorted middle (ysortMid)). The three possible depth value candidates must be compared to determine the smallest depth value and its location. We now know the minimum z value and the clip vertex it is obtained from. In a preferred embodiment of the present mentioned, Z-value is clamped to 24 bits before sending to Cull 410.

To to illustrate the above, referred to the pseudocode below for identifying those clipping point that are minimum depth value candidates:

Notational Note:

```
    ClipTL = (ClipXTL, ClipYT, ValidClipT), ClipLT = (ClipXL, YLT,
ValidClipL), etc
If(ZX>0) & (ZY>0) // Min Z is toward the bottom left
Then          (Xmin0, Ymin0) =   ValidClipL   ? ClipLB
ValidClipT    ? ClipTL
              : ClipRB
Zmin0Valid =         ValidClipL | ValidClipT | ValidClipR
              (Xmin1, Ymin1) =   ValidClipB   ? ClipBL
ValidClipR    ? ClipRB
              : ClipTL
Zmin1Valid =         ValidClipL | ValidClipB | ValidClipT
              (Xmin2, Ymin2) = ClipI
              Zmin2Valid = (PrimType == Triangle)
If (ZX>0) & (ZY<0) // Min Z is toward the top left
Then
              (Xmin0, Ymin0) =   ValidClipL   ? ClipLT
ValidClipB    ? ClipBL
              : ClipRT
Zmin0Valid =         ValidClipL | ValidClipB | ValidClipR
              (Xmin1, Ymin1) =   ValidClipT   ? ClipTL
ValidClipR    ? ClipRT
              : ClipBL
Zmin1Valid =         ValidClipT | ValidClipR | ValidClipB
              (Xmin2, Ymin2) = ClipI
              Zmin2Valid = (PrimType == Triangle)
If (ZX<0) & (ZY>0) // Min Z is toward the bottom right
Then          (Xmin0, Ymin0) =   ValidClipR   ? ClipRB
ValidClipT    ? ClipTR
              : ClipLB
Zmin0Valid =         ValidClipR | ValidClipT | ValidClipL
              (Xmin1, Ymin1) =   ValidClipB   ? ClipBR
ValidClipL    ? ClipLB
              : ClipTR
Zmin1Valid =         ValidClipB | ValidClipL | ValidClipT
              (Xmin2, Ymin2) = ClipI
              Zmin2Valid = (PrimType == Triangle)
If (ZX<0) & (ZY<0) // Min Z is toward the top right
Then          (Xmin0, Ymin0) =   ValidClipR   ? ClipRT
ValidClipB    ? ClipBR
              : ClipLT
Zmin0Valid =         ValidClipR | ValidClipB | ValidClipL
              (Xmin1, Ymin1) =   ValidClipT   ? ClipTR
ValidClipL    ? ClipLT
              : ClipBR
Zmin1Valid =         ValidClipT | ValidClipL | ValidClipB
              (Xmin2, Ymin2) = ClipI
              Zmin2Valid = (PrimType == Triangle)
```

Figure 20:
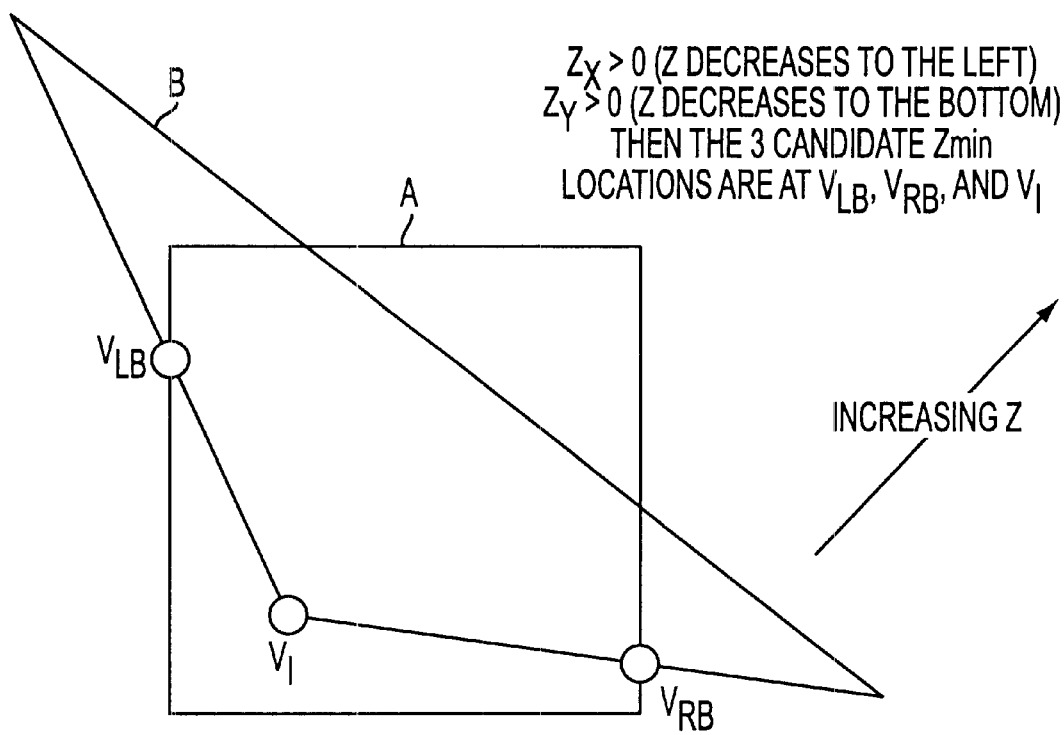
FIG. 20 illustrates an example of a triangle's minimum depth value vertex candidates according to embodiment of the present invention.

Referring to FIG. 20, there is shown in example of Zmin candidates.

5.4.9.1 The Z Calculation Algorithm

The following algorithm's path of computation stays within a triangle and will produce intermediate Z values that are within the range of $2^{24}$ (this equation will not cause from massive cancellation due to use of limited precision floating point units). For a Y major triangle:

$$Zdest = +(Ydest - Ytop) * ZslopeMjr \quad (1)$$
$$+(Xdest - ((Ydest - Ytop) * DX/Dylong + Xtop)) * ZslopeMnr \quad (2)$$
$$+Ztop \quad (3)$$
$$+offset \quad (4)$$

Line (1) represents the change in Z as you walk along the long edge down to the appropriate Y coordinate. Line (2) is the change in Z as you walk in from the long edge to the destination X coordinate.

For an X major triangle the equation is analogous:

$$Zdest = +(Xdest - Xright) * ZslopeMjr \quad (1)$$
$$+(Ydest - ((Xdest - Xright) * Dy/Dxlong + Yright)) * ZslopeMnr \quad (2)$$
$$+Ztop \quad (3)$$
$$+offset \quad (4)$$

For dealing with large values of depth gradient, the values specified in special case for large depth gradients (discussed in greater detail above) are used.

5.4.9.2 Compute Z's for Zmin Candidates

The 3 candidate Zmin locations have been identified (discussed above in greater detail). Remember that a flag needs to be carried to indicate whether each Zmin candidate is valid or not.

```
   Compute: If Ymajor triangle:
Zmin0 = +(Ymin0 - Ytop) * ZslopeMjr + (Xmin0 - ((Ymin0 - Ytop) *
DX/Dylong + Xtop)) * ZslopeMnr (note that Ztop and offset are NOT
yet added).
```

-continued

If Xmajor triangle:
Zmin0 = +(Xmin0 − Xright) * ZslopeMjr + (Ymin0 −
((Xmin0 − Xright) * DX/Dylong + Xtop)) * ZslopeMnr
(note that Zright and offset are NOT yet added).

A correction to the zmin value may need to be applied if the xmin0 or ymin0 is equal to a tile edge. Because of the limited precision math units used, the value of intercepts (computed above while calculating intersections and determining clipping points) have an error less than +/−1/16 of a pixel. To guarantee then that we compute a Zmin that is less than what would be the infinitely precise Zmin, we apply a Bias to the zinin that we compute here.

If xmin0 is on a tile edge, subtract |dZ/dY|/16 from zmin0;
If ymin0 is on a tile edge, subtract |dZ/dX|/16 from zmin1;
If xmin0 and ymin0 are on a tile corner, don't subtract anything; and,
If neither xmin0 nor ymin0 are on a tile edge, don't subtract anything.

The same equations are used to compute Zmin1 and Zmin2

5.4.9.3 Determine Zmin

The minimum valid value of the three Zmin candidates is the Tile's Zmin. The stamp whose center is nearest the location of the Zmin is the reference stamp. The pseudocode for selecting the Zmin is as follows:

ZminTmp = (Zmin1 < Zmin0) &
Zmin1Valid | !Zmin0Valid ? Zmin1 : Zmin0;
ZminTmpValid = (Zmin1 < Zmin0) &
Zmin1Valid | !Zmin0Valid ? Zmin1Valid:
Zmin0Valid; and,
Zmin = (ZminTmp < Zmin2) &
ZminTmpValid | !Zmin2Valid ? ZminTmp : Zmin2.

The x and y coordinates corresponding to each Zmin0, Zmin1 and Zmin 2 are also sorted in parallel along with the determination of Zmin. So when Zmin is determined, there is also a corresponding xmin and ymin.

5.4.10 Reference Stamp and Z ref

Instead of passing Z values for each vertex of the primitive to cull 410, Setup passes a single Z value, representing the Z value at a specific point within the primitive. Setup chooses a reference stamp that contains the vertex with the minimum z. The reference stamp is the stamp the center is closest to the location of Zmin has determined in section 5.4.9.3. (Coordinates are called xmin, ymin.). That stamp center is found by truncating the xmin and ymin values to the nearest even value. For vertices on the right edge, the x-coordinates are decremented and for the top edge the y-coordinate is decremented before the reference stamp is computed to ensure choosing a stamp center that is within tile boundaries.

Logic Used to Identify the Reference Stamp

The reference Z value, "Zref" is calculated at the center of the reference stamp. Setup 215 identifies the reference stamp with a pair of 3 bit values, xRefStamp and yRefStamp, that specify its location in the Tile. Note that the reference stamp is identified as an offset in stamps from the corner of the Tile. To get an offset in screen space, the number of subpixels in a stamp are multiplied. For example: x=x tile coordinate multiplied by the number of pixels in the width of a tile plus xrefstamp multiplied by two. This gives us an x-coordinate in pixels in screen space.

The reference stamp must touch the clipped polygon. To ensure this, choose the center of stamp nearest the location of the Zmin to be the reference stamp. In the Zmin selection and sorting, keep track of the vertex coordinates that were ultimately chosen. Call this point (Xmin, Ymin).

If Zmin is located on rht tile edge, then clamp Xmin= tileLft+7stamps

If Zmin is located on top tile edge, then clamp:

Ymin = tileBot + 7stamps;
Xref = trunc(Xmin)stamp + 1pixel (truncate to snap to stamp resolution);
and,
Yref = trunc(Ymin)stamp + 1pixel (add 1pixel to move to stamp center).
Calculate Zref using an analogous equation to the zMin calculations.
Compute:
If Ymajor triangle:
Zref = + (Yref − Ytop) * ZslopeMjr +
(Xref − ((Yref − Ytop) * DX/Dylong + Xtop)) * ZslopeMnr
note that Ztop and offset are NOT yet added).
If Xmajor triangle: Zref = + (Xref − Xright) * ZslopeMjr +
(Yref − ((Xref − Xright) * DX/Dylong + Xtop)) * ZslopeMnr
(note that Zright and offset are NOT yet added).

5.4.10.1 Apply Depth Offset

The Zmin and Zref calculated thus far still need further Z components added.

If Xmajor:
(a) Zmin = Zmin + Ztop + Zoffset;
(b) Clamp Zmin to lie within range (−2^24, 2^24); and
(c) Zref = Zref + Ztop + Zoffset.
If Ymajor:
(a) Zmin = Zmin + Zright + Zoffset;
(b) clamp Zmin to lie within range (−2^24, 2^24); and,
(c) Zref = Zref + Zright + Zoffset.

5.4.11 X and Y coordinates passed to cull 410

Setup calculates Quad vertices with extended range. (s12.5 pixels). In cases here a quad vertex does fall outside of the window range, Setup will pass the following values to Cull 410:

If XTopR is right of window range then clamp to right window edge

If XTopL is left of window range then clamp to left window edge

If XrightC is right of window range then pick RightBot Clip Point

If XleftC is left of window range then pick LeftBot Clip Point

Ybot is always the min Y of the Clip Points

Referring to FIG. 21, there are shown example of out of range quad vertices.

5.4.11.1 Title Relative X-coordinates and Y-coordinates

Sort 320 sends screen relative values to setup 215. Setup 215 does most calculations in screen relative space. Setup 215 then converts results to tile relative space for cull 410. Cull 410 culls primitives using these coordinates. The present invention is a tiled architecture. Both this invention and the mid-pipeline cull unit 410 is novel. Cull 410 requires a new type of information that is not calculated by conventional setup units. For example, consider the last 21 elements in setup output primitive packet 6000 (see table 6). Some of these elements are tile relative which helps efficiency of subsequent processing stages of pipeline 200.

TABLE 1

Example of begin frame packet 1000

| BeginFramePacket parameter | bits/packet | Starting bit | Source | Destination/Value | |
|---|---|---|---|---|---|
| Header | 5 | | send unit | | |
| Block3DPipe | 1 | 0 | SW | BKE | |
| WinSourceL | 8 | 1 | SW | BKE | |
| WinSourceR | 8 | 9 | SW | BKE | |
| WinTargetL | 8 | 17 | SW | BKE | duplicate wi |
| WinTargetR | 8 | 25 | SW | BKE | duplicate wi |
| WinXOffset | 8 | 33 | SW | BKE | tiles are du |
| WinYOffset | 12 | 41 | SW | BKE | |
| PixelFormat | 2 | 53 | SW | BKE | |
| SrcColorKeyEnable3D | 1 | 55 | SW | BKE | |
| DestColorKeyEnable3D | 1 | 56 | SW | BKE | |
| NoColorBuffer | 1 | 57 | SW | PIX, BKE | |
| NoSavedColorBuffer | 1 | 58 | SW | PIX, BKE | |
| NoDepthBuffer | 1 | 59 | SW | PIX, BKE | |
| NoSavedDepthBuffer | 1 | 60 | SW | PIX, BKE | |
| NoStencilBuffer | 1 | 61 | SW | PIX, BKE | |
| NoSavedStencilBuffer | 1 | 62 | SW | PIX, BKE | |
| StencilMode | 1 | 63 | SW | PIX | |
| DepthOutSelect | 2 | 64 | SW | PIX | |
| ColorOutSelect | 2 | 66 | SW | PIX | |
| ColorOutOverflowSelect | 2 | 68 | SW | PIX | |
| PixelsVert | 11 | 70 | SW | SRT, BKE | |
| PixelsHoriz | 11 | 81 | SW | SRT | |
| SuperTileSize | 2 | 92 | SW | SRT | |
| SuperTileStep | 14 | 94 | SW | SRT | |
| SortTranspMode | 1 | 108 | SW | SRT, CUL | |
| DrawFrontLeft | 1 | 109 | SW | SRT | |
| DrawFrontRight | 1 | 110 | SW | SRT | |
| DrawBackLeft | 1 | 111 | SW | SRT | |
| DrawBackRight | 1 | 112 | SW | SRT | |
| StencilFirst | 1 | 113 | SW | SRT | |
| BreakPointFrame | 1 | 114 | SW | SRT | |
| | 120 | | | | |

TABLE 2

Example of begin tile packet 2000

| BeginTilePacket parameter | bits/packet | Starting bit | Source | Destination | |
|---|---|---|---|---|---|
| PktType | 5 | 0 | | | |
| FirstTileInFrame | 1 | 0 | SRT | STP to BKE | |
| BreakPointTile | 1 | 1 | SRT | STP to BKE | |
| TileRight | 1 | 2 | SRT | BKE | |
| TileFront | 1 | 3 | SRT | BKE | |
| TileXLocation | 7 | 4 | SRT | STP, CUL, PIX, BKE | |
| TileYLocation | 7 | 11 | SRT | STP, CUL, PIX, BKE | |
| TileRepeat | 1 | 18 | SRT | CUL | |
| TileBeginSubFrame | 1 | 19 | SRT | CUL | |
| BeginSuperTile | 1 | 20 | SRT | STP to BKE | for perf cou |
| OverflowFrame | 1 | 21 | SRT | PIX, BKE | |
| WriteTileZS | 1 | 22 | SRT | BKE | |
| BackendClearColor | 1 | 23 | SRT | PIX, BKE | |
| BackendClearDepth | 1 | 24 | SRT | CUL, PIX, BKE | |
| BackendClearStencil | 1 | 25 | SRT | PIX, BKE | |

TABLE 2-continued

Example of begin tile packet 2000

| BeginTilePacket parameter | bits/packet | Starting bit | Source | Destination |
|---|---|---|---|---|
| ClearColorValue | 32 | 26 | SRT | PIX |
| ClearDepthValue | 24 | 58 | SRT | CUL, PIX |
| ClearStencilValue | 8 | 82 | SRT | PIX |
| | 95 | | | |

TABLE 3

Example of clear packet 3000

| Srt2StpClear parameter | bits/packet | Starting bit | Source | Destination/Value |
|---|---|---|---|---|
| Header | 5 | 0 | | |
| PixelModeIndex | 4 | 0 | | |
| ClearColor | 1 | 4 | SW | CUL, PIX |
| ClearDepth | 1 | 5 | SW | CUL, PIX |
| ClearStencil | 1 | 6 | SW | CUL, PIX |
| ClearColorValue | 32 | 7 | SW | SRT, PIX |
| ClearDepthValue | 24 | 39 | SW | SRT, CUL, PIX |
| ClearStencilValue | 8 | 63 | SW | SRT, PIX |
| SendToPixel | 1 | 71 | SW | SRT, CUL |
| | | 72 | | |
| ColorAddress | 23 | 72 | MEX | MIJ |
| ColorOffset | 8 | 95 | MEX | MIJ |
| ColorType | 2 | 103 | MEX | MIJ |
| ColorSize | 2 | 105 | MEX | MIJ |
| | 112 | | | |

TABLE 4

Example of cull packet 4000

| parameter | bits/packet | Starting Bit | Source | Destination |
|---|---|---|---|---|
| SrtOutPktType | 5 | | SRT | STP |
| CullFlushAll | 1 | 0 | SW | CUL |
| reserved | 1 | 1 | SW | CUL |
| OffsetFactor | 24 | 2 | SW | STP |
| | 31 | | | |

TABLE 5

Example of end frame packet 5000

| EndFramePacket parameter | bits/packet | Starting bit | Source | Destination/Value |
|---|---|---|---|---|
| Header | 5 | 0 | | |
| InterruptNumber | 6 | 0 | SW | BKE |
| SoftEndFrame | 1 | 6 | SW | MEX |
| BufferOverflowOccurred | 1 | 7 | MEX | MEX, SRT |
| | 13 | | | |

TABLE 6

Example of primitive packet 6000

| parameter | bits/packet | Starting Address | Source | Destination |
|---|---|---|---|---|
| SrtOutPktType | 5 | 0 | SRT | STP |
| ColorAddress | 23 | 5 | MEX | MIJ |
| ColorOffset | 8 | 28 | MEX | MIJ |
| ColorType | 2 | 36 | MEX | MIJ, STP |
| ColorSize | 2 | 38 | MEX | MIJ |
| LinePointWidth | 3 | 40 | MEX | STP |
| Multisample | 1 | 43 | MEX | STP, CUL, PIX |
| CullFlushOverlap | 1 | 44 | SW | CUL |
| DoAlphaTest | 1 | 45 | GEO | CUL |
| DoABlend | 1 | 46 | GEO | CUL |
| DepthFunc | 3 | 47 | SW | CUL |
| DepthTestEnabled | 1 | 50 | SW | CUL |
| DepthMask | 1 | 51 | SW | CUL |
| PolygonLineMode | 1 | 52 | SW | STP |
| ApplyOffsetFactor | 1 | 53 | SW | STP |
| LineFlags | 3 | 54 | GEO | STP |
| LineStippleMode | 1 | 57 | SW | STP |
| LineStipplePattern | 16 | 58 | SW | STP |

TABLE 6-continued

Example of primitive packet 6000

| parameter | bits/packet | Starting Address | Source | Destination |
|---|---|---|---|---|
| LineStippleRepeatFactor | 8 | 74 | SW | STP |
| WindowX2 | 14 | 82 | GEO | STP |
| WindowY2 | 14 | 96 | GEO | STP |
| WindowZ2 | 26 | 110 | GEO | STP |
| StartLineStippleBit2 | 4 | 136 | GEO | STP |
| StartStippleRepeatFactor2 | 8 | 140 | GEO | STP |
| WindowX1 | 14 | 148 | GEO | STP |
| WindowY1 | 14 | 162 | GEO | STP |
| WindowZ1 | 26 | 176 | GEO | STP |
| StartLineStippleBit1 | 4 | 202 | GEO | STP |
| StartStippleRepeatFactor1 | 8 | 206 | GEO | STP |
| WindowX0 | 14 | 214 | GEO | STP |
| WindowY0 | 14 | 228 | GEO | STP |
| WindowZ0 | 26 | 242 | GEO | STP |
| StartLineStippleBit0 | 4 | 268 | GEO | STP |
| StartStippleRepeatFactor0 | 8 | 272 | GEO | STP |
| | 280 | | | |

TABLE 7

Example of setup output primitive packet 7000

| Parameter | Bits | Starting bit | Source | Destination | Comments |
|---|---|---|---|---|---|
| StpOutPktType | 5 | | STP | CUL | |
| ColorAddress | 23 | 0 | MEX | MIJ | |
| ColorOffset | 8 | 23 | MEX | MIJ | |
| ColorType | 2 | 31 | MEX | MIJ | 0 = strip 1 = fan 2 = line 3 = point These 6 bits of colortype, colorsize, and colorEdgeId are encoded as EESSTT. |
| ColorSize | 2 | 33 | MEX | MIJ | |
| ColorEdgeId | 2 | 35 | STP | CUL | 0 = filled, 1 = v0v1, 2 = v1v2, 3 = v2v0 |
| LinePointWidth | 3 | 37 | GEO | CUL | |
| Multisample | 1 | 40 | SRT | CUL, FRG, PIX | |
| CullFlushOverlap | 1 | 41 | GEO | CUL | |
| DoAlphaTest | 1 | 42 | GEO | CUL | |
| DoABlend | 1 | 43 | GEO | CUL | |
| DepthFunc | 3 | 44 | SW | CUL | |
| DepthTestEnable | 1 | 47 | SW | CUL | |
| DepthMask | 1 | 48 | SW | CUL | |
| dZdx | 35 | 49 | STP | CUL | z partial along x; T27.7 (set to zero for points) |
| dZdy | 35 | 84 | STP | CUL | z partial along y; T27.7 (set to zero for points) |
| PrimType | 2 | 119 | STP | CUL | 1 => triangle 2 => line, and 3 => point This is in addition to ColorType and ColorEdgeID. This is incorporated so that CUL does not have to decode ColorType. STP creates unified packets for triangles and lines. But they may have different aliasing state. So CUL needs to know whether the packet is point, line, or triangle. |
| LeftValid | 1 | 121 | STP | CUL | LeftCorner valid? (don't care for points) |
| RightValid | 1 | 122 | STP | CUL | RightCorner valid? (don't care for points) |
| XleftTop | 24 | 123 | STP | CUL | Left and right intersects with top tile edge. Also contain xCenter for point. Note that these points are used to start edge walking on the left and right edge respectively. So these may actually be outside the edges of the tile. (11.13) |

TABLE 7-continued

Example of setup output primitive packet 7000

| Parameter | Bits | Starting bit | Source | Destination | Comments |
|---|---|---|---|---|---|
| XrightTop | 24 | 147 | STP | CUL | Bbox Ymax. Tile relative. 5.3 |
| YLRTOP | 8 | 171 | STP | CUL | |
| XleftCorner | 24 | 179 | STP | CUL | x window coordinate of the left corner (unsigned fixed point 11.13). (don't care for points) |
| YleftCorner | 8 | 203 | STP | CUL | tile-relative y coordinate of left corner (unsigned 5.3). (don't care for points) |
| XrightCorner | 24 | 211 | STP | CUL | x window coordinate of the right corner, unsigned fixed point 11.13. (don't care for points) |
| YrightCorner | 8 | 235 | STP | CUL | tile-relative y coordinate of right corner 5.3; also contains Yoffset for point |
| YBot | 8 | 243 | STP | CUL | Bbox Ymin. Tile relative. 5.3 |
| DxDyLeft | 24 | 251 | STP | CUL | slope of the left edge. T14.9 (don't care for points) |
| DxDyRight | 24 | 275 | STP | CUL | slope of the right edge, T14.9 (don't care for points) |
| DxDyBot | 24 | 299 | STP | CUL | slope of the bottom edge. T14.9 (don't care for points) |
| XrefStamp | 3 | 323 | STP | CUL | ref stamp x index on tile (set to zero for points) |
| YrefStamp | 3 | 326 | STP | CUL | ref stamp y index on tile (set to zero for points) |
| ZRefTile | 32 | 329 | STP | CUL | Ref z value, s28.3 |
| XmaxStamp | 3 | 361 | STP | CUL | Bbox max stamp x index |
| XminStamp | 3 | 364 | STP | CUL | Bbox min stamp x index |
| YmaxStamp | 3 | 367 | STP | CUL | Bbox min stamp y index |
| YminStamp | 3 | 370 | STP | CUL | Bbox max stamp y index |
| ZminTile | 24 | 373 | STP | CUL | min z of the prim on tile |
| | 402 | | | | |

What is claimed is:

1. A three-dimensional (3-D) graphics processor for generating a rendered image from image data including vertices describing a plurality of graphics primitives, the processor comprising:
   (1) asort unit comprising: (1a) logic spatially sorting the plurality of graphics primitives according to their location within the rendered two-dimensional image; and (1b) logic outputting the spatially sorted primitives according to their spatial sorting; and
   (2) a setup unit comprising (2a) logic computing spatial derivatives of the spatially sorted primitives received from the sort unit; and (2b) logic converting at least some of the spatially sorted primitives into a uniform quadrilateral representation having four vertices.

2. The 3-D graphics processor of claim 1 wherein:
the sort unit further comprising:
   logic sorting the graphics primitives according to a plurality of tiles, each tile being a region encompassing an area of the rendered image, the plurality of tiles jointly covering the entire area of the rendered image;
      memory storing the plurality of sorted graphics primitives;
      logic selecting a current tile from the plurality of tiles; and
      logic outputting spatially sorted primitives from the current tile; and
wherein said logic computing spatial derivatives computes spatial derivatives for each of the spatially sorted primitives one or more times, the number of times being equal to the number of tiles overlapped by each of the spatially sorted primitives.

3. The 3-D graphics processor of claim 2 wherein the setup unit further comprising:
   logic computing a minimum depth value for that part of each of the received spatially sorted primitives intersecting the current tile.

4. The 3-D graphics processor of claim 2, wherein the setup unit further comprising:
   logic breaking up a stippled line primitive into multiple individual line segments, with lengths of the individual line segments corresponding to sequences of 1 bits in a stipple pattern, each of the individual line segments being sent to subsequent units in the 3-D graphics pipeline as separate primitives; and
   logic reducing unnecessary processing by discarding the individual line segments that lie outside of the current tile;
   logic generating vertex values that comprise tile relative y-values and screen relative x-values; and
   logic generating, for each of the received spatially sorted primitives, a bounding box that circumscribes those parts of the received spatially sorted primitives that intersect the current tile.

5. The 3-D graphics processor of claim 1 wherein the converting logic further comprises:
   (a) means for generating the uniform quadrilateral representation by computing four new vertices from the two vertices of the line segment, if the received spatially sorted primitive is a line segment represented by two vertices; and
   (b) means for generating the uniform quadrilateral representation by selecting the three vertices of the triangle and labeling a fourth vertex as invalid, if the received spatially sorted primitive is a triangle represented by three vertices.

6. The 3-D graphics processor of claim 5 wherein the setup unit further comprising:
   logic clipping the unified quadrilateral representation to a tile, the tile being a rectangular region within the area of rendered image, the clipped representation comprising a left top vertex and a right top vertex both located at the top edge of the tile.

7. The graphics processor of claim 1, wherein the logic outputting the spatially sorted primitives according to their spatial sorting further outputting spatially sorted primitives such that all primitives sorted to a first spatial region in the rendered image are output before any primitives sorted to a second spatial region independent of the object to which the primitive corresponds.

8. The graphics processor of claim 1, wherein the logic spatially sorting the plurality of graphics primitives comprises logic spatially sorting a plurality of uniform quadrilateral primitive representations having four vertices.

9. The 3-D graphics processor of claim 1, the converting logic comprising a uniform quadrilateral primitive representation generator for:

(i) generating the uniform quadrilateral representation by computing four new vertices from the two vertices of the line segment, if the received spatially sorted primitive is a line segment represented by two vertices; and (b) generating the uniform quadrilateral representation by selecting the three vertices of the triangle and labeling a fourth vertex as invalid, if the received spatially sorted primitive is a triangle represented by three vertices.

10. The 3-D graphics processor of claim 5, wherein the converting logic converts all of the received spatially sorted primitives into a uniform quadrilateral representation.

11. The 3-D graphics processor of claim 5, wherein said other than a quadrilateral representation includes a two-vertex line representation and a three-vertex triangle representation.

12. A three-dimensional (3-D) graphics processor for generating a rendered image from image data including vertices describing a plurality of graphics primitives, the processor comprising:

(1) a sort unit comprising: (1a) logic spatially sorting the plurality of graphics primitives according to their location within the rendered two-dimensional image; and (1b) logic outputting the spatially sorted primitives according to their spatial sorting; and (2) a setup unit comprising:
logic computing spatial derivatives of the spatially sorted primitives received from the sort unit;
logic sorting the vertices of each of the spatially sorted primitives and using the sorted vertices in subsequent operations;
logic converting a line segment represented by two vertices into a quadrilateral, the quadrilateral being represented by four vertices;
logic calculating depth gradients using the sorted vertices; and
logic generating pointers to identify the sorting order of the vertices.

13. A three-dimensional (3-D) graphics rendering method for generating a rendered image from a plurality of graphics primitives, the method comprising:

receiving a graphics primitive, the graphics primitive comprising one or more vertices;

converting the graphics primitive into a uniform quadrilateral representation having four vertices, the converting step further comprising:

(a) if the graphics primitive is a line segment represented by two vertices, computing four new vertices from the two vertices of the line segment for inclusion in the uniform quadrilateral representation; and (b) if the graphics primitive is a triangle represented by three vertices, selecting the three vertices of the triangle and labeling a fourth vertex as invalid for inclusion in the uniform quadrilateral representation.

14. The method of claim 13, further comprising:
clipping the unified quadrilateral representation to a tile, the tile being a rectangular region within the area of rendered image, the clipped representation comprising a left top vertex and a right top vertex both located at the top edge of the tile.

15. The method of claim 13, further comprising:
packaging the clipped representation into a primitive packet, the primitive packet representing one primitive; and
processing the primitive packet to cull out parts of the primitive that definitely do not contribute to the rendered image.

16. The method of claim 13, wherein the converting step further comprising:
computing a partial spatial derivative of z with respect to x and a partial spatial derivative of z with respect to y for inclusion in the uniform quadrilateral representation.

17. The method of claim 13, wherein said converting comprises converting each of the received spatially sorted primitives into a uniform quadrilateral representation.

18. A computing system for generating a rendered image from image data including vertices describing a plurality of graphics primitives, the system comprising:
a general-purpose computer; and
a graphics processor coupled to host processor; the graphics processor comprising:

(1) a sort unit comprising: (1a) logic spatially sorting the plurality of graphics primitives according their location within the rendered two-dimensional image; and (1b) logic outputting the spatially sorted primitives according to their spatial sorting; and (2) a setup unit comprising (2a) logic computing spatial derivatives of the spatially sorted primitives received from the sort unit; and (2b) logic converting at least some of the spatially sorted primitives into a uniform quadrilateral representation having four vertices.

19. The computing system of claim 18 wherein:
the sort unit further comprises:
logic sorting the graphics primitives according to a plurality of tiles, each tile being a region encompassing an area of the rendered image, the plurality of tiles jointly covering the entire area of the rendered image;
memory storing the plurality of sorted graphics primitives;
logic selecting a current tile from the plurality of tiles; and
logic outputting spatially sorted primitives from the current tile; and the setup unit further comprising:
logic computing spatial derivatives for each of the spatially sorted primitives one or more times, the number of times being equal to the number of tiles overlapped by each of the spatially sorted primitives.

20. The computing system of claim 18, wherein the converting logic further comprises:

(a) means for generating the uniform quadrilateral representation by computing four new vertices from the two vertices of the line segment, if the received spatially sorted primitive is a line segment represented by two vertices; and (b) means for generating the uniform quadrilateral representation by selecting the three vertices of the triangle and labeling a fourth vertex as invalid, if the received spatially sorted primitive is a triangle represented by three vertices.

21. The computing system of claim 18, wherein the logic outputting the spatially sorted primitives according to their spatial sorting further outputting spatially sorted primitives such that all primitives sorted to a first spatial region in the rendered image are output before any primitives sorted to a second spatial region independent of the object to which the primitive corresponds.

22. The computing system of claim 18, wherein the the converting logic comprising comprises a uniform quadrilateral representation generator for: (i) generating the uniform quadrilateral representation by computing four new vertices from the two vertices of the line segment, if the received spatially sorted primitive is a line segment represented by two vertices; and (ii) generating the uniform quadrilateral representation by selecting the three vertices of the triangle and labeling a fourth vertex as invalid, if the received spatially sorted primitive is a triangle represented by three vertices.

23. A 3-D graphics processor generating a rendered image, the processor comprising:
    means for spatially sorting a plurality of graphics primitives according to their location within the two-dimensional rendered image;
    means for outputting said graphics primitives according to their location within the rendered image; and
    means for computing spatial derivatives of the spatially sorted primitives; and
    means for converting at least some of said spatially sorted primitives into a uniform quadrilateral representation having four vertices.

24. The 3-D graphics processor of claim 23, further comprising:
    means for sorting the graphics primitives according to a plurality of tiles, each tile being a region encompassing an area of the rendered image, the plurality of tiles jointly covering the entire area of the rendered image;
    means for storing the plurality of sorted graphics primitives;
    means for selecting a current tile from the plurality of tiles; and
    means for computing spatial derivatives for each of the spatially sorted primitives one or more times, the number of times being equal to the number of tiles overlapped by each of the spatially sorted primitives.

25. The 3-D graphics processor of claim 23, the means for converting further comprising:
    (a) if the received spatially sorted primitive is a line segment represented by two vertices, means for generating the uniform quadrilateral representation by computing four new vertices from the two vertices of the line segment; and
    (b) if the received spatially sorted primitive is a triangle represented by three vertices, means for generating the uniform quadrilateral representation by selecting the three vertices of the triangle and labeling a fourth vertex as invalid.

26. The processor of claim 25, wherein said means for converting converts all of the spatially sorted primitives into a uniform quadrilateral representation.

27. The graphics processor of claim 23, wherein the means for outputting said graphics primitives according to their location within the rendered image further including means for outputting graphics primitives such that all primitives sorted to a first spatial region in the rendered image are output before any graphics primitives sorted to a second spatial region independent of an object to which the primitive corresponds.

28. A method for generating a rendered image from a plurality of graphics primitives, the method comprising the steps:
    receiving the plurality of graphics primitives;
    spatially sorting the graphics primitives according to a plurality of tiles, each tile including a region encompassing an area of the rendered image;
    selecting a current tile from the plurality of tiles; and
    computing spatial derivatives of the spatially sorted primitives in the current tile; and
    converting at least some of said spatially sorted primitives into a uniform quadrilateral representation having four vertices.

29. The method of claim 28, the converting step comprising the steps:
    (a) if the graphics primitive is a line segment represented by two vertices, (i) computing four new vertices from the two vertices of the line segment for inclusion in the uniform quadrilateral representation; and
    (b) if the graphics primitive is a triangle represented by three vertices, (ii) selecting the three vertices of the triangle and (iii) labeling a fourth vertex as invalid for inclusion in the uniform quadrilateral representation.

30. The method of claim 29, further comprising the step:
    clipping the unified quadrilateral representation to the current tile, the clipped representation comprising: an x left top coordinate, an x right top coordinate, a y top coordinate, an x left corner coordinate, a y left corner coordinate, an x right corner coordinate, a y right corner coordinate, and a y bottom coordinate.

31. The method of claim 28, further comprising the step:
    breaking up a stippled line primitive into multiple individual line segments, with lengths of the individual line segments corresponding to sequences of 1 bits in a stipple pattern, each of the individual line segments being available for subsequent processing as separate primitives.

32. The method of claim 31, further comprising the step:
    reducing unnecessary processing by discarding the individual line segments that lie outside of the current tile.

33. The method of claim 28, further comprising the steps:
    generating a maximum z derivative, the maximum z derivative being, for the primitive, the greater of the partial derivative of z with respect to x and the partial derivative of z with respect to y;
    generating a depth offset factor by multiplying the maximum x derivative by a user supplied factor; and
    modifying the depth values in the vertices by using the computed depth offset.

34. A computer program for use in conjunction with a computer system, the computer program comprising a computer program mechanism embedded therein, the computer program mechanism, comprising:
    a program module that directs the rendering of a digital representation of a final graphics image from a plurality of graphics primitives, to function in a specified manner, storing the final graphics image into a frame buffer memory, the program module including instructions for:
    receiving the plurality of graphics primitives;
    spatially sorting the graphics primitives according to a plurality of tiles, each tile being a region encompassing an area of the rendered image;
    selecting a current tile from the plurality of tiles; and
    computing spatial derivatives of the spatially sorted primitives in the current tile; and converting at least some of said spatially sorted primitives into a uniform quadrilateral representation having four vertices.

35. The computer program of claim 34, the converting instructions comprising instructions such that:
(a) if the graphics primitive is a line segment represented by two vertices, computing four new vertices from the two vertices of the line segment for inclusion in the uniform quadrilateral representation; and
(b) if the graphics primitive is a triangle represented by three vertices, selecting the three vertices of the triangle and labeling a fourth vertex as invalid for inclusion in the uniform quadrilateral representation; the program module further including instructions for:
clipping the unified quadrilateral representation to the current tile;
processing the unified quadrilateral representation to cull out parts of the primitive that definitely do not contribute to the rendered image;
computing a partial derivative of z with respect to x and a partial derivative with respect to y for inclusion in the uniform quadrilateral representation;
computing the derivative in the x-y plane for one or more edges of the uniform quadrilateral representation;
sorting the vertices of each of the spatially sorted primitives and using the sorted vertices for computing depth gradients;
determining a reference z-value for each of the primitives within the current tile;
generating a plurality of sample z-values from the reference z-value and the spatial derivatives; and
invalidating one of the spatially sorted primitives whenever a corresponding spatial derivative of the depth value overflows its computation.

36. A computer program for use in conjunction with a computer system, the computer program comprising a computer program mechanism embedded therein, the computer program mechanism, comprising:
a program module that directs the rendering of a digital representation of a final graphics image from a plurality of graphics primitives, to function in a specified manner, storing the final graphics image into a frame buffer memory, the program module including instructions for:
receiving a graphics primitive, the graphics primitive comprising one or more vertices;
converting the received graphics primitive into a uniform quadrilateral representation, the converting step comprising the steps:
(a) if the graphics primitive is a line segment represented by two vertices, computing four new vertices from the two vertices of the line segment for inclusion in the uniform quadrilateral representation; and
(b) if the graphics primitive is a triangle represented by three vertices, selecting the three vertices of the triangle and labeling a fourth vertex as invalid for inclusion in the uniform quadrilateral representation.

37. The computer program of claim 36, further comprising a computer program product stored on a tangible computer readable storage medium;
clipping the unified quadrilateral representation to a tile, the tile being a rectangular region within the area of rendered image;
clipping the unified quadrilateral representation to a tile, the tile being a rectangular region within the area of rendered image, the clipped representation comprising:
an x left top coordinate, an x right top coordinate, a y top coordinate, an x left corner coordinate, a y left corner coordinate, an x right corner coordinate, a y right corner coordinate, and a y bottom coordinate;
computing a partial derivative of z with respect to x and a partial derivative with respect to y for inclusion in the uniform quadrilateral representation; and
computing the derivative in the x-y plane for one or more edges of the uniform quadrilateral representation.

38. A three-dimensional (3-D) graphics processor for generating a rendered image from image data including vertices describing a plurality of graphics primitives, the processor comprising:
(1) a sort unit comprising: (1*a*) logic spatially sorting the plurality of graphics primitives according to a plurality of files within the two-dimensional image, each of the files being a two dimensional area within the area of the image; (1*b*) logic selecting a current file; and (1*b*) logic outputting the spatially sorted primitives that overlap the current file; and
(2) a setup unit comprising: (2*a*) logic computing spatial derivatives of the spatially sorted primitives received from the sort unit; and (2*b*) logic calculating a single minimum depth value within the current tile for each of the received primitives, the calculated minimum depth values being used for a keep or discard decision for each of the received primitives with respect to the current file.

39. A three-dimensional (3-D) graphics processor for generating a rendered image, the processor comprising:
(1) a sort unit comprising: (1*a*) logic spatially sorting a plurality of graphics primitives according to a plurality of tiles within the image, each of the tiles being a two dimensional area within the area of the image; (1*b*) logic selecting a current tile; and (1*b*) logic outputting the spatially sorted primitives that overlap the current tile; and
(2) a setup unit comprising: (2*a*) logic computing spatial derivatives of the spatially sorted primitives received from the sort unit; and (2*b*) logic clipping each of the received primitives along at east one of the edges of the current tile.

40. A three-dimensional (3-D) graphics processor for generating a rendered image, the processor comprising:
(1) a sort unit comprising: (1*a*) logic spatially sorting a plurality of graphics primitives according to a plurality of tiles within the image, each of the tiles being a two dimensional area within the area of the image; and (1*b*) logic outputting the spatially sorted primitives according to their spatial sorting; and
(2) a setup unit comprising: (2*a*) logic computing spatial derivatives of the spatially sorted primitives received from the sort unit; and (2*b*) converting logic converting at least some of the received spatially sorted primitives into a uniform quadrilateral representation, the converting logic further comprising:
(i) logic generating the uniform quadrilateral representation by computing four new vertices from the two vertices of the line segment, if the received spatially sorted primitive is a line segment represented by two vertices; and
(ii) logic generating the uniform quadrilateral representation by selecting the three vertices of the triangle and labeling a fourth vertex as invalid, if the received spatially sorted primitive is a triangle represented by three vertices.

41. A mid-pipeline setup unit configurable for use in a graphics pipeline processor for generating a two-dimensional rendered image in a window divided into tiles, from image data including vertices describing a plurality of graphics primitives, said mid-pipeline setup unit receiving said image data from a mid-pipeline sort unit having already sorted said image data into said files, said setup unit:

receiving said image data from said sort unit one file at a time and processing one primitive at a time, said setup unit comprising:

logic determining, for each primitive, dimensions of a tight bounding box circumscribing a part of a primitive intersecting a tile;

logic computing, for each primitive, a minimum depth value for a part of said primitive that intersects a file;

logic calculating a spatial derivative for each primitive that is a line or triangle; and logic determining a reference stamp in said bounding box containing a vertex with said minimum depth value.

42. A method for generating a two-dimensional rendered image in a window divided into tiles, from image data including vertices describing a plurality of graphics primitives, said method comprising:

receiving said image data sorted into said files one tile at a time, and processing one primitive at a time;

determining, for each primitive, dimensions of a tight bounding box circumscribing a part of a primitive intersecting a tile;

computing, for each primitive, a minimum depth value for a part of said primitive that intersects a tile;

calculating a spatial derivative for each primitive that is a line or triangle; and determining a reference stamp in said bounding box containing a vertex with said minimum depth value.

\* \* \* \* \*